(12) United States Patent
Okagaki et al.

(10) Patent No.: US 8,879,143 B2
(45) Date of Patent: Nov. 4, 2014

(54) OPTICAL ELEMENT, SCREEN, AND DISPLAY DEVICE

(75) Inventors: Satoru Okagaki, Tokyo (JP); Eiji Yokoyama, Tokyo (JP); Tomohiro Sasagawa, Tokyo (JP); Jun Kondo, Tokyo (JP); Muneharu Kuwata, Tokyo (JP); Kuniko Kojima, Tokyo (JP); Yuzo Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 218 days.

(21) Appl. No.: 13/505,567

(22) PCT Filed: Dec. 8, 2010

(86) PCT No.: PCT/JP2010/007147
§ 371 (c)(1),
(2), (4) Date: May 2, 2012

(87) PCT Pub. No.: WO2011/070777
PCT Pub. Date: Jun. 16, 2011

(65) Prior Publication Data
US 2012/0224109 A1    Sep. 6, 2012

(30) Foreign Application Priority Data

Dec. 11, 2009  (JP) .................. 2009-281693
Jan. 15, 2010  (JP) .................. 2010-006951
Apr. 23, 2010  (JP) .................. 2010-099825

(51) Int. Cl.
G02B 26/00    (2006.01)
G02F 1/29     (2006.01)
G09G 3/34     (2006.01)

(52) U.S. Cl.
USPC ............. 359/296; 359/316; 345/84; 345/85; 345/107

(58) Field of Classification Search
USPC ............. 345/84, 85, 107; 359/296, 316
See application file for complete search history.

(56) References Cited

U.S. PATENT DOCUMENTS

| 7,411,719 | B2 * | 8/2008 | Paolini et al. ............. 359/296 |
| 8,016,424 | B2 | 9/2011 | Kinoshita |
| 2008/0151196 | A1 | 6/2008 | Kinoshita |
| 2009/0141193 | A1 | 6/2009 | Nakayama et al. |

FOREIGN PATENT DOCUMENTS

| JP | 10-111403 | A | 4/1998 |
| JP | 2001-100316 | A | 4/2001 |
| JP | 2007-65398 | A | 3/2007 |
| JP | 2008-151912 | A | 7/2008 |
| JP | 2008-151914 | A | 7/2008 |
| JP | 2008-176299 | A | 7/2008 |
| JP | 2008-203608 | A | 9/2008 |
| JP | 2009-122660 | A | 6/2009 |

* cited by examiner

*Primary Examiner* — Evelyn A. Lester
(74) *Attorney, Agent, or Firm* — Birch, Stewart, Kolasch & Birch, LLP

(57) ABSTRACT

A screen includes a light diffusion layer in which microcapsules, each having therein a light diffusion liquid that scatters light for displaying a video image, are planarly arranged. The light diffusion layer is fixed to a supporting sheet by a binder material. On a surface of the supporting sheet, a Fresnel lens is formed. A light diffusion plate is made up of the light diffusion layer and the supporting sheet. The screen is made up of the light diffusion plate and a light diffusion plate. Scattering distribution of a scattered wave of light that passes through the light diffusion layer temporally changes.

13 Claims, 51 Drawing Sheets

F I G. 1
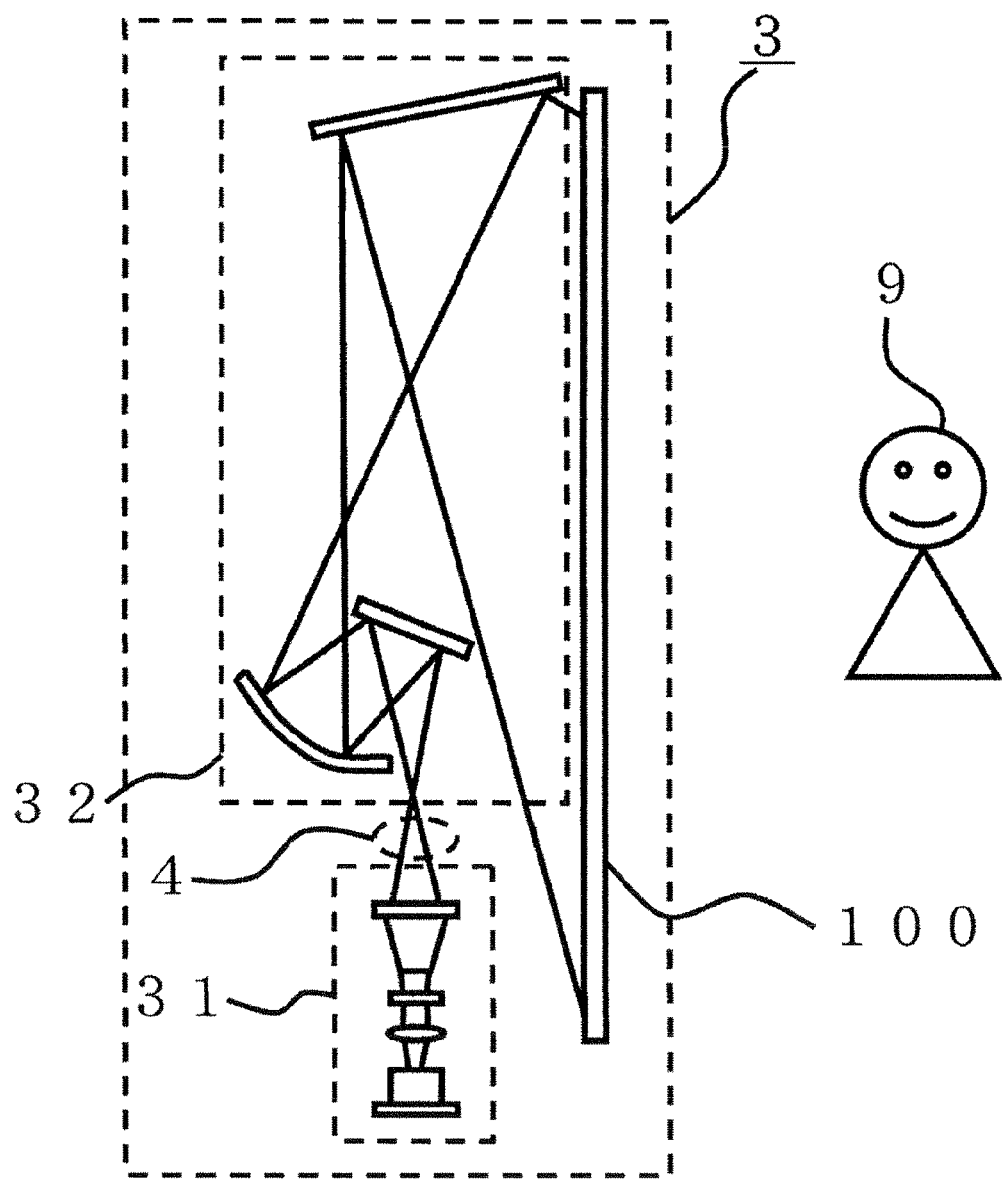

F I G . 8
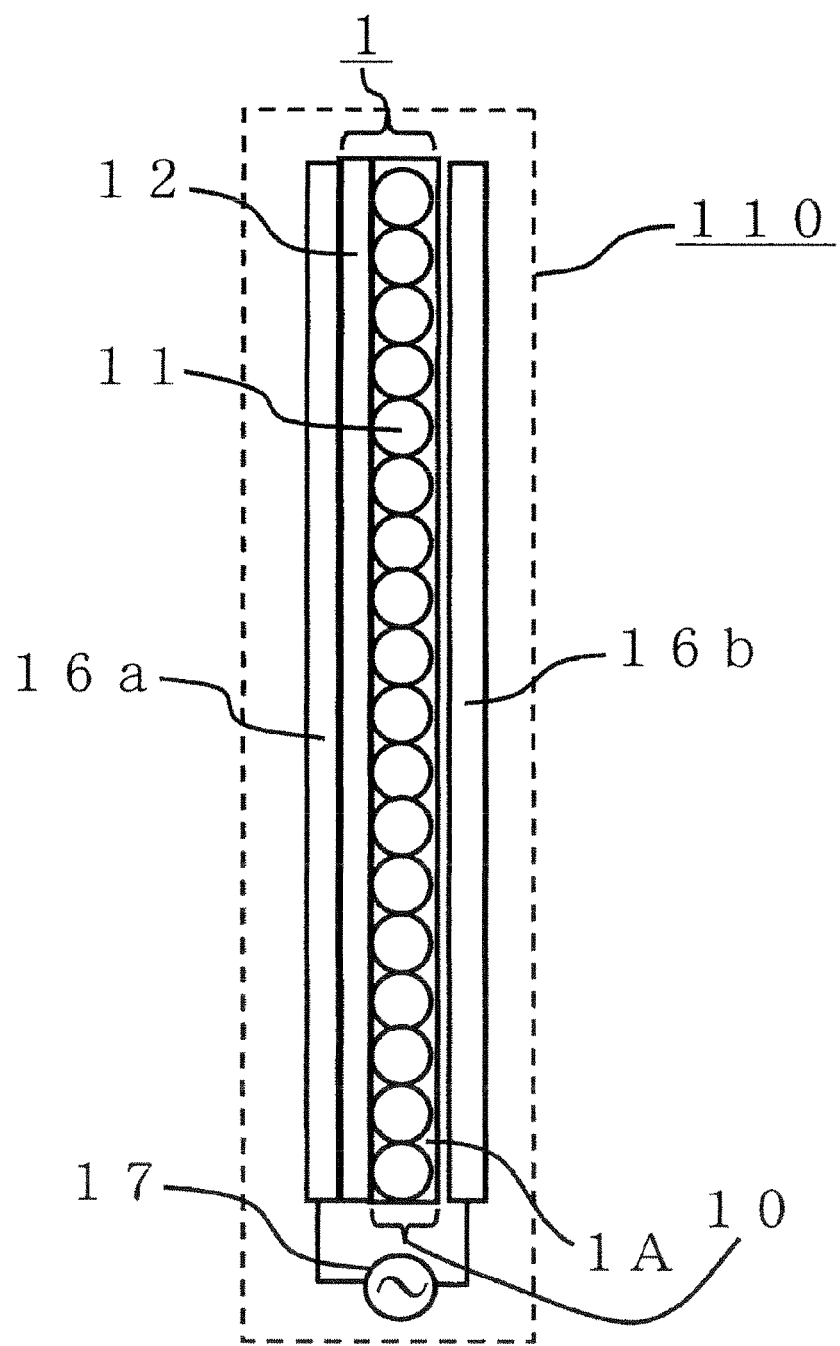

F I G . 9
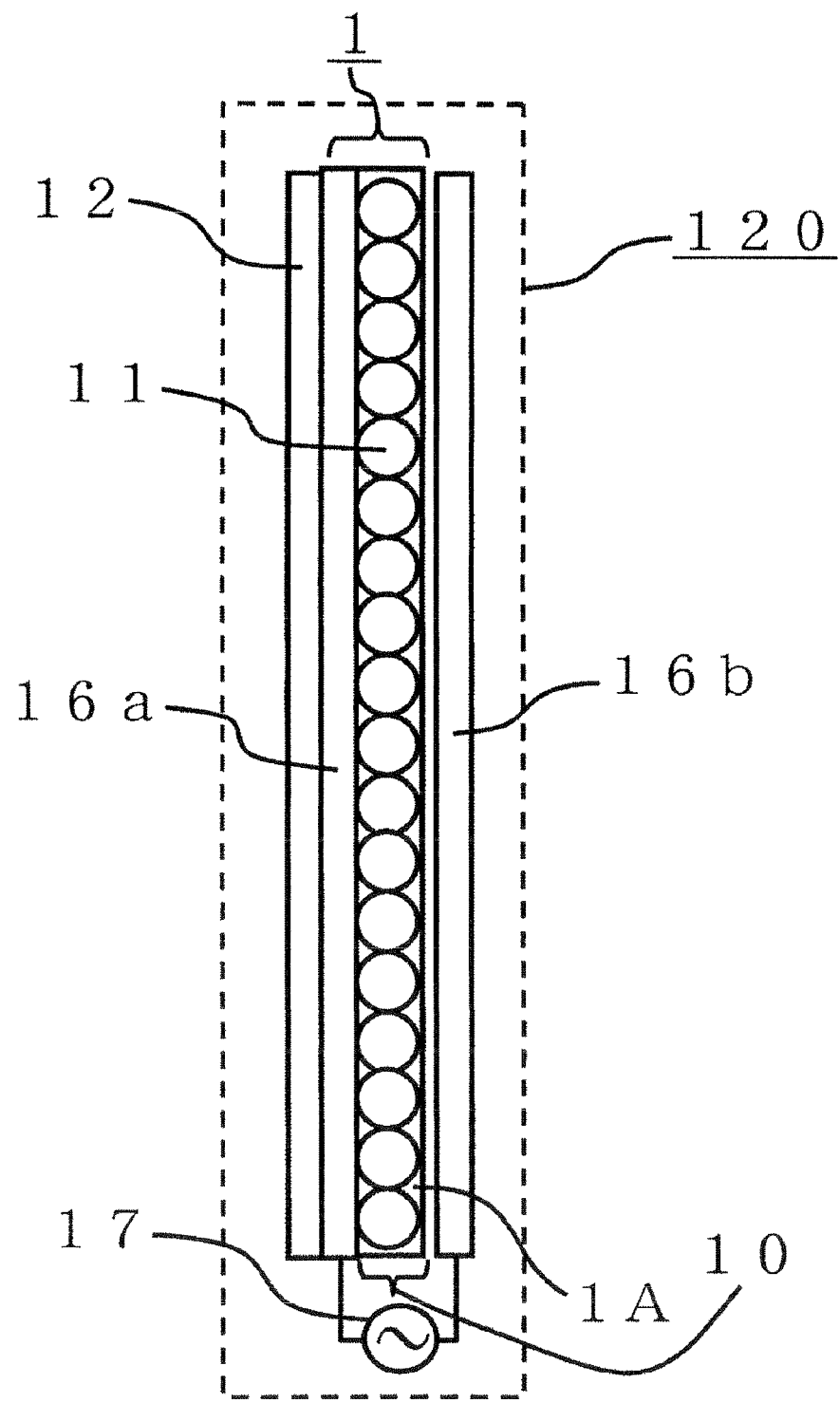

F I G . 1 3
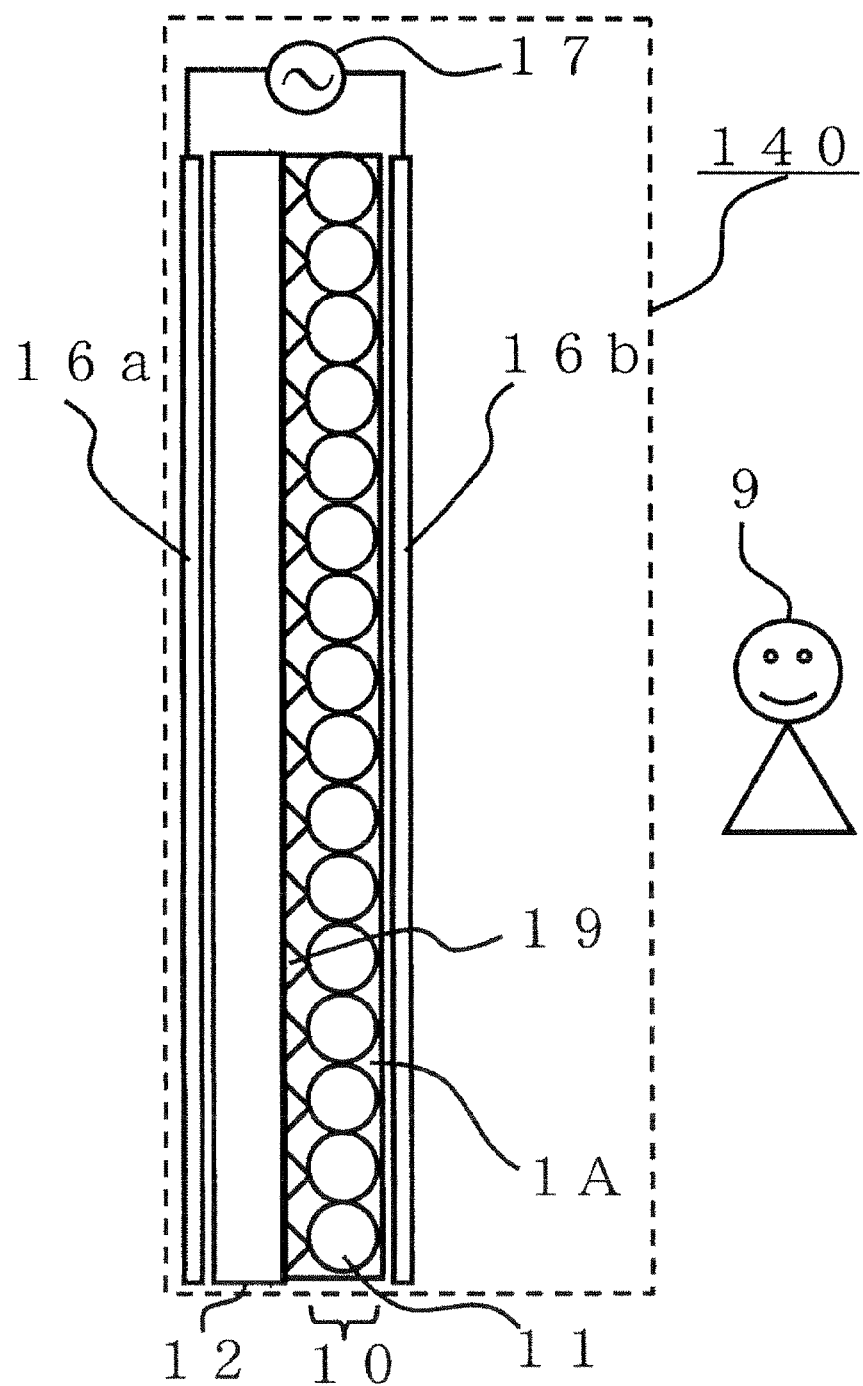

FIG. 15
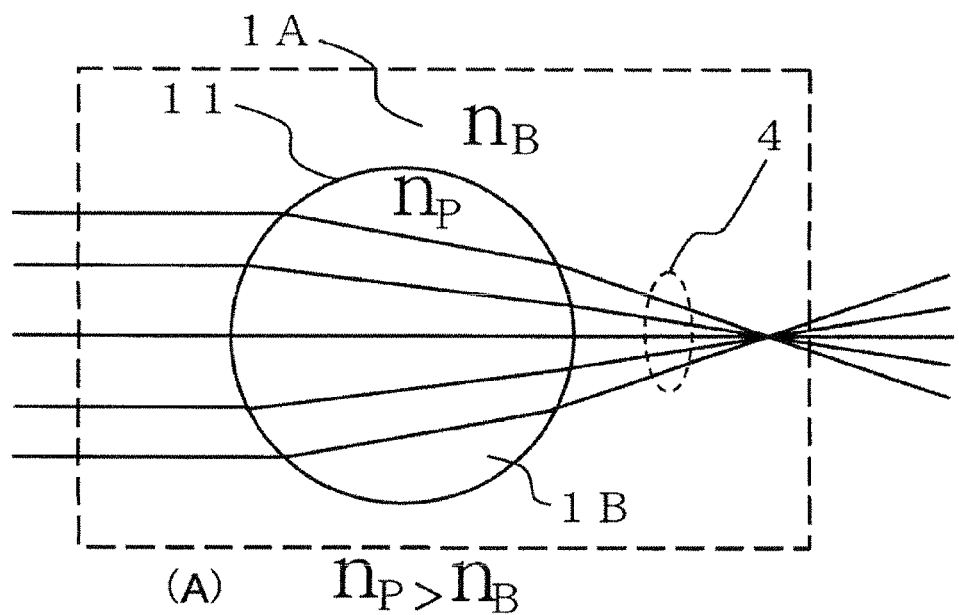
(A) $n_P > n_B$
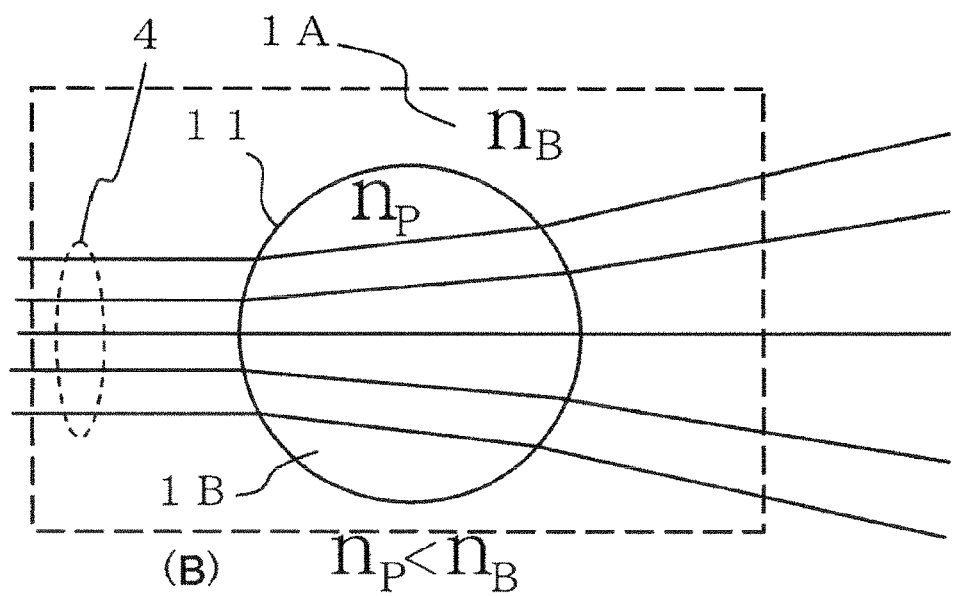
(B) $n_P < n_B$

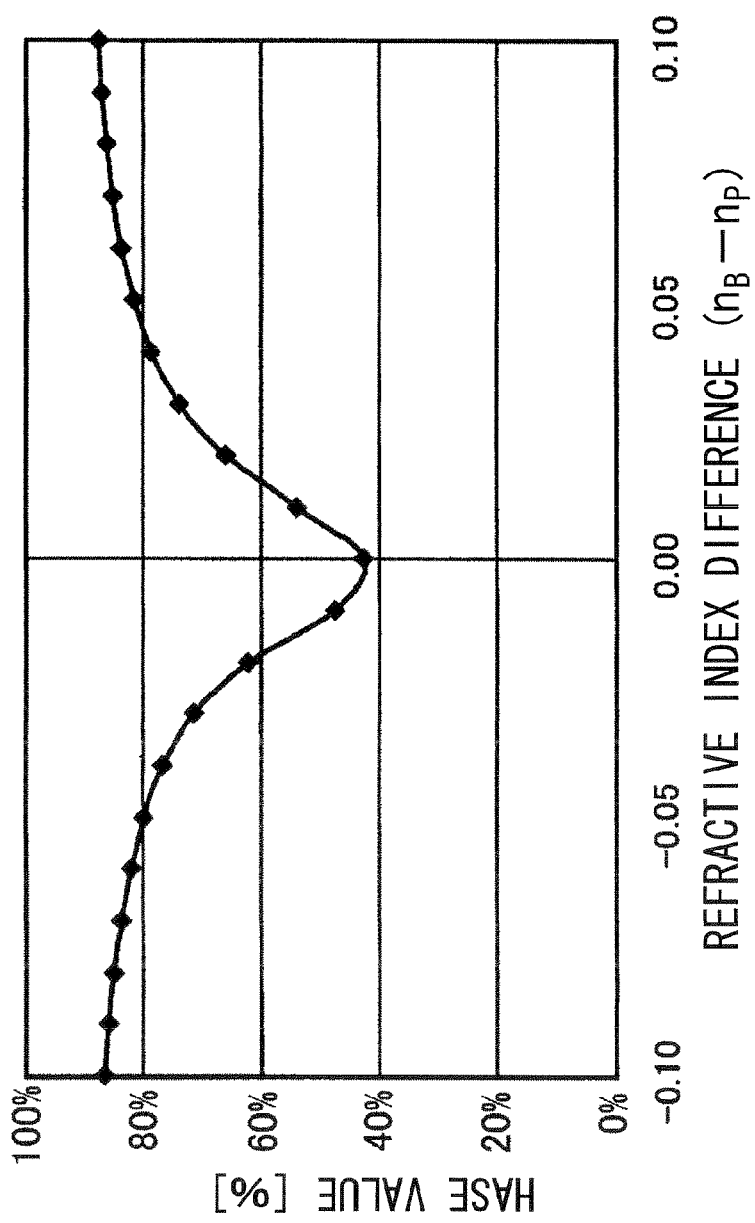
F I G . 1 6

F I G. 1 7
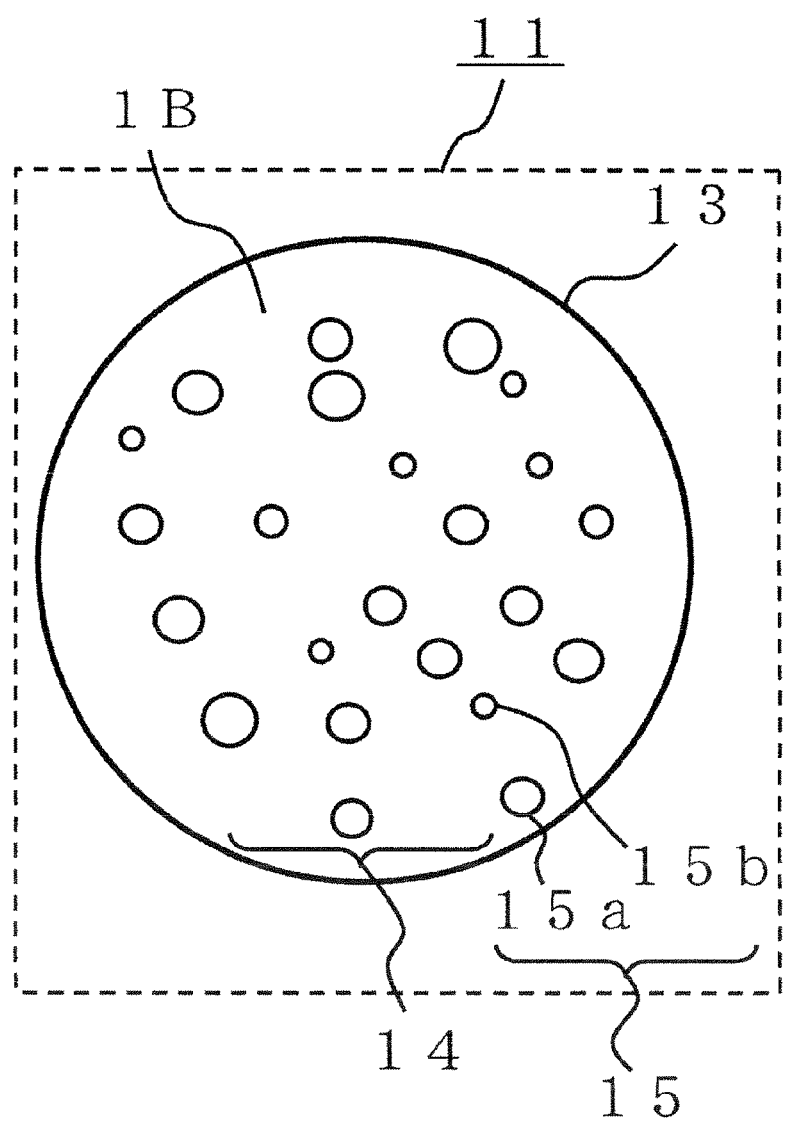

F I G . 2 5
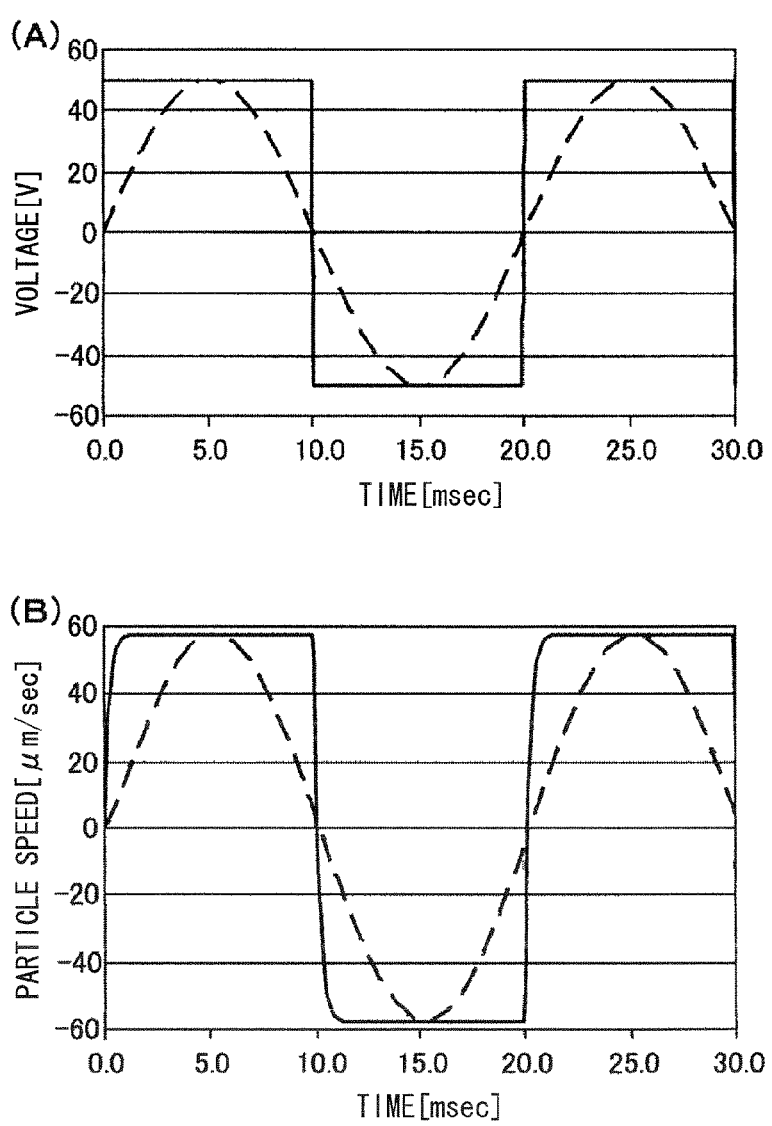

FIG. 26
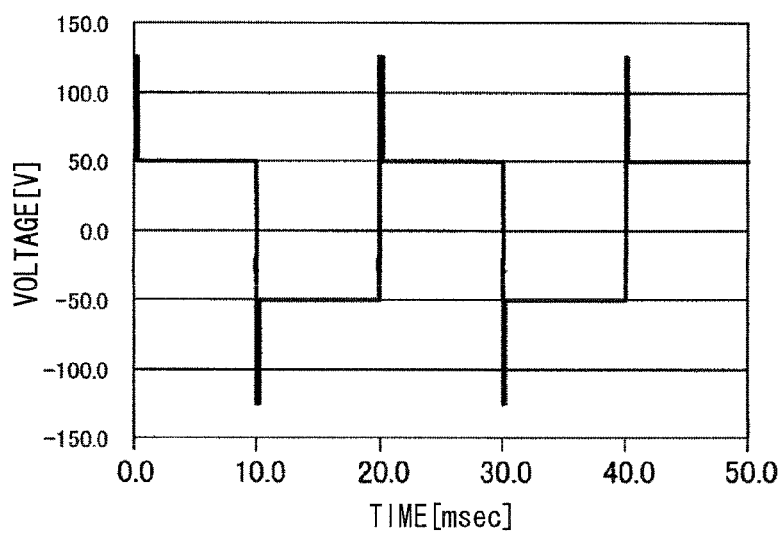
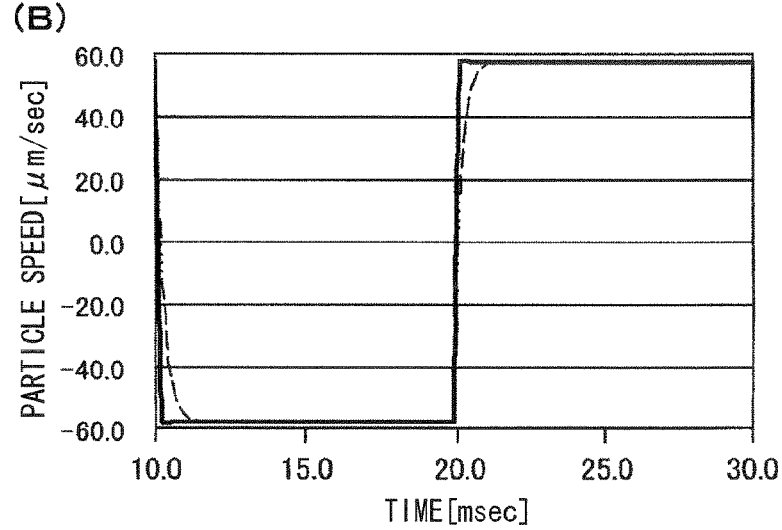

F I G . 2 7
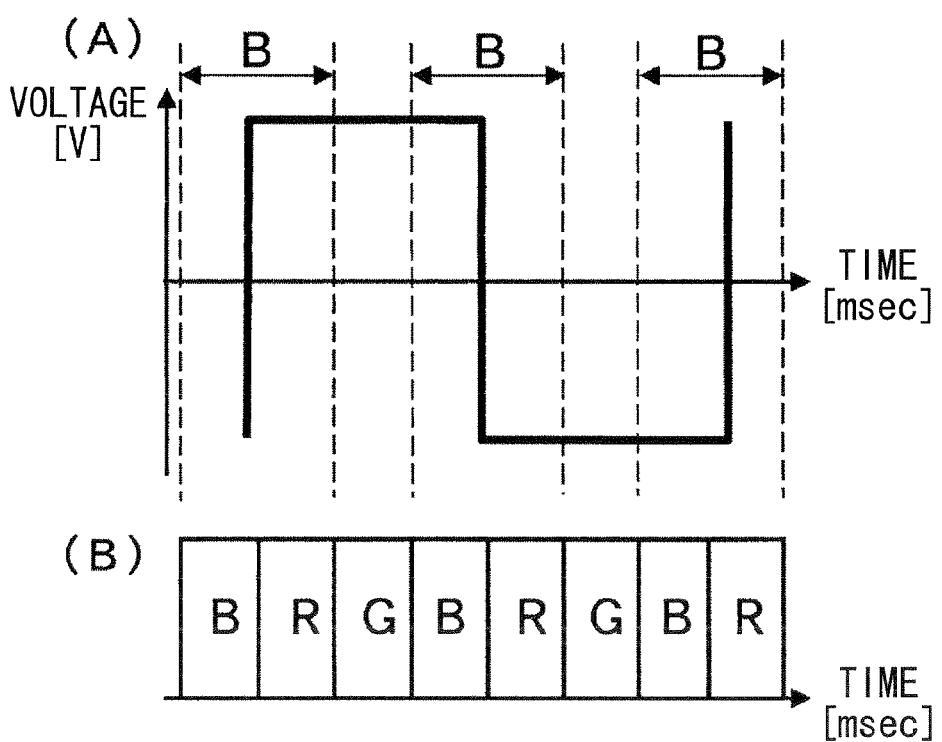

FIG. 33
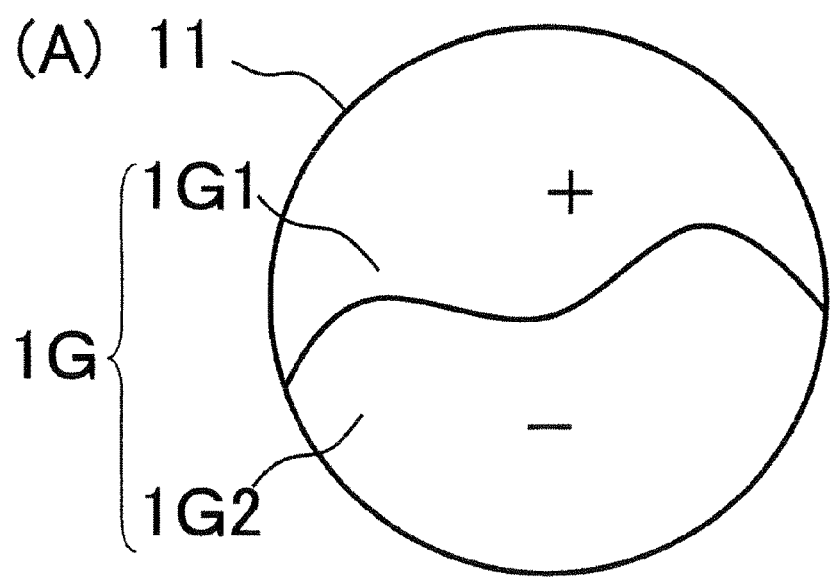
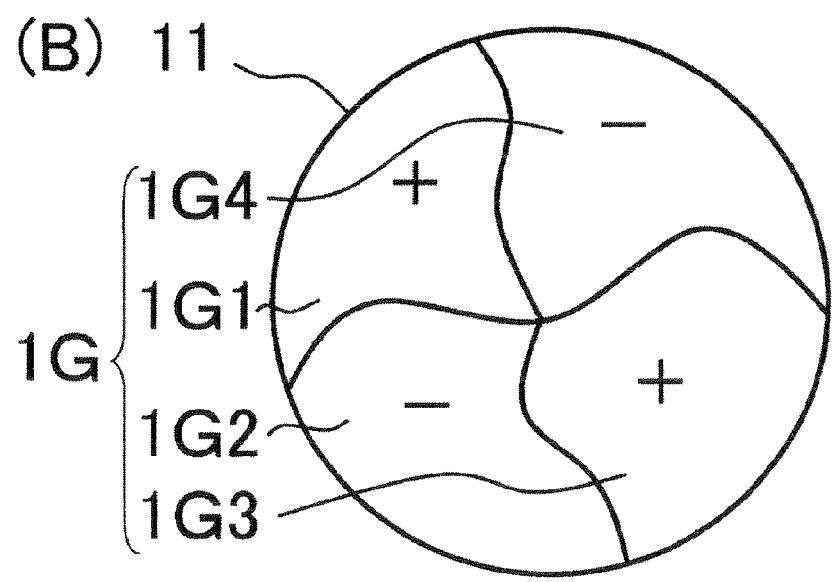

F I G . 3 6
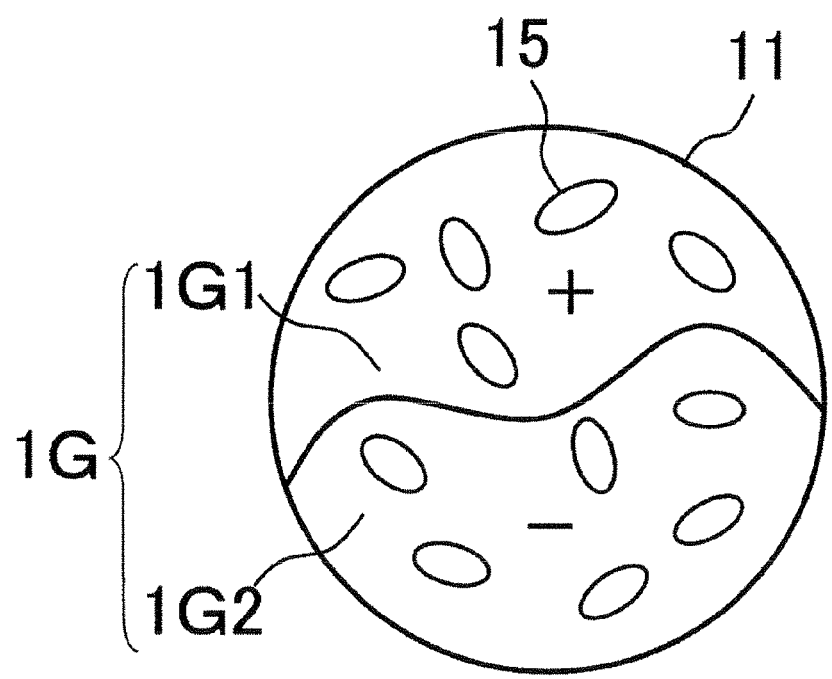

F I G . 4 4
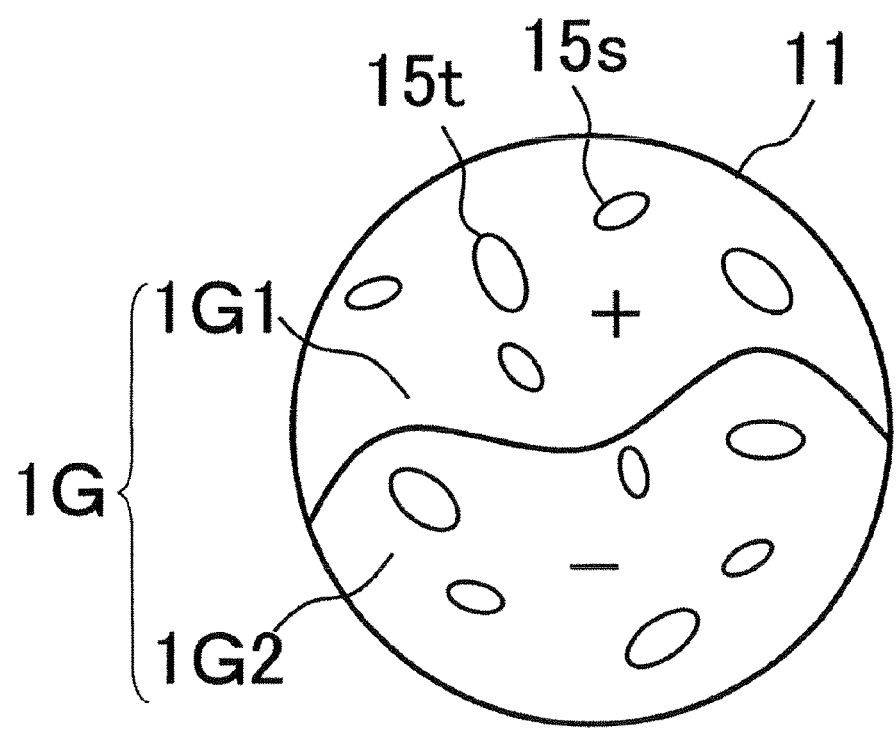

OPTICAL ELEMENT, SCREEN, AND DISPLAY DEVICE

TECHNICAL FIELD

The present invention relates to an optical element for image display, a screen and a display device.

BACKGROUND ART

A projection type display device such as a projector displays an image on a screen by projecting light rays emitted from a light source on a screen. However, the light rays are scattered when they transmit a light diffusion layer of the screen that displays a video image. When the scattered light rays interfere on a side of a viewer such as audience, antiglare arises on the screen. Brightness non-uniformity occurring due to the interference of light rays is called scintillation. There is a problem that this scintillation impairs the image. The brightness non-uniformity indicates that brightness in a display surface is not uniform.

For solving this problem, the following method has been disclosed (for example, Patent Document 1). A screen has a first substrate and a second substrate. A light scattering part is sandwiched between these two substrates. The light scattering part has a dispersion liquid in which a light scattering material is dispersed in a dispersion medium. When oscillation is given to at least one of the substrates, the light scattering material migrates in the dispersion medium. The light rays entering the screen pass through a light diffusion plate or the light scattering part. By this scattering of light, a scattered wave is formed. As a result of migration of the light scattering material, scattering distribution of the scattered wave and the phase of the scattered wave temporally change. This temporal change in scattering distribution and the temporal change in phase reduce the scintillation.

PRIOR ART DOCUMENT

Patent Document

Patent Document 1: Japanese Patent Application Laid-Open No. 2008-151914 (Paragraphs 0011 and 0012, FIG. 5, FIG. 6)

SUMMARY OF THE INVENTION

Problems to be Solved by the Invention

However, the configuration of providing the screen with the light diffusion part has a problem that distribution unevenness of the light scattering material occurs over the entire screen. As a result, the effect of reducing the scintillation is uneven. The light diffusion part has a dispersion medium and a light scattering material. The light scattering material migrates in the dispersion medium.

The present invention has been devised to solve the aforementioned problems. It is possible to obtain a screen without unevenness, capable of reducing the scintillation by preventing occurrence of distribution unevenness of the light scattering material over the entire screen.

Means for Solving the Problems

An optical element according to the present invention includes a light diffusion layer in which microcapsules, each having therein a light diffusion liquid that scatters laser light for displaying a video image, are planarly arranged.

An optical element according to the present invention includes a light diffusion particle that scatters laser light for displaying a video image, a charged substance having a charge, a dispersion medium dispersing said light diffusion particle and said charged substance, cells, each having therein said light diffusion particle, said charged substance and said dispersion medium, being planarly arranged to form a light diffusion layer, and electrodes for generating an electric field in said cells.

An optical element according to the present invention includes at least two kinds of liquids that do not mix with each other and have different refractive indexes, and cells, each having therein said liquid, being planarly arranged to form a light diffusion layer that scatters laser light for displaying a video image.

Effect of the Invention

The present invention provides an optical element that reduces scintillation over an entire display surface.

BRIEF DESCRIPTION OF THE DRAWINGS

FIG. 1 is a configuration diagram of a projection type display device according to a first embodiment of the present invention.

FIG. 8 is a sectional view of a screen according to a second embodiment of the present invention.

FIG. 9 is a sectional view of the screen according to the second embodiment of the present invention.

FIG. 13 is a configuration diagram showing a configuration of the screen according to the fourth embodiment of the present invention.

FIG. 15 is a view for explaining a light diffusing effect by a dispersion medium and a binder material of a screen according to a fifth embodiment of the present invention.

FIG. 16 is a view for explaining the light diffusing effect by the dispersion medium and the binder material of the screen according to the fifth embodiment of the present invention.

FIG. 17 is a configuration diagram showing a configuration of a microcapsule of a screen according to a sixth embodiment of the present invention.

FIG. 25 is a view showing temporal changes in a voltage applied to an electrode of a screen and in a speed of a light diffusion particle according to a seventh embodiment of the present invention.

FIG. 26 is a view showing temporal changes in a voltage applied to an electrode of a screen and in a speed of a light diffusion particle according to an eighth embodiment of the present invention.

FIG. 27 is a view showing a temporal change in a voltage applied to an electrode of a screen according to a ninth embodiment of the present invention.

FIG. 33 is a configuration diagram showing a configuration of a microcapsule of a screen according to a thirteenth embodiment of the present invention.

FIG. 36 is a configuration diagram showing a configuration of a microcapsule of the screen according to the thirteenth embodiment of the present invention.

FIG. 44 is a configuration diagram showing a configuration of a microcapsule of a screen according to the sixteenth embodiment of the present invention.

EMBODIMENTS FOR CARRYING OUT THE INVENTION

First Embodiment

Figure 2:
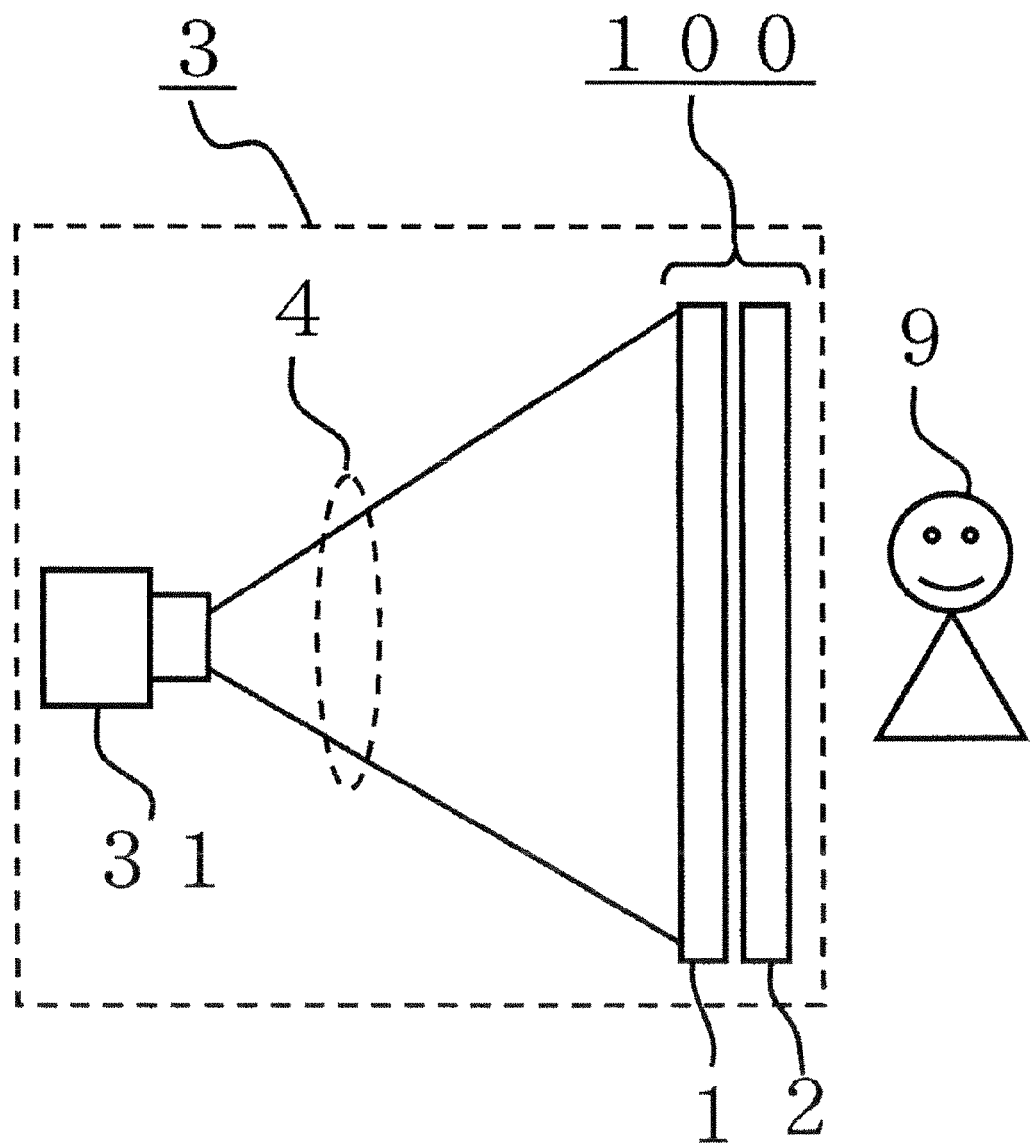
FIG. 2 is a view for explaining a positional relationship of a projector, a viewer and a light diffusion plate of a screen in the display device according to the first embodiment of the present invention.
Figure 3:
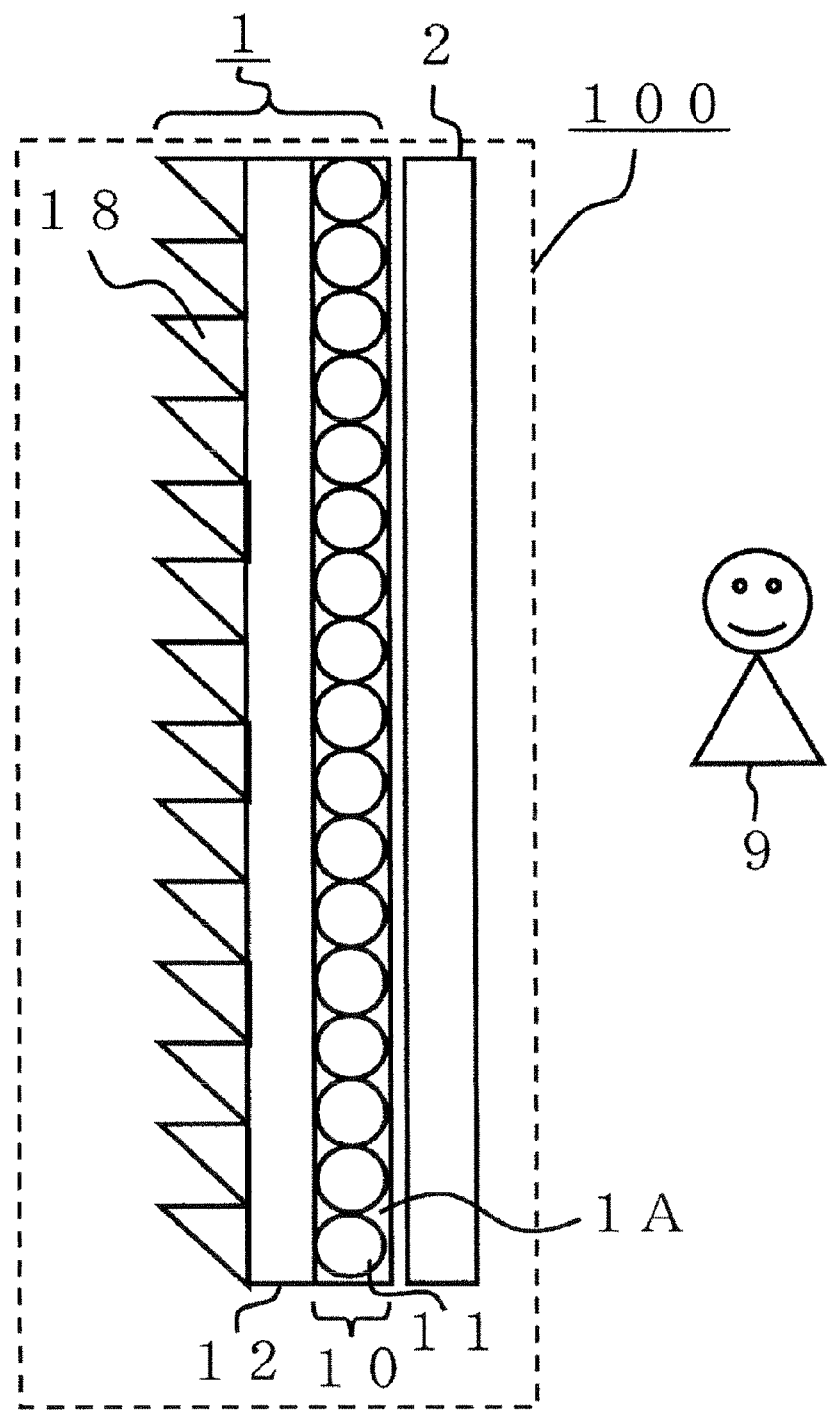
FIG. 3 is a configuration diagram showing a configuration of the screen according to the first embodiment of the present invention.
Figure 4:
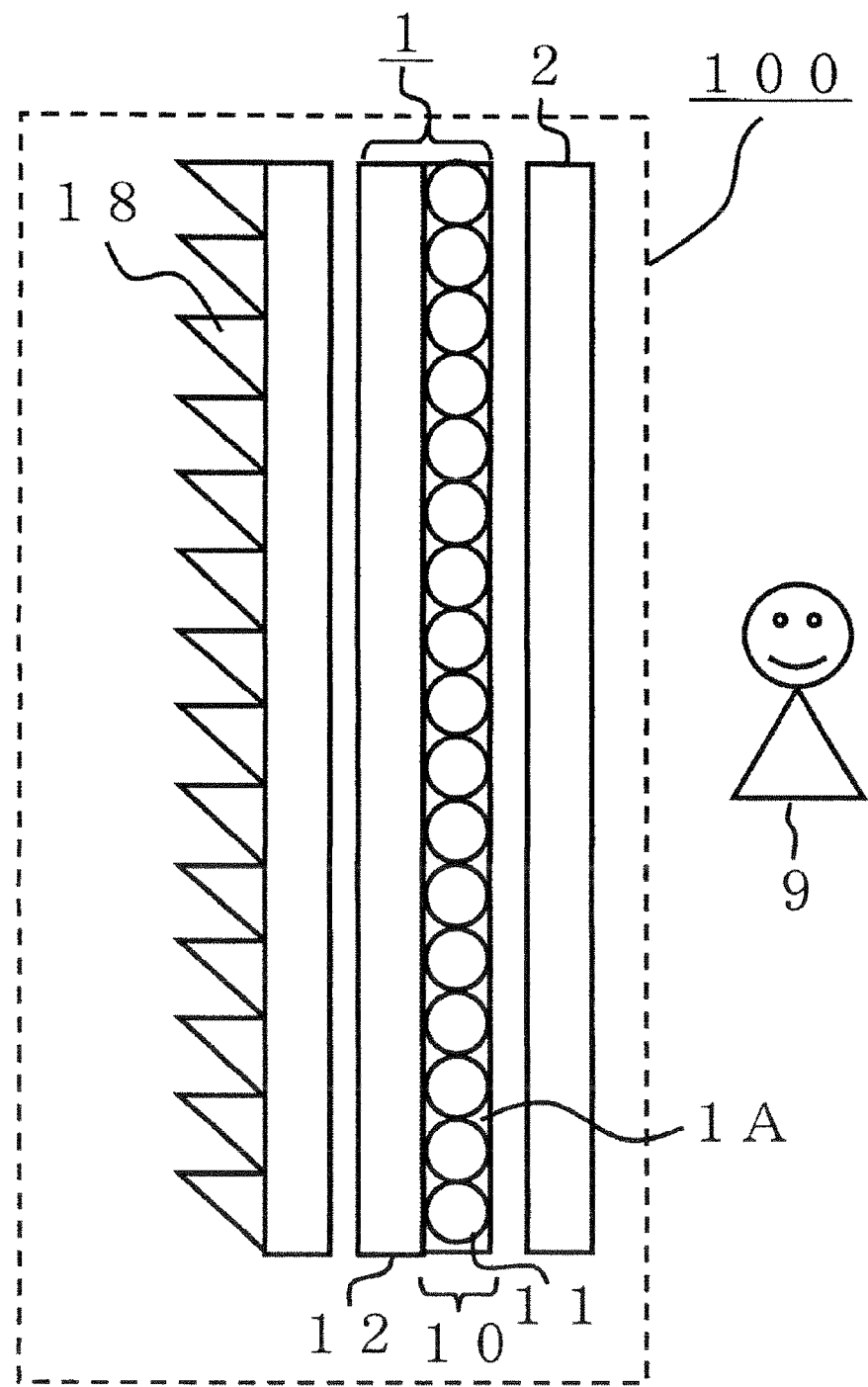
FIG. 4 is a configuration diagram showing a configuration of the screen according to the first embodiment of the present invention.
Figure 5:
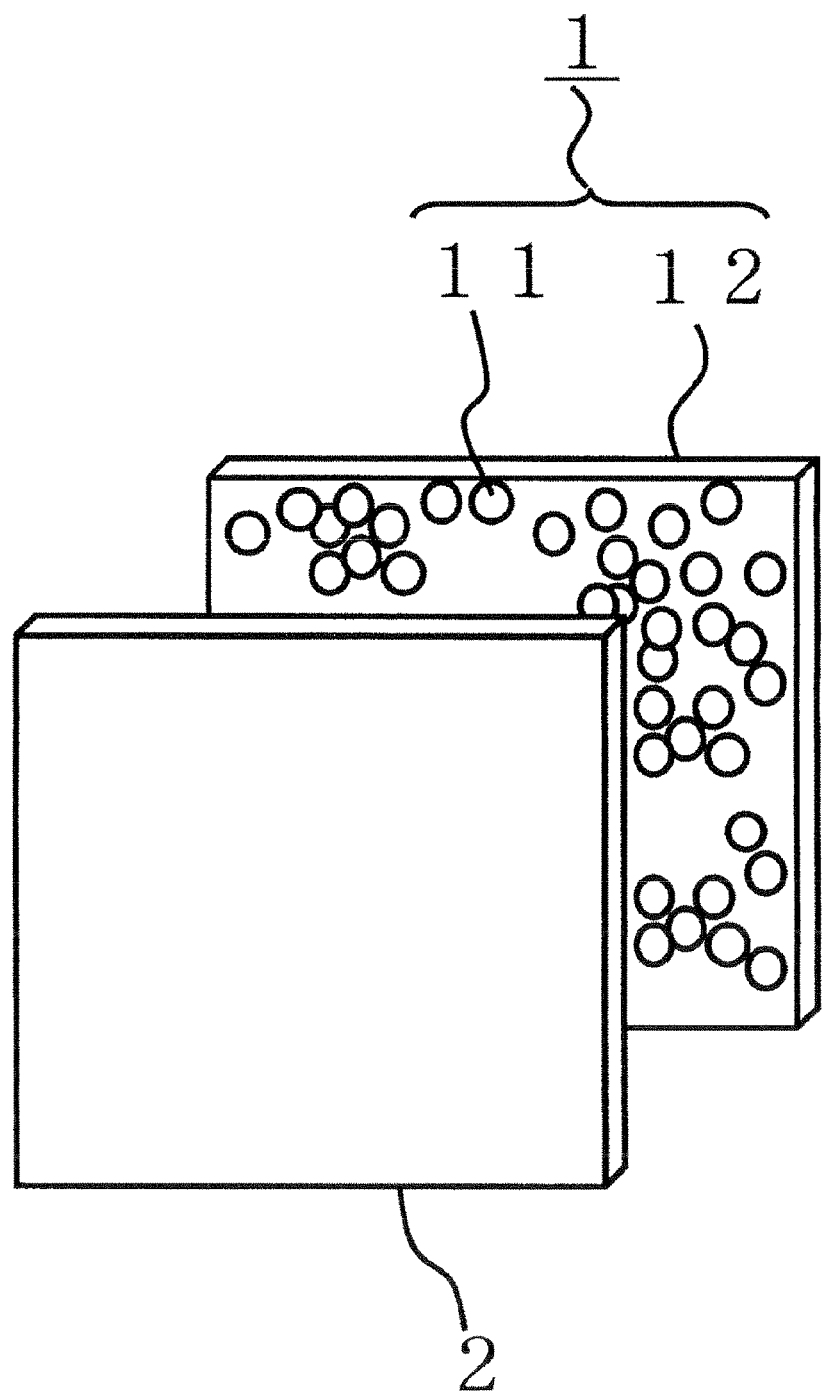
FIG. 5 is a perspective exploded view showing a configuration of the screen according to the first embodiment of the present invention.
Figure 6:
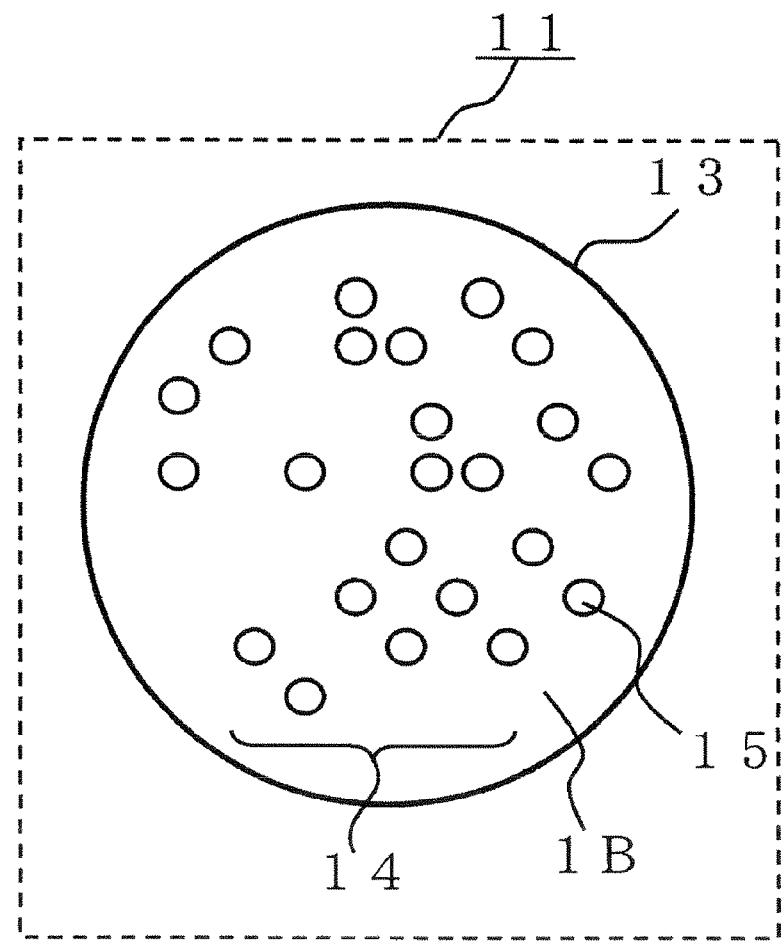
FIG. 6 is a configuration diagram showing a configuration of a microcapsule according to the first embodiment of the present invention.
Figure 7:
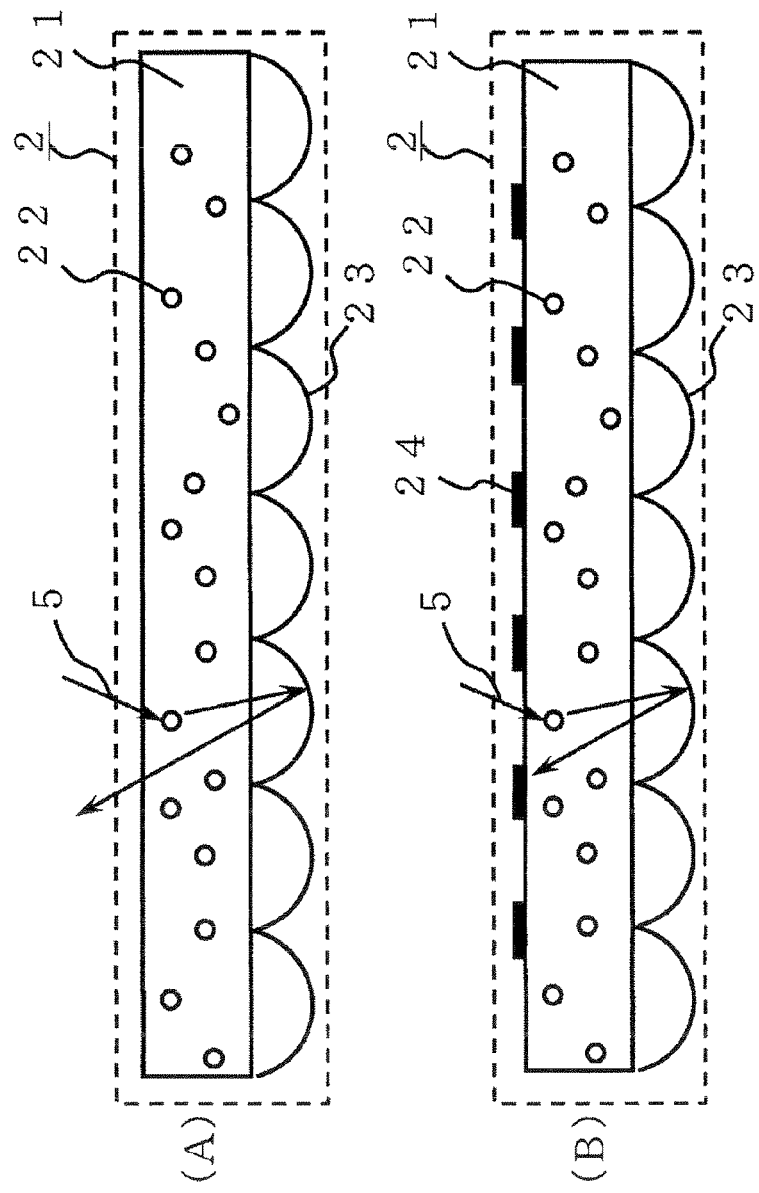
FIG. 7 is a sectional view of a second light diffusion plate according to the first embodiment of the present invention.

FIG. 1 is a configuration diagram of a projection type display device 3 in the first embodiment for carrying out the present invention. FIG. 2 is a view for explaining a positional relationship of a projector 31, a viewer 9, a first light diffusion plate 1 and a second light diffusion plate 2. The display device 3 has the projector 31, the viewer 9, the first light diffusion plate 1 and the second light diffusion plate 2. A screen 100 has the first light diffusion plate 1 and the second light diffusion plate 2. FIG. 3 and FIG. 4 are configuration diagrams showing a configuration of the screen 100. FIG. 5 is a perspective exploded view showing a configuration of the screen 100 for projection. FIG. 6 is a configuration diagram showing a configuration of a microcapsule 11. FIG. 7 is a sectional view showing a configuration of the second light diffusion plate 2.

In FIG. 1, projection light 4 emitted from the projector 31 is reflected at a mirror part 32 and then projected onto the screen 100. In FIG. 2, a configuration of the display device 3 is shown in a simplified manner while the mirror part 32 is omitted. The screen 100 has the first light diffusion plate 1 and the second light diffusion plate 2. The microcapsules 11 that are planarly arranged form a light diffusion layer 10. The first light diffusion plate 1 is made up of the light diffusion layer 10 formed by the microcapsules 11 and a supporting sheet 12. The projection light 4 emitted from the projector 31 is scattered when it passes through the first light diffusion plate 1 provided on the incidence side of the screen 100. The projection light 4 is also scattered when it passes through the second light diffusion plate 2. The second light diffusion plate 2 is disposed on the side opposite to the projector 31 with respect to the first light diffusion plate 1.

The viewer 9 views the scattered light as a video image projected onto the screen 100. The viewer 9 is positioned on the side opposite to the projector 31 with respect to the screen 100. Here, a temporal change in scattered light averages the scintillation. The temporal change in scattered light reduces the scintillation. A function that the scattered light changes temporally is provided for the first light diffusion plate 1. A light ray having entered the screen passes through the light diffusion plate or a light scattering part. A movement of a light scattering material changes a scattering distribution of a scattered wave formed in the light diffusion plate or the light scattering part, and changes the phase of the scattered wave. A brightness distribution on the screen changes and the scintillation is reduced.

For thinning the depth of the display device 3, the projection light 4 is projected from the projector 31 toward the screen 100 at a relatively large projection angle. For achieving this, the screen 100 has a Fresnel lens 18. The Fresnel lens 18 has a function of directing the light projected onto the screen 100 toward the viewer 9. As shown in FIG. 3, the first light diffusion plate 1 may have the function of the Fresnel lens 18 as a unit on the side of an incidence plane of the projection light 4. Further, as shown in FIG. 4, the Fresnel lens 18 may be disposed on the incidence side of the screen 100 as a separate component, and the first light diffusion plate 1 may be disposed between the Fresnel lens 18 and the second light diffusion plate 2.

As shown in FIG. 5, the first light diffusion plate 1 has the supporting sheet 12 and the microcapsule 11. As shown in FIG. 6, the microcapsule 11 has a dispersion medium 1B and a light diffusion particle 15 in a capsule membrane 13. The light diffusion particle 15 is a first light diffusion particle. A dispersion liquid 14 is made up of the dispersion medium 1B and the light diffusion particle 15. As shown FIG. 3, the microcapsule 11 is fixed to the supporting sheet 12 by means of a binder material 1A such as an adhesive on the emission side of the projection light 4. The binder material 1A may be elastic even after hardening. In particular, for application to a reflection type screen described later, it is effective to use the binder material 1A that will not completely harden.

This configuration uses an adhesive in which the microcapsule 11 is mixed during production. A step of applying the adhesive uniformly on the surface of the emission side of the supporting sheet 12 is required. This production method may be readily realized using, for example, a screen printing technique. With such a method, it is possible to readily apply the microcapsule 11 on the entire face of the surface on the light emission side of the supporting sheet 12 in a short time. Therefore, it is possible to readily produce the first light diffusion plate 1 with stable quality.

The first light diffusion plate 1 and the second light diffusion plate 2 are held at predetermined positions by a holding structure provided in the display device 3. Therefore, the first light diffusion plate 1 and the second light diffusion plate 2 constituting the screen 100 may bend due to the gravity, external force and so on. For example, the screen of Patent Document 1 has such a structure that the light diffusion part of the screen is sandwiched between the first substrate and the second substrate. The light diffusion part has a light scattering material capable of moving in a dispersion medium. When the screen bends, a gap amount between the first substrate and the second substrate changes. Therefore, the number of light scattering materials and the moving speed of the light scattering material may not be uniform on the screen surface.

On the other hand, in the screen 100 according to the first embodiment, the microcapsule 11 is fixed to the supporting sheet 12. Therefore, even when the first light diffusion plate 1 bends and its planarity changes, the shape of the microcapsule 11 will not change. Therefore, the number of the light diffusion particles 15 in the microcapsule 11 will not change. Also, the moving speed of the light diffusion particle 15 in the microcapsule 11 will not change. In a large-sized screen wherein planarity is difficult to be kept, it is also possible to keep an intensity distribution of transmitted light and an effect of reducing the scintillation uniformly.

In FIG. 6, the microcapsule 11 is approximately spherical. The microcapsule 11 contains the dispersion liquid 14 in the capsule membrane 13. The dispersion liquid 14 is made up of the dispersion medium 1B and the light diffusion particle 15. The light diffusion particle 15 is an approximately spherical dispersion phase.

The capsule membrane 13 is made up of, for example, gelatin, a mixture of gelatin and gum arabic, urethane resin, melamine resin and urea-formalin resin and so on. For the dispersion medium 1B, density, viscosity and the like are selected. Depending on the selected density, viscosity and the like, the light diffusion particle 15 can more easily move in the dispersion liquid 14. As a result, the first light diffusion particle 15 makes Brownian motion in the dispersion liquid 14. In this manner, the first light diffusion particle 15 is able to continue moving in the dispersion liquid 14.

The Brownian motion is irregular motion of a microparticle. The Brownian motion is a phenomenon that occurs due to non-uniform collisions of thermally moving neighboring molecules. By the Brownian motion, the scattered wave of the projection light 4 changes temporally. As a result, the scintillation is averaged. Then, the scintillation is reduced, and the scintillation is removed.

Also, the light diffusion particles 15 are charged in the same sign. The light diffusion particle 15 is a first light diffusion particle. As a result, the light diffusion particles 15 repels each other, and are dispersed uniformly without being concentrated in one site in the dispersion liquid 14. Accordingly, the light diffusion particles 15 are able to make Brownian motion in the dispersion liquid 14 without being concentrated in one site in the dispersion liquid 14. The light diffusion particles 15 move while they are uniformly dispersed. The first light diffusion plate 1 is able to obtain such an effect.

When the temperature of the screen 100 rises due to the projection light 4, the light diffusion particle 15 in the microcapsule 11 actively makes Brownian motion. As a result of continuous movement of the light diffusion particle 15 in the microcapsule 11, the scattered wave of the projection light 4 changes temporally. When the amount of change and the speed of change are sufficiently large, the scintillation is averaged. Then, the scintillation is reduced, and the scintillation is removed.

It is desired that the size of the light diffusion particle 15 be in the range of about 0.5 μm to about 10 μm. When a microparticle is irradiated with a laser beam, light is emitted in various directions from the particle. The various directions include the anteroposterior direction, the vertical direction and the horizontal direction. This is called diffraction scattered light.

Intensity of the diffraction scattered light describes a constant light intensity distribution pattern in the direction in which the light is emitted. The light intensity distribution pattern changes in various forms depending on the size of the particle. As the particle size decreases, the light on the lateral side and the light on the back side intensify. The lateral side refers to the vertical direction and the horizontal direction. The back side refers to the direction opposite to the traveling of the laser beam. In other words, the light will spread in every direction in the shape like a cocoon or a gourd.

When the diameter of the light diffusion particle 15 is less than 0.5 the proportion of the light scattered on the back side in the intensity distribution of scattered light is not negligible. In this case, the amount of light passing through the screen 100 decreases, and the light use efficiency decreases. The light use efficiency is a proportion of the amount of light seen as a video image by the viewer 9, in the amount of light emitted from the projector 31. Therefore, the image plane projected onto the screen 100 becomes dark. On the other hand, when the diameter of the light diffusion particle 15 is 10 μM or more, the resistance from the dispersion medium 1B increases, and the motion of the light diffusion particle 15 in the microcapsule 11 decreases. As a result, a sufficient scintillation reducing effect may not be obtained.

As the diameter of the microcapsule 11 increases, the thickness of the first light diffusion plate 1 increases, so that the resolution decreases. Therefore, it is desired that the diameter of the microcapsule 11 is about 200 μm or less. The movement of the light scattering material in the medium in Patent Document 1 is larger than the diameter 200 μm of the microcapsule 11 described above. However, even when the movement amount of the light diffusion particle 15 is about 200 μm, it is possible to obtain the scintillation reducing effect as far as the light diffusion particle 15 moves randomly in the microcapsule 11. Accordingly, there arises no particular problem even if the light diffusion particle 15 does not move a long distance as in the conventional case.

In this manner, it is possible to obtain a screen with reduced scintillation by suppressing distribution unevenness of light diffusion particles over the entire screen.

A screen with reduced scintillation is disclosed in Japanese Patent Application Laid-Open No. 2007-328003. This publication discloses a technique of rotating the entire light diffusion plate of the screen in the planar direction of the screen. There is proposed a method of allowing continuous movement of the light diffusion plate by this rotational motion. The light diffusion plate has a function of the light scattering material in Patent Document 1. However, when the method of moving the entire light diffusion plate of the screen is employed, a large amount of energy is required for driving the light diffusion plate. Therefore, there are still problems of oscillation and noise. In the screen according to the present first embodiment, the light diffusion particle is moved. The energy required for movement of the light diffusion particle is smaller than that in the method of moving the entire light diffusion plate of the screen. Therefore, the oscillation occurring in movement of the screen can be suppressed. Also, the adverse effect such as noise occurring in movement of the screen can be suppressed.

In the first embodiment, the configuration where the screen 100 has the first light diffusion plate 1 and the second light diffusion plate 2 has been described. However, the second light diffusion plate 2 is not necessarily required. Accordingly, the screen 100 may have a configuration omitting the second light diffusion plate 2. The screen 100 may employ a configuration omitting the second light diffusion plate 2. However, when the motion of the light diffusion particle 15 in the microcapsule 11 is slow, the scintillation is not sufficiently reduced. In such a case, it sometimes seems that brightness non-uniformity due to interference of light rays moves on the screen. By providing the second light diffusion plate 2 in such a case, it is possible to reduce the brightness non-uniformity due to interference of light rays, and to suppress the scintillation.

Next, with reference to FIG. 7, a configuration of improving the contrast will be described. FIG. 7 is a schematic view showing a configuration of the second light diffusion plate 2. The upper side of each of parts (A) and (B) of FIG. 7 is the side of the viewer 9, and the lower side is an incidence side of the projection light 4. As shown in part (A) of FIG. 7, on the incidence side of the projection light 4 of the second light diffusion plate 2, a lenticular lens 23 is formed. Inside a supporting sheet part 21 on the side of the viewer 9, a light diffusion particle 22 is contained. The light diffusion particle 22 is a second light diffusion particle.

A light ray 5 from outside enters the second light diffusion plate 2 from the side of the viewer 9. The light ray 5 is scattered by the light diffusion particle 22 in the supporting sheet part 21. Then the light ray 5 is reflected on the lens surface of the lenticular lens 23 and emitted again on the side of the viewer 9. The lenticular lens 23 is disposed on the incidence side of the projection light 4 of the second light diffusion plate 2. The viewer 9 views the light ray 5 concurrently with the projection light 4. The light ray 5 is unnecessary external light. The projection light 4 is image light projected from the projector 31. Image light means light having image information. Therefore, the contrast of the video image decreases.

As shown in part (B) of FIG. 7, the supporting sheet part 21 is provided with a black stripe 24 on the side of the viewer 9. The black stripe 24 absorbs light reflected on the lens surface of the lenticular lens 23. Alternatively, the black stripe 24 reflects the light reflected on the lens surface of the lenticular lens 23. The black stripe 24 does not emit the light ray 5 which is unnecessary external light, on the side of the viewer 9. Accordingly, it is possible to prevent the contrast from decreasing. Here, the lenticular lens 23 is formed in the vertical direction so as to widen a view angle in the horizontal direction. Therefore, the black stripe 24 is provided similarly in the vertical direction.

Further, a configuration capable of improving the contrast owing to the disposition of the first light diffusion plate 1 and the disposition of the second light diffusion plate 2 will be described. As described above, it is desired that the diameter of the light diffusion particle 15 in the microcapsule 11 be from about 0.5 μm to about 10 μm. Taking the Brownian motion into account, a particle diameter of about 1 μm is most appropriate. For this reason, as the first light diffusion particle 15, a particle having a particle diameter of about 1 μm is used. However, light has a nature of being scattered in the traveling direction of the light ray by a particle of about 1 μm. In addition, light has a nature of being slightly scattered backward by a particle of about 1 μm. The term backward means the direction opposite to the traveling direction of the light ray.

On the other hand, diameter of the second light diffusion particle 22 is smaller than that of the first light diffusion particle 15. The second light diffusion particle 22 is contained in the second light diffusion plate 2. The first light diffusion particle 15 is contained in the microcapsule 11 of the first light diffusion plate 1. Therefore, in the case of the second light diffusion particle 22, the scattered light concentrates in the traveling direction of the light ray in comparison with the first light diffusion particle 15. In other words, in the light diffusion plate 2, light is hardly scattered backward. Here, the term backward refers to the side of the viewer 9. On the other hand, in the light diffusion plate 1, light is significantly scattered backward. Here, the term backward refers to the side of the projector 31. From this, in order not to make the light ray 5 be scattered on the side of the viewer 9 as much as possible, the position of the light diffusion particle 15 having a smaller particle size is determined in consideration of a positional relationship with the light diffusion particle 22 having a larger particle size. The light ray 5 is a light ray entering inside the screen 100 from the side of the viewer 9. The term backward refers to the direction opposite to the traveling direction of the light ray 5. The side of the viewer 9 is backward with respect to the travelling direction of the light ray 5.

In other words, the first light diffusion plate 1 is disposed on the incidence side of the projection light 4. The second light diffusion plate 2 is disposed on the emission side. The first light diffusion plate 1 has the first light diffusion particle 15 having a smaller particle size. The second light diffusion plate 2 has the second light diffusion particle 22 having a larger particle size. The incidence side of the projection light 4 is the interior side of the display device 3. The emission side of the projection light 4 is the exterior side of the display device 3. In this manner, it is possible to prevent the external light from being scattered on the side of the viewer 9. Here, the light ray 5 is external light. The first light diffusion particle 15 is a light diffusion particle of the first light diffusion plate 1. The second light diffusion particle 22 is a light diffusion particle of the second light diffusion plate 2.

As described above, by disposing the black stripe 24 on the side of the emission plane of the second light diffusion plate 2, it is possible to improve the contrast of the video image. Also, the first light diffusion particle 15 is disposed on the incidence side of the projection light 4. The second light diffusion particle 22 is disposed on the emission side of the projection light 4. In this manner, it is possible to improve the contrast of the video image. A particle size of the first light diffusion particle 15 is smaller than that of the second light diffusion particle 22.

Second Embodiment

In the screen 100 in the first embodiment, the Brownian motion of the light diffusion particle 15 inside the microcapsule 11 is improved by utilizing the temperature rise of the screen 100 using the projection light 4. In a screen 110 in the second embodiment, by generating an electric field by applying a voltage on the screen 110, the Brownian motion of the light diffusion particle 15 is promoted. In the second embodiment, a configuration omitting the second light diffusion plate 2 described in the first embodiment will be described.

FIGS. 8 and 9 are sectional views showing configurations of screens 110, 120 in the second embodiment. The constituent that is identical to the constituent shown in FIGS. 2 to 5 is denoted by the same reference numeral, and the description thereof will be omitted.

As shown in FIG. 8, the supporting sheet 12 and the microcapsule 11 are disposed between a transparent electrode 16a and a transparent electrode 16b. The microcapsule 11 is applied on the supporting sheet 12. That is, the transparent electrodes 16a, 16b are disposed in such a manner that they sandwich the supporting sheet 12 and the microcapsule 11 from both sides in the direction of light axis of the projection light 4. A power source 17 is connected to the two electrodes 16a, 16b. The power source 17 supplies voltage to the two electrodes 16a, 16b. Then, an electric filed arises in the microcapsule 11. The light diffusion particles 15 in the second embodiment are charged in the same sign. That is, the light diffusion particles 15 are positively charged, or the light diffusion particles 15 are negatively charged. Therefore, the charged light diffusion particle 15 receives a Coulomb force. Then, the light diffusion particle 15 moves inside the microcapsule 11 in the direction of the light axis of the projection light 4. AC voltage is applied to the electrodes 16a, 16b. As a result, the light diffusion particle 15 continues moving in such a manner that it reciprocates in the direction of the light axis of the projection light 4.

As to the transparent electrode, the electrode itself may be transparent. Moreover, as to the transparent electrode, the electrode itself may not be transparent, but the line diameter of the electrode may be very small. That is, the electrode is so thin that it is translucent and allows viewing beyond the screen.

For example, it is assumed that the light diffusion particles 15 are positively charged. The electrode 16a on the side of the supporting sheet 12 is made to be positively charged. The electrode 16b on the side of the microcapsule 11 is made to be negatively charged. In this case, the light diffusion particle 15 moves inside the microcapsule 11 in the direction of the electrode 16b. However, since each light diffusion particle 15 is positively charged, they repel with each other. Therefore, the light diffusion particles 15 will not concentrate in one site. Next, the electrode 16a is made to be negatively charged. Then, the electrode 16b is made to be positively charged. In this case, the light diffusion particle 15 moves inside the microcapsule 11 in the direction of the electrode 16a.

In this manner, when an AC voltage is applied to the electrodes 16a, 16b, the light diffusion particle 15 continues reciprocating in the direction of the light axis of the screen 110. The light diffusion particles 15 inside the microcapsule 11 repel with each other. Therefore, the light diffusion particles 15 will not concentrate in one site. As a result, a scattered wave of the projection light 4 temporally changes. When the change amount and the change speed are sufficiently large, the scintillation is averaged and reduced for the viewer 9. Alternatively, for the viewer 9, the scintillation is removed.

As the result, the screen 110 is able to improve the effect of reducing the scintillation by activating the motion of the light diffusion particle 15 as well as the Brownian motion of the light diffusion particle 15. The screen 110 is also able to suppress the energy required for movement of the light diffusion particle 15. Accordingly, the screen 110 is able to reduce the scintillation by suppressing distribution unevenness of light diffusion particle over the entire screen.

Next, FIG. 9 will be described. In the screen 110 shown in FIG. 8, the supporting sheet 12 and the microcapsule 11 are disposed between the transparent electrode 16a and the transparent electrode 16b. On the other hand, in the screen 120 shown in FIG. 9, only the microcapsule 11 is disposed between the transparent electrode 16a and the transparent electrode 16b. Therefore, the microcapsule 11 is fixed onto the electrode 16a that is fixed to the supporting sheet 12. The light diffusion plate 1 is made up of the light diffusion layer 10 and the electrode 16a.

As a result, the screen 120 is able to apply an electric filed to the microcapsule 11 more directly. Therefore, by applying an AC voltage to the electrodes 16a, 16b, the screen 120 can allow the light diffusion particle 15 to move in the direction of the light axis of the projection light 4 more easily. The screen 120 is able to suppress the energy required for movement of the light diffusion particle. Further, the screen 120 is able to reduce the scintillation by suppressing the distribution unevenness of light diffusion particle over the entire screen.

Third Embodiment

Figure 10:
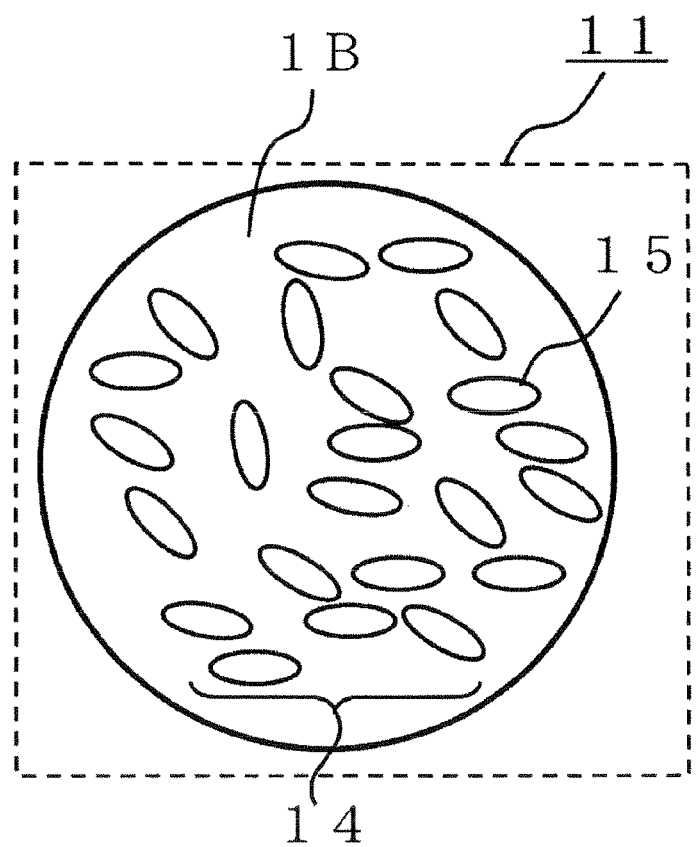
FIG. 10 is a configuration diagram showing a configuration of a microcapsule according to a third embodiment of the present invention.

In the first embodiment, the shape of the light diffusion particle 15 in the microcapsule 11 was approximately spherical. However, the light diffusion particle 15 in the third embodiment has a non-spherical shape. FIG. 10 is a configuration diagram showing a configuration of the microcapsule 11 in the third embodiment. The constituent that is identical to the constituent shown in FIG. 6 is denoted by the same reference numeral, and the description thereof will be omitted.

When the light diffusion particle 15 is spherical, it is necessary for the light diffusion particle 15 to change its position at an adequate speed in the microcapsule 11 for effectively reducing the scintillation. That is, the light diffusion particle 15 in a spherical shape needs to move fast. On the other hand, the case where the light diffusion particle 15 is in the form of a flat non-spherical shape such as, for example, a convex lens (hereinafter, referred to as a convex lens shape) as shown in FIG. 10 will be described. The light diffusion particle 15 in a convex lens shape is able to change its posture by motion of a molecule of the dispersion medium 1B without changing its position in the microcapsule 11. As a result, the angle of the light diffusion particle 15 with respect to the projection light 4 changes. The light diffusion particle 15 is able to cause a temporal change in a scattered wave without changing its position in the microcapsule 11. The motion of the dispersion medium molecule is small in an environment at low temperature. However, even in the environment at low temperature, the light diffusion particle 15 in a non-spherical shape is able to reduce the scintillation. Alternatively, even in the environment at low temperature, the light diffusion particle 15 in a non-spherical shape is able to remove the scintillation.

As a result, it is possible to suppress the energy required for movement of the light diffusion particle, and to obtain a screen with reduced scintillation by suppressing distribution unevenness of the light diffusion particle over the entire screen.

By forming the light diffusion particle 15 of a polymer, spherical and non-spherical particles can be readily prepared. Examples of the polymer include polystyrene, acryl and the like.

Fourth Embodiment

Figure 11:
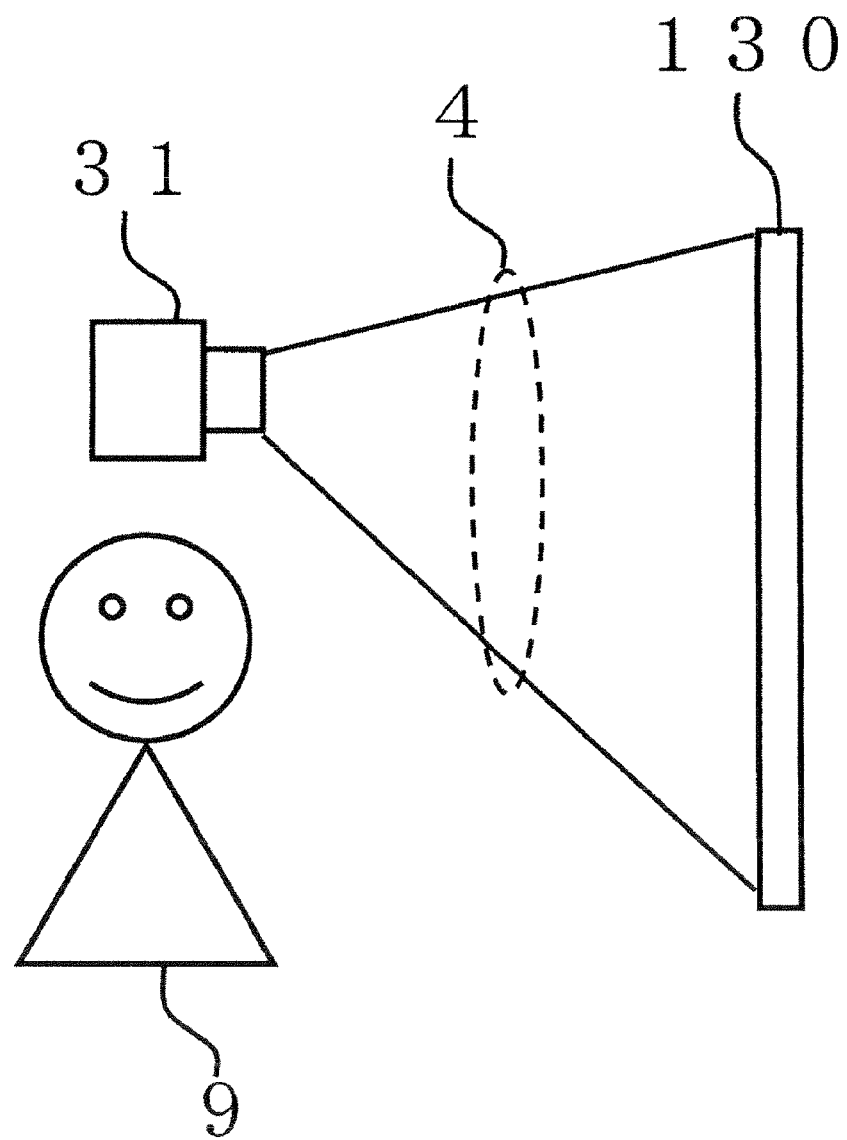
FIG. 11 is a view for explaining a positional relationship of a projector, a viewer and a screen in a display device according to a fourth embodiment of the present invention.
Figure 12:
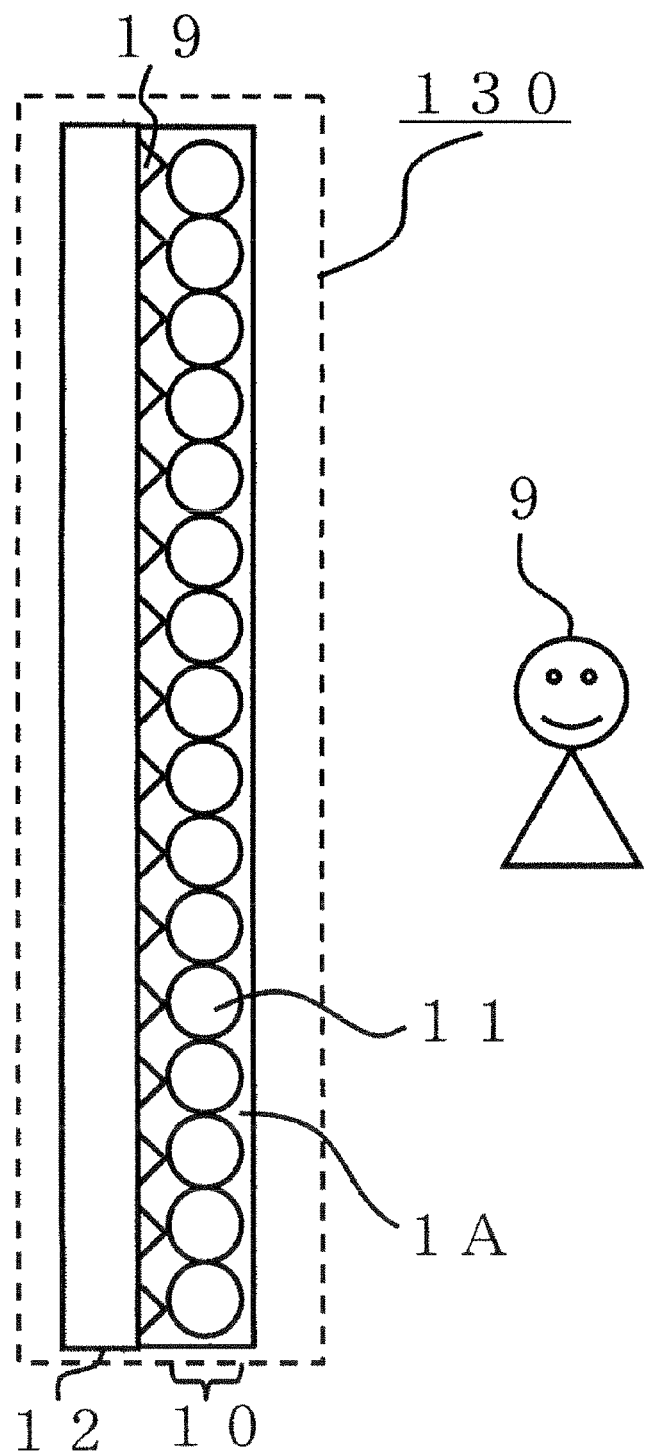
FIG. 12 is a configuration diagram showing a configuration of the screen according to the fourth embodiment of the present invention.

While a transmission type screen has been described in the first to third embodiments, a reflection type screen will be described in the fourth embodiment. FIG. 11 is a view for explaining a positional relationship of the projector 31, the viewer 9 and a reflection type screen 130. FIG. 12 is a configuration diagram showing a configuration of the screen 130. FIG. 13 is a configuration diagram showing a configuration of a screen 140. The constituent that is identical to the constituent shown in FIG. 2 and FIG. 3 is denoted by the same reference numeral, and the description thereof will be omitted.

Unlike the transmission type screen 100 shown in FIG. 2, the projection light 4 emitted from the projector 31 is reflected on the surface of the screen 130. At this time, the projection light 4 is scattered. As shown in FIG. 11, the viewer 9 is positioned on the same side of the projector 31 with respect to the screen 130. The viewer 9 is able to view the scattered light as a video image. The video image is a video image displayed on the screen 130.

In FIG. 12, the surface on the side of the viewer 9 of the supporting sheet 12 of the screen 130 is formed with a convexoconcave light diffusion part 19. The microcapsule 11 is fixed to the supporting sheet 12 on the incidence side of the projection light 4 by means of the binder material 1A. The binder material 1A is an adhesive or the like. That is, the microcapsule 11 is fixed to the plane where the light diffusion part 19 is formed in the screen 130 by means of an adhesive or the like. The screen 130 corresponds to the light diffusion plate 1 in the first embodiment.

The projection light 4 is emitted from the projector 31. And the projection light 4 is scattered when it passes through the microcapsule 11. The microcapsule 11 is provided on the incidence side of the screen 130. The projection light 4 is also scattered when it is reflected at the light diffusion part 19. The light diffusion part 19 is formed on the incidence side of the screen 130. The light ray reflected at the light diffusion part 19 is scattered again when it passes through the microcapsule 11.

The scattered light temporally changes in the microcapsule 11. Owing to this function, the scintillation is averaged and reduced. Alternatively, the scintillation is averaged and removed by this function.

The microcapsule 11 is provided on the plane on the side of the light diffusion part 19 of the screen 130. As a result, the energy required for movement of the light diffusion particle is suppressed, and the distribution unevenness of the light diffusion particle 15 over the entire screen is suppressed, and a screen with reduced scintillation can be obtained.

The transmission type screen described in the first to third embodiments is used in a rear projector that projects from the back of the screen. The transmission type screen is generally used in a projection television set or the like. Therefore, the screen is fixed to the housing of the display device 3, and used as a component of the display device 3. The display device 3 is a projection television set or the like. On the other hand, the reflection type screen described in the fourth embodiment is a projecting device such as a front projector. The front projector or the like is configured such that the projector 31 projects light from the front of the screen. The screen 130 is usually stored in a wound state in the ceiling of a meeting room or the like. As described in FIG. 12, the light diffusion part 19 of a conventional reflection type screen is formed on the surface of the supporting sheet 12. Therefore, the conventional reflection type screen can be easily stored in the wound state.

In the screen 130 described in the fourth embodiment, the microcapsule 11 is attached to a surface of a conventional screen. An adhesive or the like is used for attachment of the microcapsule 11. Therefore, it is recognized that the screen can be stored in a wound state more easily in comparison with the conventional screen to which a measure for the scintillation is taken. The conventional screen to which a measure for the scintillation is taken refers to the screen shown in Patent Document 1.

Also, as described in the second embodiment, there is employed a method of applying a voltage on the screen in addition to the Brownian motion of the light diffusion particle 15 in the microcapsule 11. The method of applying a voltage on the screen is a method of promoting the motion of the light diffusion particle 15. As shown in the screen 140 of FIG. 13, the supporting sheet 12 and the microcapsule 11 are disposed between the electrode 16a and the electrode 16b. That is, the electrodes 16a, 16b are disposed so that they sandwich the supporting sheet 12 and the microcapsule 11 attached to the supporting sheet 12 from both sides in the light axis direction of the projection light 4.

Figure 14:
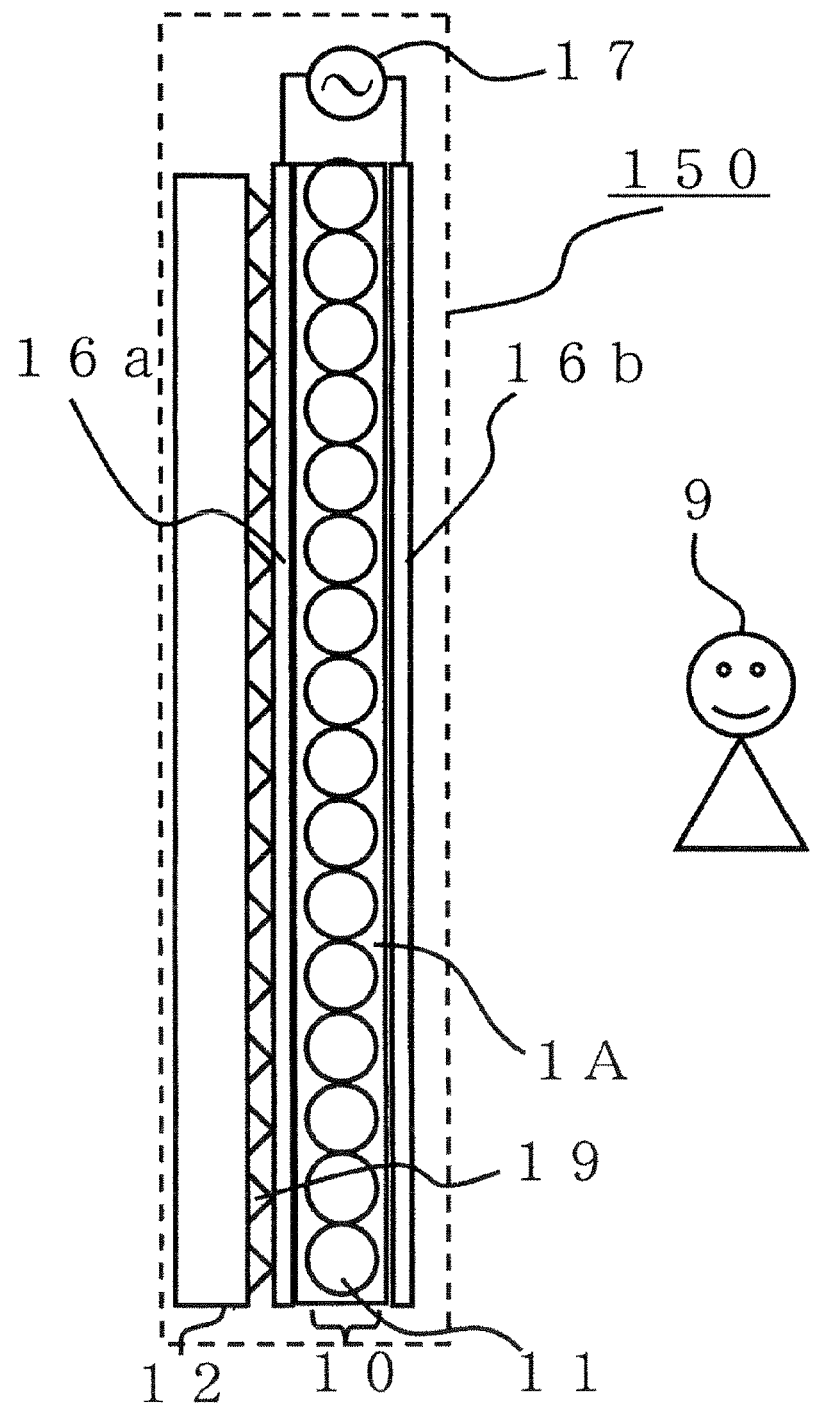
FIG. 14 is a configuration diagram showing a configuration of the screen according to the fourth embodiment of the present invention.

In this case, it is necessary that the electrode 16b disposed on the side of the microcapsule 11 is transparent. However, it is not necessary that the electrode 16a disposed on the side of the supporting sheet is transparent. Also, as described in FIG. 9 of the second embodiment, the supporting sheet 12 is not disposed between the electrode 16a and the electrode 16b, and only the microcapsule 11 is disposed between the electrode 16a and the electrode 16b. In this case, it is necessary that both of the electrodes 16a, 16b are transparent. A screen 150 shown in FIG. 14 is able to apply an electric field on the microcapsule 11 more directly. The screen 150 is able to move the light diffusion particle 15 in the direction of the light axis of the projection light 4 more easily by applying an AC voltage on the electrodes 16a, 16b.

In this case as well, similarly to the above description, by disposing the power source 17 on the ceiling side, it is possible to easily store the screens 140, 150 in the wound state.

As described above, the reflection type screen 130 has the microcapsule 11 on the surface of the screen. The reflection type screen 130 is able to reduce the scintillation by suppressing the energy required for movement of the light diffusion particle 15 and suppressing distribution unevenness of the light diffusion particle 15 over the entire screen. Also, the screens 140, 150 have the electrodes 16a, 16b. The electrodes 16a, 16b activate the motion of the light diffusion particle 15 in addition to the Brownian motion of the light diffusion particle 15. Therefore, the effect of reducing the scintillation can be improved. Also, the screens 130, 140, 150 can be easily wound and stored at the time of storage.

In the case of the reflection type screen, the screen and the projecting device are not always separate components as described above. The projecting device is a projector. As shown in paragraph 0024, FIGS. 5 and 7 in Japanese Patent Application Laid-Open No. 2003-38843 which is a patent document, a reflection type screen is used as one component of a display device in a game machine or the like.

Fifth Embodiment

In the fifth embodiment, a refractive index of an adhesive and a refractive index of the dispersion medium 1B in the microcapsule 11 will be described. The adhesive retains the microcapsule 11 on the supporting sheet 12. FIG. 15 is a view for explaining a light diffusing effect of the dispersion medium 1B and a light diffusing effect of the binder material 1A. Inside of the broken line around the microcapsule 11 represents the binder material 1A. The binder material 1A is an adhesive or the like. FIG. 16 is a characteristic chart showing a light diffusing effect of the dispersion medium 1B and a light diffusing effect of the binder material 1A. The constituent that is identical to the constituent of FIG. 2 and the constituent of FIG. 6 is denoted by the same reference numeral, and the description thereof will be omitted.

In FIG. 15, a description will be given for a refractive index of the binder material 1A denoted by $n_B$ and a refractive index of the dispersion medium 1B denoted by $n_p$. As shown in FIG. 3, the binder material 1A exists around the microcapsule 11. When the refractive indexes $n_B$, $n_p$ differ from each other, the microcapsule 11 has an effect of a lens. As shown in part (A) of FIG. 15, when the refractive index difference $(n_B-n_p)$ is a negative value, the microcapsule 11 has an effect of a convex lens. As shown in part (B) of FIG. 15, when the refractive index difference $(n_B-n_p)$ is a positive value, the microcapsule 11 has an effect of a concave lens. This effect depends on an absolute value of refractive index difference $|n_B-n_p|$ between the two. That is, depending on the selection of the material for the binder material 1A and the material for the dispersion medium 1B, the screen has a very large light diffusing effect.

When there is a light diffusing effect depending on the absolute value of refractive index difference 1 $|n_B-n_p|$, the video image displayed on the screen blurs. Then, the video image displayed on the screen is not clear. This phenomenon is irrelevant to presence or absence of scattering by the light diffusion particle 15 in the microcapsule 11. The absolute value of refractive index difference $|n_B-n_p|$ is an absolute value of refractive index difference between the binder material 1A and the dispersion medium 1B. On the other hand, scattering of the projection light 4 by the light diffusion particle 15 causes a phenomenon that the video image blurs. The phenomenon that the video image blurs means a phenomenon that the video image is not clear. The phenomenon that the video image blurs is a phenomenon similar to the refractive index difference $|n_B-n_p|$. However, scattering of the projection light 4 by the light diffusion particle 15 has an effect of suppressing the scintillation. Therefore, the light diffusing effect by the absolute value of refractive index difference $|n_B-n_p|$ is made smaller. This is because the absolute value of refractive index difference $|n_B-n_p|$ includes no temporally changing factor of the scattering of the projection light 4. In other words, the absolute value of refractive index difference $|n_B-n_p|$ does not have an effect of suppressing the scintillation. On the other hand, the light diffusing effect of the projection light 4 by the light diffusion particle 15 has an effect of suppressing the scintillation. Therefore, the light diffusing effect of the projection light 4 by the light diffusion particle 15 is made larger. As a result, the phenomenon that the video image blurs can be suppressed, and the scintillation can be suppressed effectively.

A range of the refractive index difference $|n_B-n_p|$ between the binder material 1A and the dispersion medium 1B will be concretely described. FIG. 16 is a view showing a relationship between a refractive index difference $(n_B-n_p)$ and a haze value (cloudiness value). The horizontal axis represents refractive index difference $(n_B-n_p)$, and the vertical axis represents haze value. A haze value is a rate of diffused transmitted light to the entire transmitted light when a film is radiated with visible light. As the haze value decreases, the transparency of the film increases. As described above, a haze value is a value representing the degree of cloudiness of a film or the like, and is generally used as an amount quantitatively showing the light diffusing effect of the light diffusion particle 15.

In FIG. 16, when the value of the absolute value of refractive index difference $|n_B-n_p|$ is zero, the haze value is minimal. The haze value is about 43%. This haze value indicates the light diffusing effect only by the light diffusion particle 15. Here, the light diffusing effect is influenced by the capsule membrane. However, the influence is not taken into account because it is very small. As the absolute value of refractive index difference $|n_B-n_p|$ increases, the lens effect by the microcapsule 11 increases. The haze value increases rapidly. When the absolute value of refractive index difference $|n_B-n_p|$ is 0.05, the haze value is about 80%. When the absolute value of refractive index difference $|n_B-n_p|$ is 0.05 or more, an increase in the haze value is blunted, and the haze value converges to about 88%. From these facts, it is desired to suppress the light diffusing effect by the refractive index difference while increasing the light diffusing effect of the light diffusion particle 15. Preferably, the absolute value of refractive index difference $|n_B-n_p|$ satisfies the following conditional mathematical formula (1). The absolute value of refractive index difference $|n_B-n_p|$ is an absolute value of refractive index difference between the refractive index $n_B$ of the binder material 1A and the refractive index $n_P$ of the dispersion medium 1B.

[Mathematical formula 1]

$$|n_B - n_P| \leq 0.05 \quad (1)$$

As described above, the absolute value of refractive index difference $|n_B-n_P|$ is made small, preferably to satisfy $n_B-n_P \leq 0.05$. In this way, the light diffusing effect by the absolute value of refractive index difference $|n_B-n_P|$ is decreased, and the phenomenon that the video image blurs is suppressed. The absolute value of refractive index difference $|n_B-n_P|$ does not have an effect of suppressing the scintillation. On the other hand, by increasing the light diffusing effect of the projection light 4 by the light diffusion particle 15, it is possible to suppress the scintillation effectively. The light diffusion particle 15 has an effect of reducing the scintillation. From the above, the energy required for movement of the light diffusion particle 15 is suppressed, and the distribution unevenness of the light diffusion particle 15 over the entire screen is suppressed, and a screen with reduced scintillation can be obtained.

Sixth Embodiment

In the first embodiment and the second embodiment, the light diffusion particles 15 having substantially the same particle size were used, and the charge amount was also uniform. In the sixth embodiment, the light diffusion particles 15 having non-uniform particle sizes are used, and the light diffusion particles 15 having non-uniform charge amounts are used. FIG. 17 to FIG. 24 are configuration diagrams showing a configuration of a microcapsule. The constituent that is identical to the constituent of FIG. 6 and constituent of FIG. 10 is denoted by the same reference numeral, and the description thereof will be omitted.

In FIG. 17, the microcapsule 11 is appropriately spherical. The microcapsule 11 is made up of the capsule membrane 13, the dispersion medium 1B and light diffusion particles 15a, 15b. In the microcapsule 11, the dispersion medium 1B and the light diffusion particles 15a, 15b are contained. The dispersion liquid 14 is made up of the dispersion medium 1B and the light diffusion particles 15a, 15b. The light diffusion particles 15a, 15b are approximately spherical, and particle sizes of the light diffusion particles 15a, 15b are not uniform. When the particle size of the light diffusion particle 15 is uniform, the speed at which the light diffusion particles 15 moves, for example, by the Brownian motion is substantially uniform. However, when the particle sizes of the light diffusion particles 15 are non-uniform, the moving speed of the light diffusion particle 15a having a larger particle size is slower. And the moving speed of the light diffusion particle 15b having a smaller particle size is faster. The light diffusion particle 15 refers to the light diffusion particle 15a and the light diffusion particle 15b collectively.

When every light diffusion particle 15 in the microcapsule 11 makes the same motion, change in scattered light by the light diffusion particle 15 is small. However, when the light diffusion particle 15 makes random motion, the amount of change in the scintillation pattern becomes large, and an effective scintillation reducing effect is expected. Since the particle sizes of the light diffusion particles 15 are not uniform, a difference arises in the moving speed of the light diffusion particle 15. The random degree of the motion of the light diffusion particle 15 is improved, so that the scintillation can be further reduced.

Figure 18:
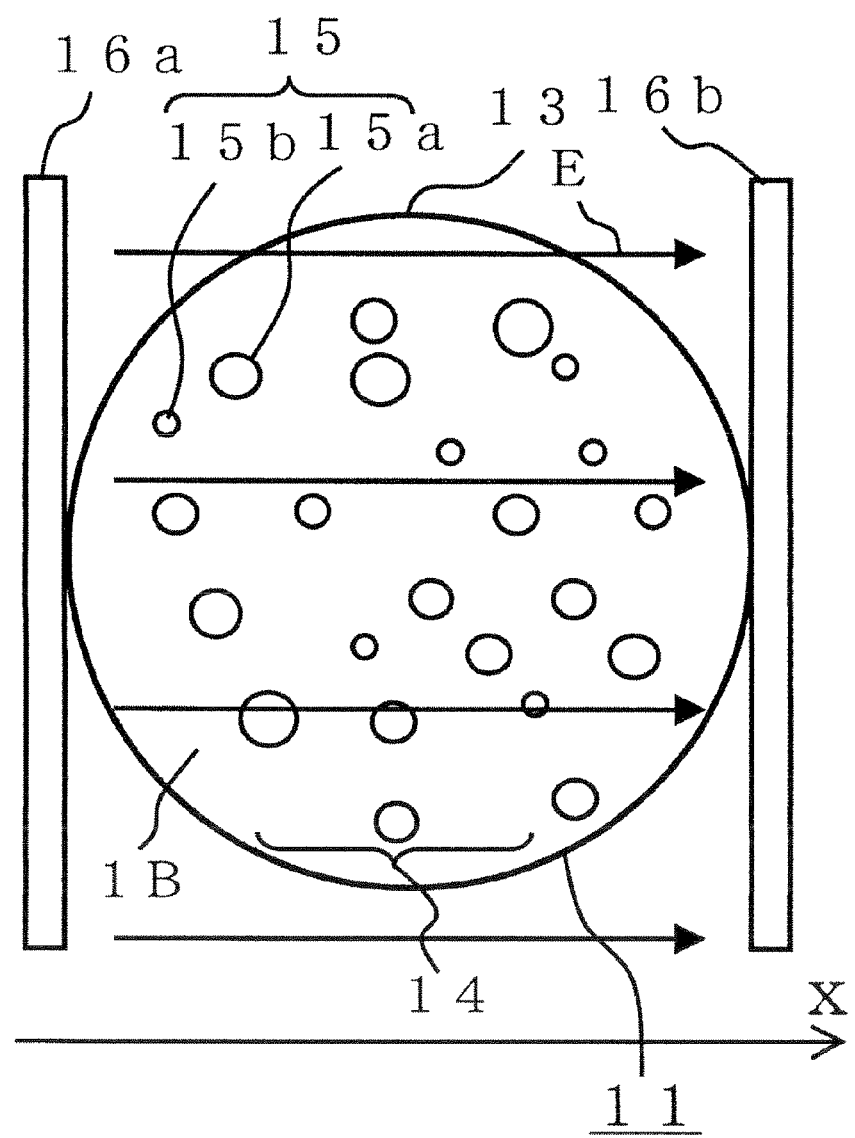
FIG. 18 is a configuration diagram showing a configuration of a microcapsule of the screen according to the sixth embodiment of the present invention.

Next, a description will be made for the case where the light diffusion particles 15 are charged in the same charge likewise the second embodiment, and an AC voltage is applied to the electrode 16. As shown in FIG. 18, when a DC electric field E is generated in the x-axis direction, a moving speed V of the light diffusion particle 15 in the condition that the viscosity resistance equals the Coulomb force can be represented by the following mathematical formula (2). Here, electric field is denoted by E, charge amount of light diffusion particle is denoted by q, radius of particle is denoted by a, and viscosity of dispersion medium is denoted by η.

[Mathematical formula 2]

$$V = \frac{qE}{6\pi\eta a} \quad (2)$$

From this Mathematical formula (2), it can be seen that the moving speed V changes with the dimension of the radius a of the light diffusion particle 15. Since the particle sizes of the light diffusion particles 15 are not uniform, each of the light diffusion particle 15 moves at a different moving speed V.

The most effective motion of the light diffusion particle 15 for removing the scintillation is random motion at a large speed. In other words, removal of the scintillation is achieved by change in the scintillation pattern. When the particle moves at a large speed, the scintillation pattern changes too fast to be recognized by human eyes. Therefore, it is possible to reduce the scintillation effectively.

As shown in FIG. 18, the light diffusion particles 15 having non-uniform particle sizes are charged in the same charge, to generate an electric field E. As a result, the motion of the light diffusion particle 15 is more random and faster than the motion of the light diffusion particle 15 by the Brownian motion. Therefore, by applying an AC voltage to the electrode 16, the scintillation pattern changes faster, and the scintillation reducing effect can be improved.

Figure 19:
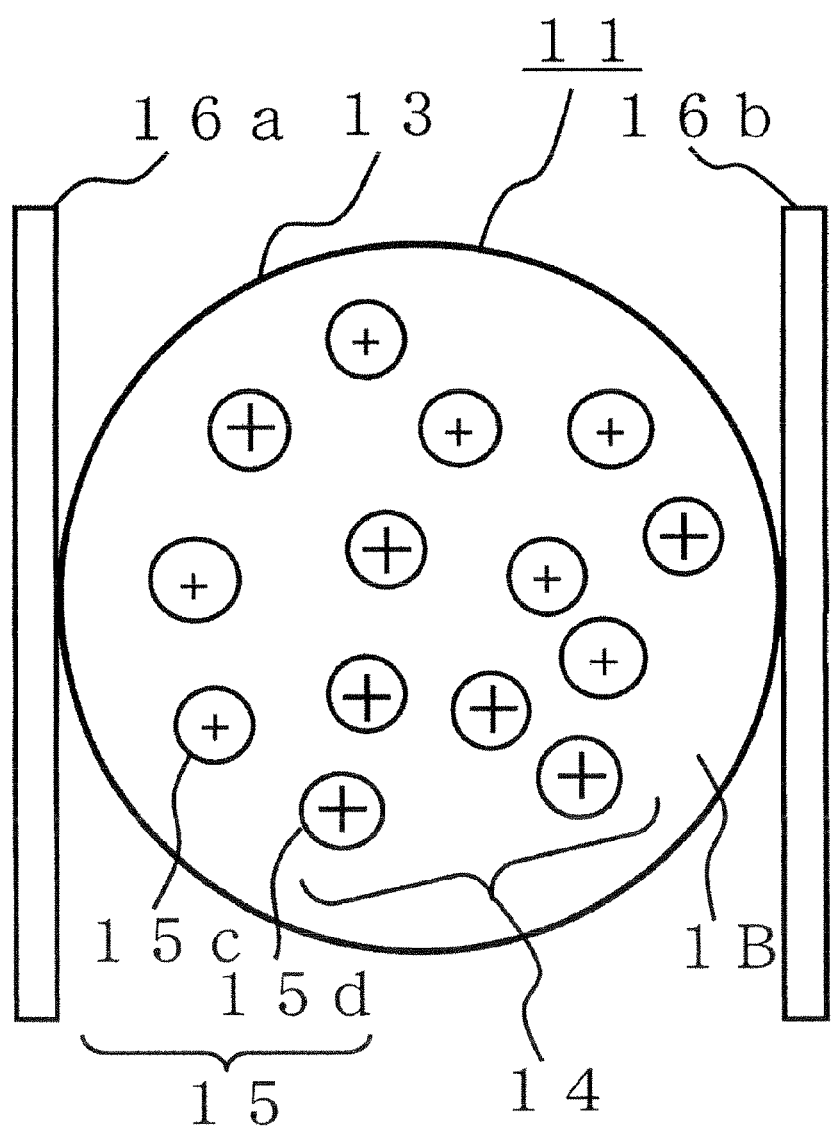
FIG. 19 is a configuration diagram showing a configuration of a microcapsule of the screen according to the sixth embodiment of the present invention.

FIG. 19 is a view showing the microcapsule 11 in which the light diffusion particle 15 having a uniform particle size is charged with a non-uniform charge amount q. In FIG. 19, the large + sign represents a large charge amount. The small + sign represents a small charge amount. From the mathematical formula (2), it can be seen that it is also effective not to make the charge amount q of the light diffusion particle 15 uniform for changing the moving speed V of the light diffusion particle 15. It is possible to provide difference in the moving speed of the light diffusion particle 15 even when the particle size of the light diffusion particle 15 is uniform.

Figure 20:
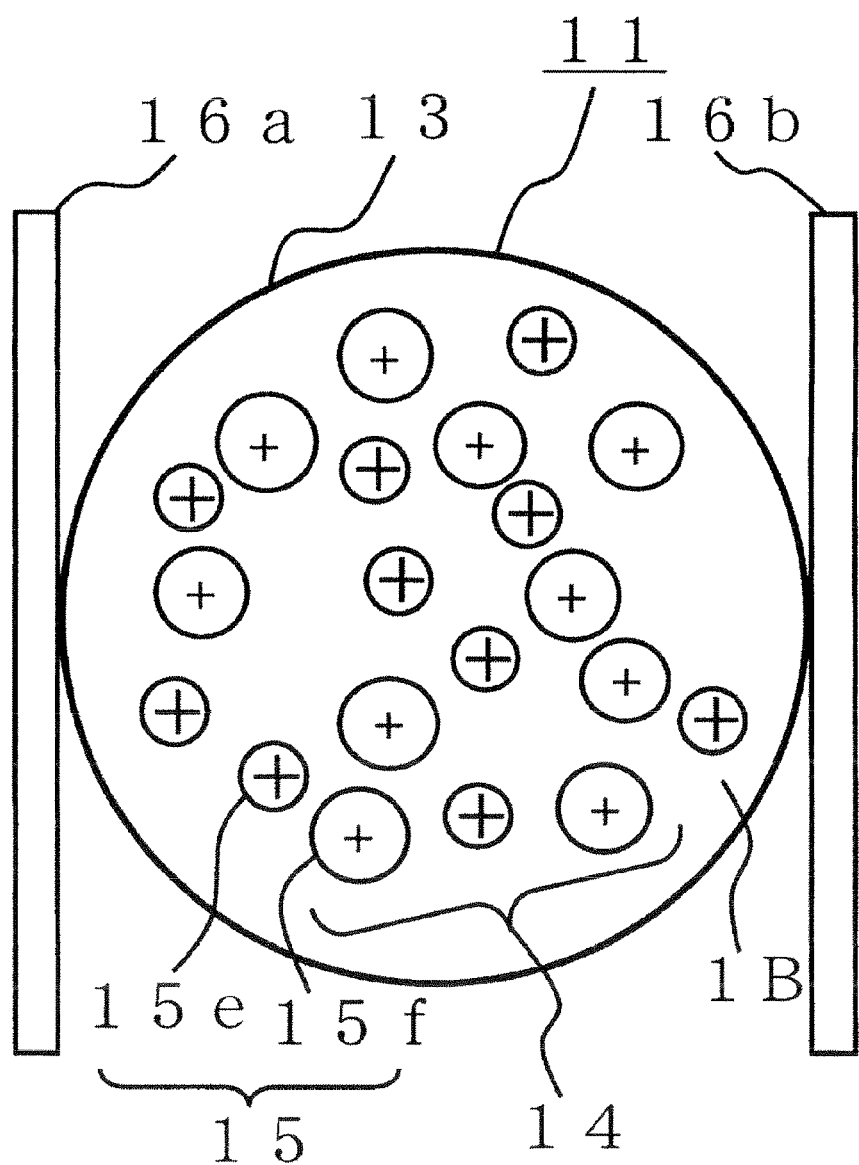
FIG. 20 is a configuration diagram showing a configuration of a microcapsule of the screen according to the sixth embodiment of the present invention.

FIG. 20 shows the microcapsule 11 in which the light diffusion particle 15 having a non-uniform particle size is charged with a non-uniform charge amount q. In FIG. 20, the large + sign represents a large charge amount. The small + sign represents a small charge amount. When the particle size of the light diffusion particle 15 is not uniform, a light diffusion particle 15e having a small particle size is charged with a large charge. And a light diffusion particle 15f having a large particle size is charged with a small charge. As a result, it is possible to make the difference in the moving speed of the light diffusion particle 15 large.

Figure 21:
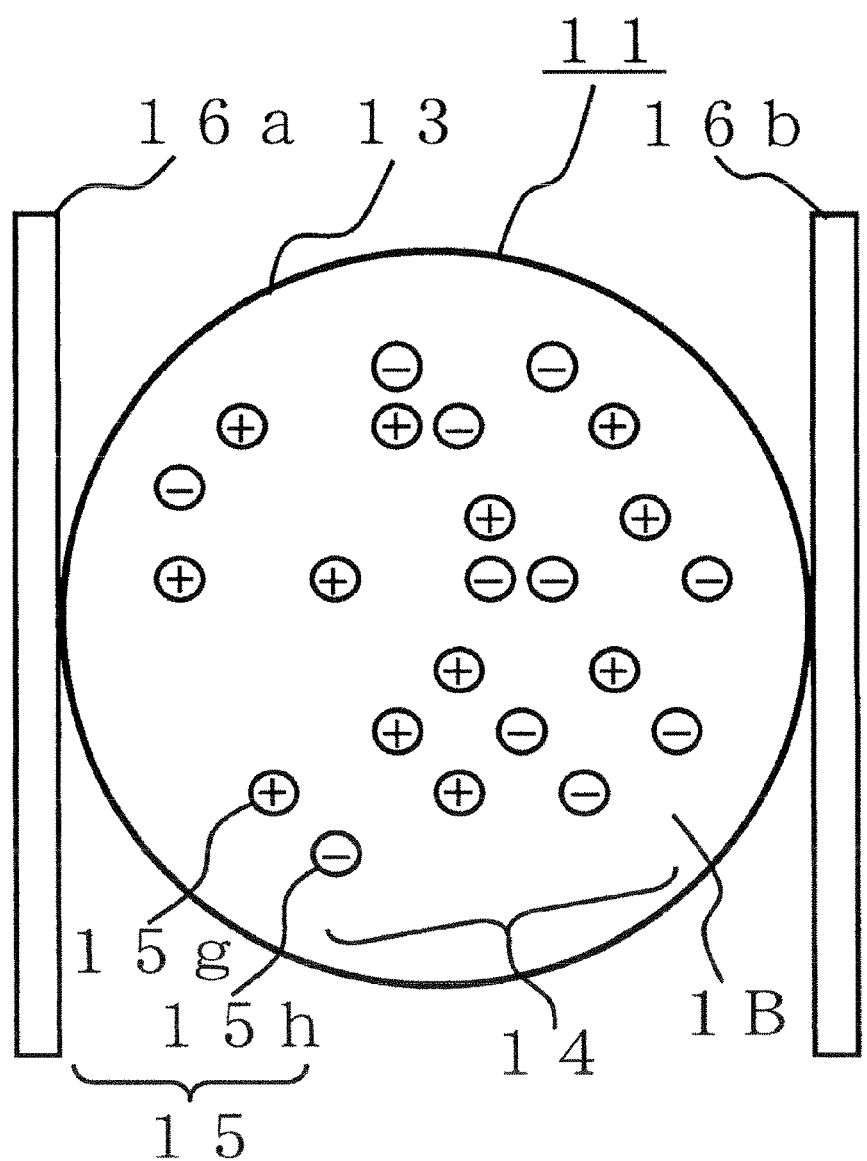
FIG. 21 is a configuration diagram showing a configuration of a microcapsule of the screen according to the sixth embodiment of the present invention.

Also, as shown in FIG. 21, the particle size of the light diffusion particle 15 in the microcapsule 11 is made uniform. About half of the particles are positively charged, and the remaining particles are negatively charged. The number of the positive particles is substantially the same with the number of the negative particles. In this case, a dispersant is added. The dispersant separates between a light diffusion particle 15g and a light diffusion particle 15h. The light diffusion particle 15g is positively charged. The light diffusion particle 15h is negatively charged. Each of the light diffusion particles 15g, 15h does not aggregate. Some dispersants retain appropriate space by electric repulsion or steric hindrance. The dispersant used herein has an affinity group for the light diffusion particles 15g, 15h, and has a chain having compatibility for the dispersion medium. The dispersant has a function of steric hindrance.

With this configuration, when a voltage applied to the electrode 16, the number of the light diffusion particles 15 traveling toward the electrode 16a is approximately the same with the number of the light diffusion particles 15 traveling toward the electrode 16b. Therefore, in comparison with the case where every light diffusion particle 15 moves in the same direction, the random degree of the motion of the light diffusion particle 15 is improved. As a result, the change amount of the scintillation pattern becomes large, and the scintillation reducing effect can be improved.

Figure 22:
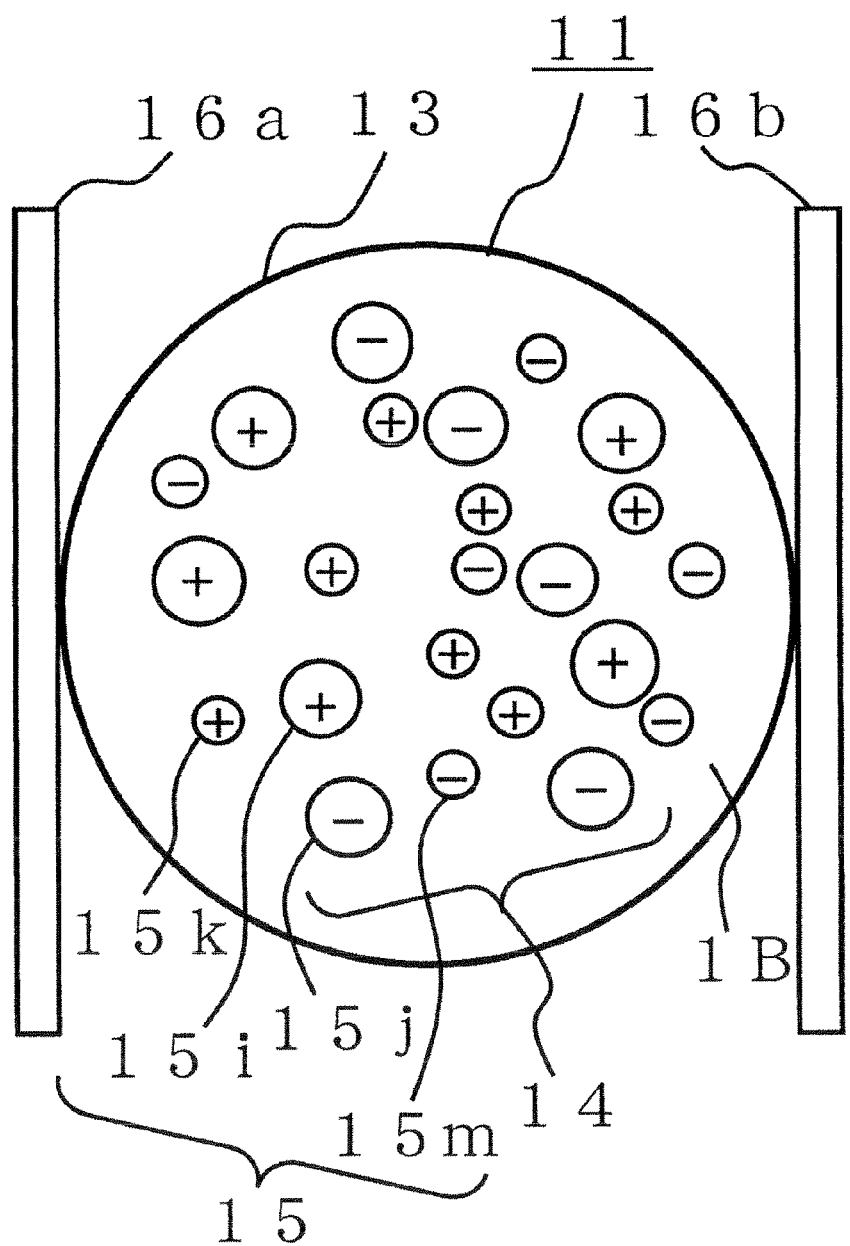
FIG. 22 is a configuration diagram showing a configuration of a microcapsule of the screen according to the sixth embodiment of the present invention.

FIG. 22 is a view showing the microcapsule 11. The particle size of the light diffusion particle 15 in the microcapsule 11 is not uniform, and about half of the particles are positively charged, and the remaining particles are negatively charged. The number of the positively charged particles is substantially the same with the number of the negatively charged particles. In FIG. 22, in the microcapsule 11, a positively charged large particle 15i is contained, a negatively charged large particle 15j is contained, a positively charged small particle 15k is contained, and a negatively charged small particle 15m is contained. The numbers of the light diffusion particles 15i, 15j, 15k, 15m are substantially the same.

Figure 23:
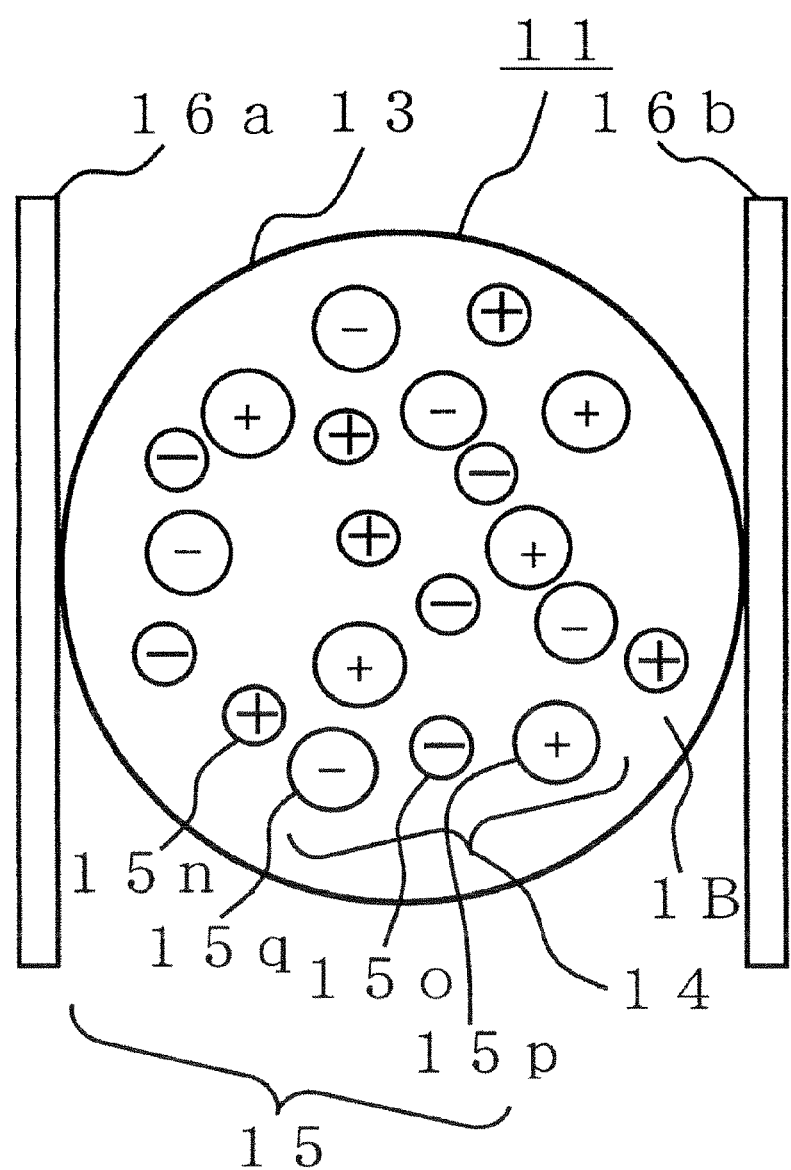
FIG. 23 is a configuration diagram showing a configuration of a microcapsule of the screen according to the sixth embodiment of the present invention.

FIG. 23 shows the microcapsule 11 using both the non-uniform particle size and the non-uniform charge amount. The charge amount of a large particle is small, and the charge amount of a small particle is large. In FIG. 23, in the microcapsule 11, a positively charged large particle 15p is contained, a negatively charged large particle 15q is contained, a positively charged small particle 15n is contained, and a negatively charged small particle 15o is contained. The numbers of the light diffusion particles 15p, 15q, 15n, 15o are substantially the same. By using both the non-uniform particle size and the non-uniform charge amount, it is possible to further improve the scintillation reducing effect.

Figure 24:
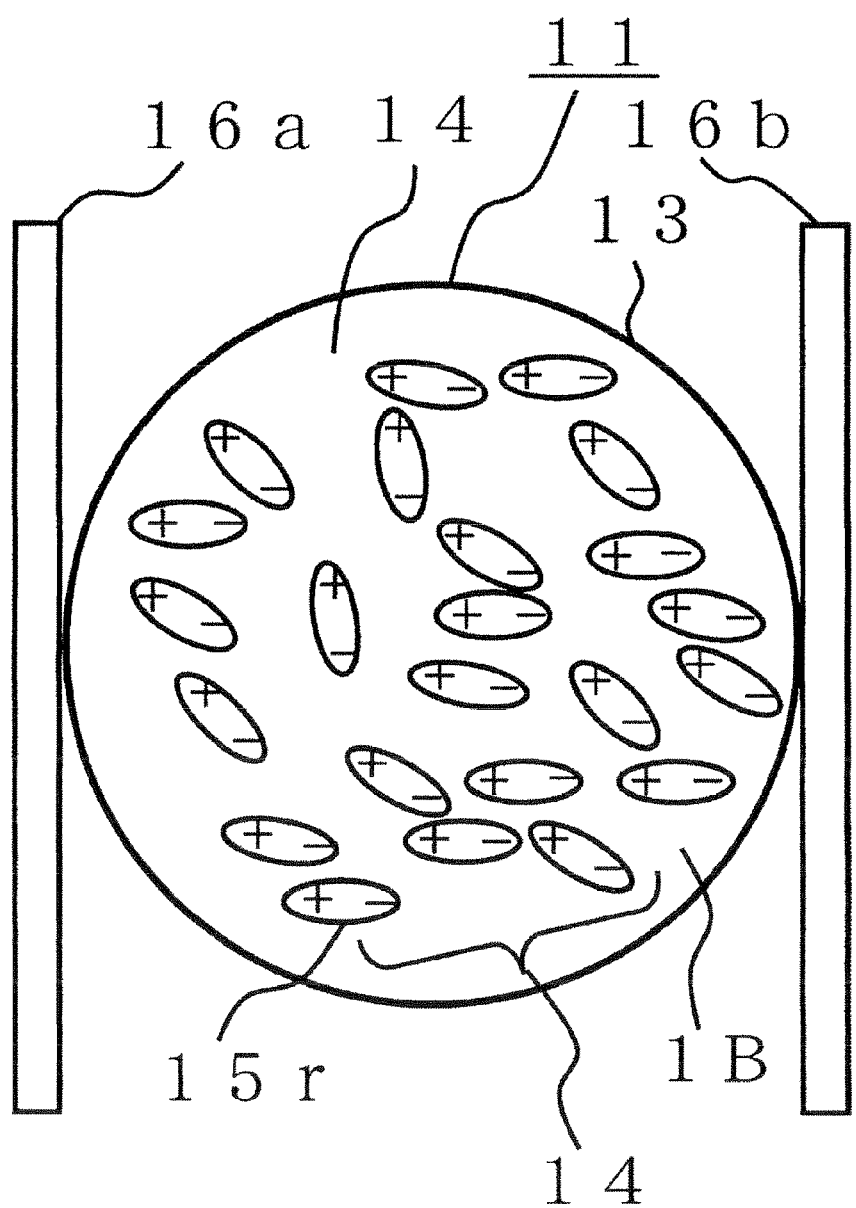
FIG. 24 is a configuration diagram showing a configuration of a microcapsule of the screen according to the sixth embodiment of the present invention.

Also, as shown in FIG. 24, a light diffusion particle 15r has a shape similar to that of the light diffusion particle 15 in the third embodiment. For example, the light diffusion particle 15r is in a flat spherical, sheet-like, or rod-like shape. The flat spherical shape is like a convex lens. The light diffusion particle 15r is positively charged at one end, and negatively charged at the other end. As described above, the dispersant separates between the light diffusion particles 15. Therefore, the light diffusion particles 15 will not bind and aggregate. When an AC voltage is applied to the electrode 16, the light diffusion particle 15r rotates on the spot. This has an effect similar to that of the case described in the third embodiment. However, the light diffusion particle 15r is able to rotate faster, compared with the Brownian motion. Therefore, the scintillation reducing effect becomes much larger.

In other words, a change in the angle of the light diffusion particle 15r with respect to the projection light 4 occurs. The light diffusion particle 15r causes a temporal change in the scattered wave without moving in the microcapsule 11. In an environment at low temperature, a movement of a molecule of the dispersion medium 1B is small. Therefore, even in an environment at low temperature, for example, the screen realizes the effect of reducing the scintillation. Alternatively, the screen is able to obtain the effect of removing the scintillation.

In the manner as described above, the energy required for movement of the light diffusion particle 15r is suppressed, and distribution unevenness of the light diffusion particle 15r over the entire screen is suppressed, so that a screen with reduced scintillation can be obtained.

As described above, it is possible to suppress the scintillation effectively by not making the particle size of the light diffusion particle 15 uniform. It is possible to suppress the scintillation effectively by not making the charge amount of the light diffusion particle 15 uniform. Also, it becomes possible to reduce the scintillation effectively by mixing positive particles and negative particles. About half of the particles are positively charged and the remaining half of the particles are negatively charged. Also, it becomes possible to reduce the scintillation effectively by making one particle have both positive and negative charges. One end of the light diffusion particle 15 is positively charged and the other end is negatively charged. In the manner as described above, the energy required for movement of the light diffusion particle is suppressed, and distribution unevenness of the light diffusion particle over the entire screen is suppressed, so that a screen with reduced scintillation can be obtained.

Seventh embodiment

In the second embodiment, it has been shown that the light diffusion particle 15 continues moving reciprocally in the direction of the light axis upon application of an AC voltage to the electrodes 16a, 16b. In the seventh embodiment, a detailed description will be made for the temporal change in the voltage applied to the electrode 16. Part (A) of FIG. 25 shows voltage waveforms in the cases where the temporal change in voltage are a rectangular wave and a sine wave. Part (B) of FIG. 25 shows a moving speed of the light diffusion particle 15 in correspondence with the temporal change in voltage in part (A) of FIG. 25. The solid line in part (B) of FIG. 25 represents a particle speed when the voltage represented by the solid line in part (A) of FIG. 25 is applied. In other words, the voltage is applied in a rectangular wave form. The broken line in part (B) of FIG. 25 represents a particle speed when the voltage represented by the broken line in part (A) of FIG. 25 is applied. In other words, the voltage is applied in a sine wave form. The vertical axis of part (A) of FIG. 25 represents voltage [V] applied to the electrode 16, and the horizontal axis represents time [msec]. The vertical axis of part (B) of FIG. 25 represents moving speed [μm/sec] of the light diffusion particle 15, and the horizontal axis represents time [msec].

As shown in part (B) of FIG. 25, as for the moving speed of the light diffusion particle 15 corresponding to the temporal change in voltage, the moving speed of the particle becomes constant in a shorter time by the rectangular wave. In the sine wave, the moving speed of the particle approximates a sine wave. As for the moving speed of the light diffusion particle 15, the change in the moving speed becomes a form approximate to a rectangular wave by the voltage of the rectangular wave. In other words, in the moving speed of the light diffusion particle 15, when a voltage of a rectangular wave is applied, the moving speed of the particle becomes constant in a short time. As for the moving speed of the light diffusion particle 15, the change in the moving speed becomes a form approximate to a sine wave by the voltage of the sine wave. From the foregoing, in a sine wave, at the time of reversion of the sign of the voltage, the moving speed of the light diffusion particle 15 decreases, and hence the absolute value of the moving speed becomes small. In other words, in association with the decrease in the moving speed of the light diffusion particle 15, the change in the scintillation pattern becomes slow. Therefore, the scintillation is easily recognized by the viewer 9. Next, the case where the voltage waveform is a rectangular wave will be discussed. Upon reversion of the sign of the voltage, the light diffusion particle 15 starts moving in the opposite direction. However, the absolute value of the particle speed of the light diffusion particle 15 peaks in a short time. Accordingly, the scintillation pattern changes fast in terms of time. The scintillation is difficult to be recognized by the viewer 9 even when the sign of the voltage changes.

By applying a voltage of a rectangular wave to the electrodes 16a, 16b, the light diffusion particle 15 is able to move while suppressing the decrease in the speed at the time of reversion. As a result, the scintillation is difficult to be recognized by the viewer 9 even when the traveling direction of the light diffusion particle 15 changes. In the manner as described above, the energy required for movement of the light diffusion particle 15 is suppressed, and distribution unevenness of the light diffusion particle 15 over the entire screen is suppressed, so that a screen with reduced scintillation can be obtained.

Eighth embodiment

In the eighth embodiment, a temporal change in the voltage applied to the electrodes 16a, 16b will be described. At the time of reversion of the voltage, the moving speed of the light diffusion particle 15 decreases. In the seventh embodiment, description has been made for the temporal change in voltage that shortens the time in which the moving speed of the light diffusion particle 15 decreases. In the eighth embodiment, a method of further shortening this time will be described. Part (A) of FIG. 26 shows a temporal change in the voltage proposed in the eighth embodiment. Part (B) of FIG. 26 shows a temporal change in the moving speed of the light diffusion particle 15 corresponding to part (A) of FIG. 26. Part 26(B) of FIG. 26 represents the case of the voltage waveform shown in part (A) of FIG. 26 by a solid line. Also, the case of the rectangular waveform shown in the seventh embodiment is represented by a broken line. The vertical axis of part (A) of FIG. 26 represents voltage [V] applied to the electrode 16. The horizontal axis represents time [msec]. The vertical axis of part (B) of FIG. 26 represents moving speed [µm/sec] of the light diffusion particle 15. The horizontal axis represents time [msec].

As shown in part (A) of FIG. 26, a large voltage is applied so that the absolute value of the voltage temporarily has a maximum value at the time of reversion of the voltage. In other words, the voltage is applied alternately in the positive direction and the negative direction. For example, the period when the voltage is applied in the positive direction will be discussed. The voltage is set to be maximum when the direction of the applied voltage is reversed to the positive direction. In part (A) of FIG. 26, the applied voltage at this time is about 130 [V]. The usual applied voltage is 50 [V]. At this time, it is most effective to apply the largest voltage. That is, it is most effective to apply the largest possible voltage. As a result, the temporal change in the moving speed of the light diffusion particle 15 becomes a waveform as represented by the solid line in part (B) of FIG. 26. The waveform represented by the broken line shows the case where the voltage is applied in a rectangular wave shown in the seventh embodiment. In comparison with the waveform of the broken line, the waveform of the solid line shows that the speed of the particle of the light diffusion particle 15 is reversed in a short time. The waveform of the solid line shows that the speed of the particle of the light diffusion particle 15 reaches the peak speed in a short time.

A large voltage is applied so that the absolute value of the voltage temporarily has a maximum value at the time of reversion of the applied voltage. The maximum value refers to the largest value within the range of the applied voltage. In the seventh embodiment, the scintillation that is likely to occur at the time of reversion of the applied voltage has been described. The situation where the scintillation is easily recognized can be made to last in a shorter time. In other words, it is possible to speed up the scintillation pattern change. As a result, even at the time of reversion of the voltage, the scintillation is difficult to be recognized by the viewer 9. Accordingly, the energy required for movement of the light diffusion particle 15 is suppressed, and distribution unevenness of the light diffusion particle 15 over the entire screen is suppressed, so that a screen with reduced scintillation can be obtained.

Ninth Embodiment

In the ninth embodiment, a field sequential system is employed as a color display format of a video signal. The voltage is applied to the electrode 16. In the ninth embodiment, a timing of reversion of the applied voltage will be described.

The field sequential system is a system that displays a desired color by displaying a color display format of a video signal by temporally dividing into RGB. R represents red, G represents green, and B represents blue. On the other hand, the scintillations of red R and blue B are difficult to be recognized, in comparison with green G. In other words, the scintillation of green G is more easily recognized than those of the other colors.

Fig. 27 is a view showing a timing of switching the polarity of the electrodes 16a, 16b. Part (A) of FIG. 27 shows a timing of switching the polarity of the electrodes 16a, 16b for the times when red R, blue B and green G are displayed. In part (A) of FIG. 27, the horizontal axis represents time [msec], and the vertical axis represents voltage [V] applied to the electrodes 16a, 16b. Part (B) of FIG. 27 shows time ranges for displaying respective colors given for ease of understanding. In part (B) of FIG. 27, the horizontal axis represents time [msec]. Time B represents a time when red R and blue B are displayed.

Figure 28:
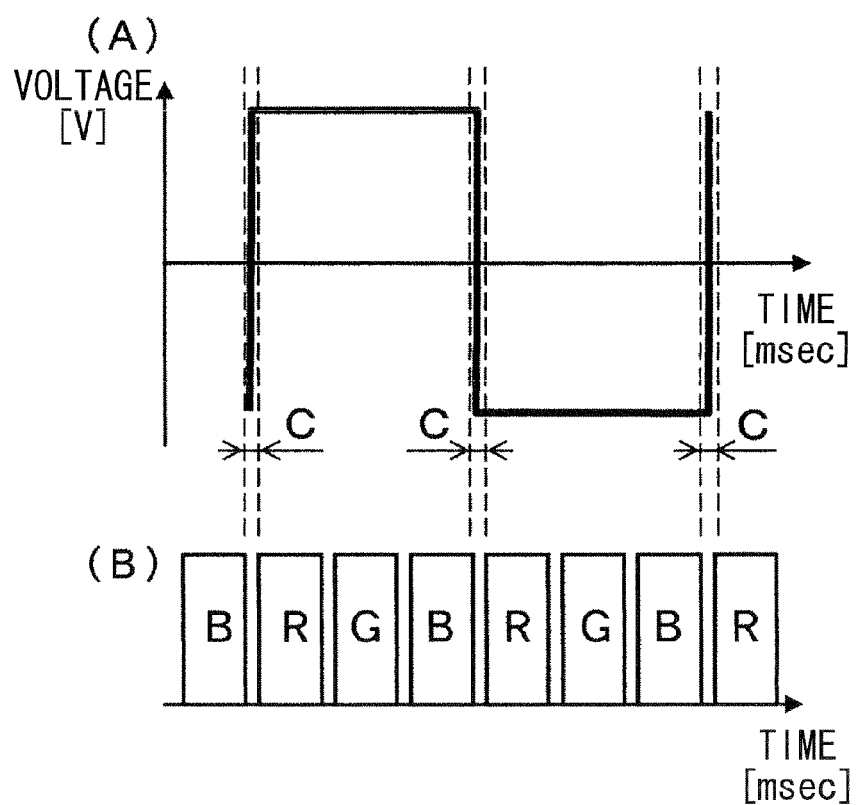
FIG. 28 is a view showing a temporal change in a voltage applied to the electrode of the screen according to the ninth embodiment of the present invention.

As shown in FIG. 27, the applied voltage is reversed in the timing when an image of red R or blue B is displayed. This is because the scintillation of red R and blue B is difficult to be recognized. As a result, the situation that the viewer 9 easily recognizes the scintillation due to decrease in the moving speed of the light diffusion particle 15 can be prevented. Reversion of the applied voltage may be executed in the timing when no color is displayed. FIG. 28 is a view showing a timing of switching the polarity of the electrodes 16a, 16b. Part (A) of FIG. 28 shows a timing of switching the polarity of the electrodes 16a, 16b for the times when red R, blue B and green G are displayed. In part (A) of FIG. 28, the horizontal axis represents time [msec], and the vertical axis represents voltage [V] applied to the electrodes 16a, 16b. Part (B) of FIG. 28 shows time ranges for displaying respective colors provided for ease of understanding. In part (B) of FIG. 28, the horizontal axis represents time [msec]. The field sequential system is a system for sequentially displaying images of three colors. Therefore, in the field sequential system, there is a time when no video image is displayed between each images. Time C is a time where non video image is displayed. In this manner, the situation that the viewer 9 easily recognizes the scintillation due to decrease in the moving speed of the light diffusion particle 15 can be prevented.

From the above, the energy required for movement of the light diffusion particle 15 is suppressed, and distribution unevenness of the light diffusion particle 15 over the entire screen is suppressed, so that a screen with reduced scintillation that is recognizable by the viewer 9 can be obtained.

Tenth Embodiment

A video image display system shown in the tenth embodiment is a laser scan system. In the tenth embodiment, a timing of reversion of the voltage applied to the electrode 16 will be described.

Figure 29:
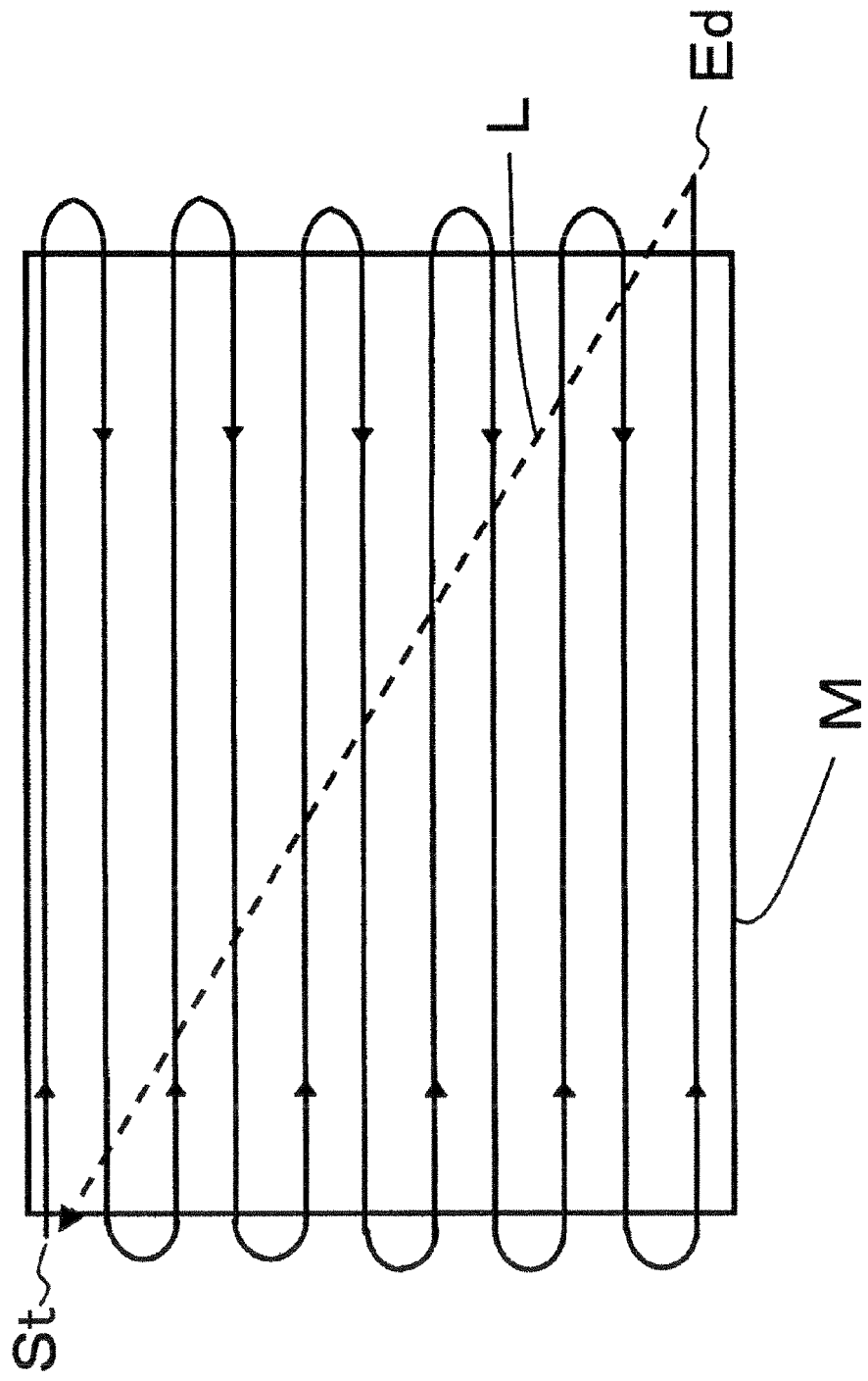
FIG. 29 is a view for explaining a method of scanning laser light on a screen according to a tenth embodiment of the present invention.

The laser scan system is a system that displays a video image by adjusting laser light to a brightness level of a video signal, and raster scanning a drawing region M on the screen with laser light as shown in FIG. 29. As shown in FIG. 29, in the laser scan system, the drawing region M on the screen is raster scanned with laser light. At this time, the light amount of the laser beam is adjusted to the brightness level of the video signal. In this manner, the video image is displayed on the screen. The raster scanning scans a horizontal scanning line at high speed from the upper left to the lower right of the screen. The raster scanning is used as a scanning system in a number of displays for computers. In FIG. 29, the scanning direction of the laser light is represented by a line with an arrow. The laser light scans by reciprocal motion in the horizontal direction of the drawing region M. This scan is conducted from a scan start position St on the upper side toward a drawing end position Ed on the lower side. The vertical direction and the horizontal direction are directions shown in FIG. 29.

In this system, the laser light scans the entire drawing region M from the scan start position St. Thereafter, the laser light returns to the start position St again. Then, the laser light starts scanning. Therefore, during the period of a flyback period L represented by the broken line in FIG. 29, no video image is displayed on the screen. The flyback period L is a period of returning to the start position St from the drawing end position Ed. During this flyback period L, an applied voltage is reversed. As a result, the situation that the viewer 9 easily recognizes the scintillation due to decrease in the moving speed of the light diffusion particle 15 can be prevented.

From the above, the energy required for movement of the light diffusion particle 15 is suppressed, and distribution unevenness of the light diffusion particle 15 over the entire screen is suppressed, so that a screen with reduced scintillation can be obtained.

Eleventh Embodiment

Figure 30:
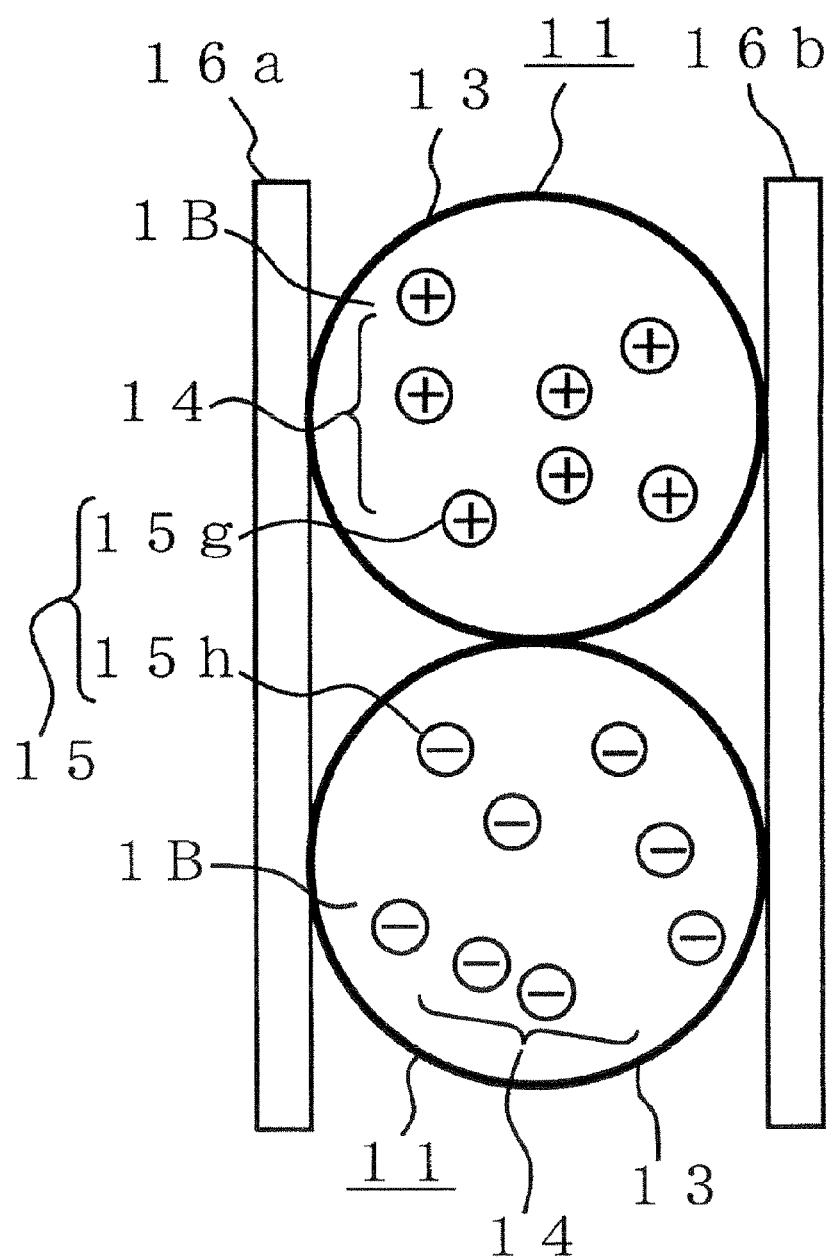
FIG. 30 is a configuration diagram showing a configuration of a microcapsule of a screen according to an eleventh embodiment of the present invention.

In the eleventh embodiment, as shown in FIG. 30, the charge sign of the light diffusion particle 15 differs for each microcapsule 11. The light diffusion particle 15 is included in the microcapsule 11. The constituent that is identical to the constituent of FIG. 19 is denoted by the same reference numeral, and the description thereof will be omitted.

The sign of charge of the light diffusion particle 15 differs for each microcapsule 11. For example, a positive voltage is applied to the electrode 16a, and a negative voltage is applied to the electrode 16b. The positively charged light diffusion particle 15g moves toward the negative electrode 16b. The negatively charged light diffusion particle 15h moves toward the positive electrode 16a.

In this manner, as the light diffusion particle 15g and the light diffusion particle 15h move in different directions, the scintillation pattern changes more complicatedly, and the scintillation can be reduced effectively.

From the above, the energy required for movement of the light diffusion particle 15 is suppressed, and distribution unevenness of the light diffusion particle 15 over the entire screen is suppressed, so that a screen with reduced scintillation that is recognizable by the viewer 9 can be obtained.

Twelfth Embodiment

The light diffusion particle 15 of the microcapsule 11 shown in each of the aforementioned embodiments is charged. The charge amount of the light diffusion particle 15 of the microcapsule 11 according to the present twelfth embodiment is negligibly small. On the other hand, a charged substance 1C is charged. The constituent that is identical to the constituent of FIG. 6 and FIG. 18 is denoted by the same reference numeral, and the description thereof will be omitted.

In each of the aforementioned embodiments, the electric field E is applied in the direction perpendicular to the plane of the screen. Therefore, the charged light diffusion particle 15 moves in the direction approximately perpendicular to the plane of the screen. In other words, the light diffusion particle 15 moves approximately parallel with the incidence direction of the projection light 4. Also, the light diffusion particle 15 moves approximately parallel with the direction of the line of sight of the viewer 9.

In this case, a moving distance of a light scattering position is not more than the diameter of the microcapsule 11. As described above, the diameter of the microcapsule 11 is about 200 micrometers. Even when the light scattering position moves by about 200 micrometers in the direction of the line of sight of the viewer 9, the change in the light scattering direction is small. Therefore, the change in the scintillation pattern is small.

On the other hand, when the light diffusion particle 15 moves in the diagonal direction or in the horizontal direction with respect to the plane of the screen, the scintillation pattern changes complicatedly. In this case, the change in the scintillation pattern is large.

Figure 31:
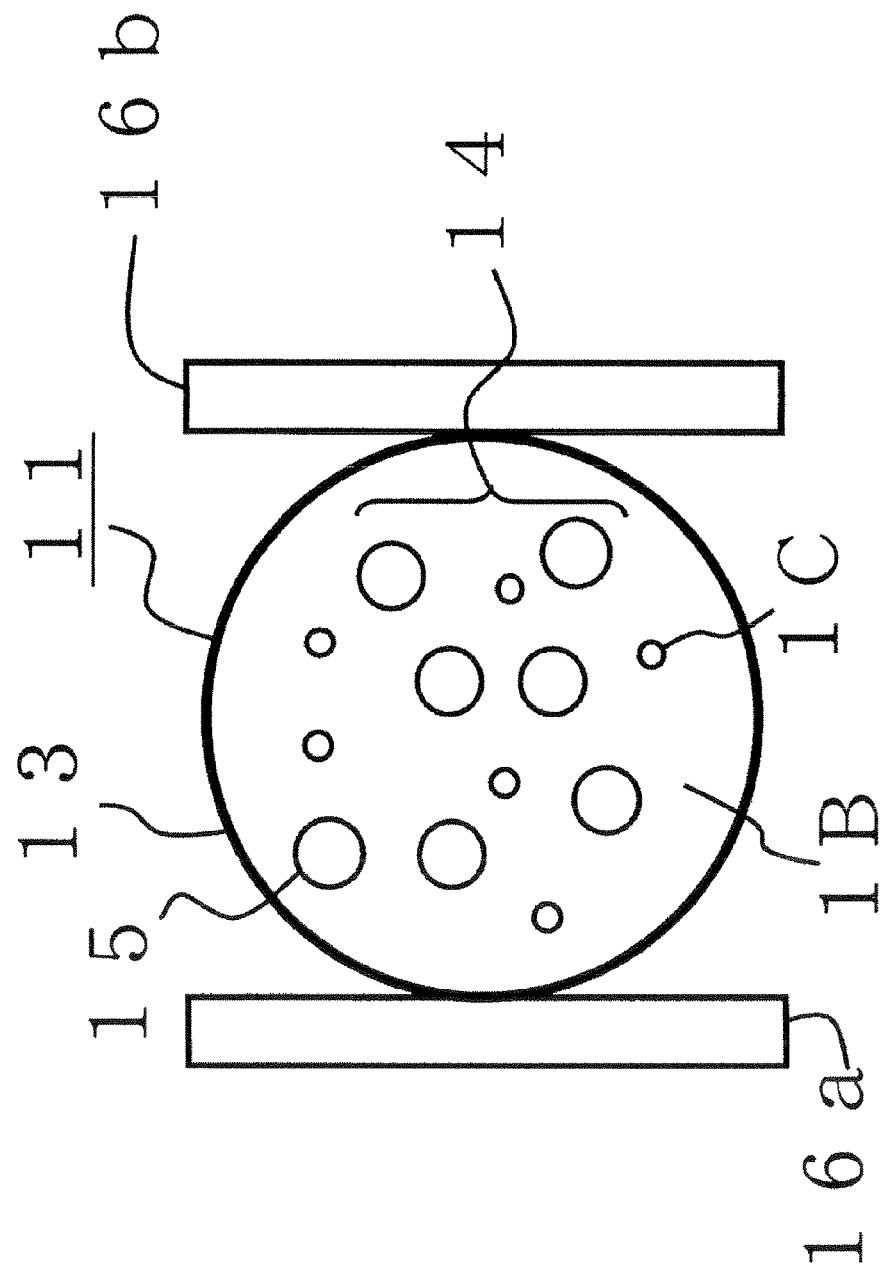
FIG. 31 is a configuration diagram showing a configuration of a microcapsule of a screen according to a twelfth embodiment of the present invention.
Figure 32:
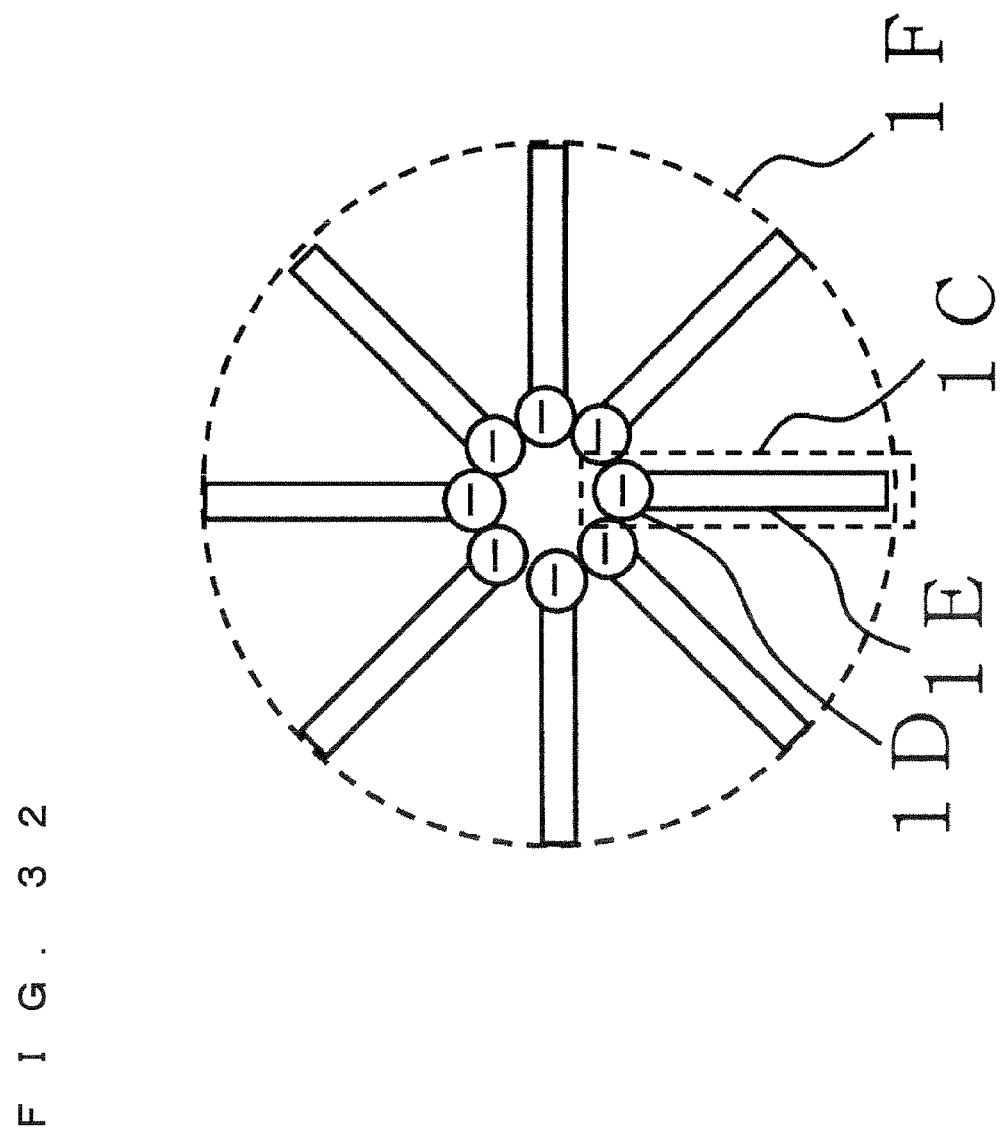
FIG. 32 is a configuration diagram showing a configuration of a charged substance of the screen according to the twelfth embodiment of the present invention.

FIG. 31 and FIG. 32 are configuration diagrams showing a configuration of the microcapsule 11. As shown in FIG. 31 and FIG. 32, in the present twelfth embodiment, the light diffusion particle 15 and the charged substance 1C are encapsulated in the microcapsule 11. An optical influence of the charged substance 1C is sufficiently small. In other words, a refractive index of the charged substance 1C is close to a refractive index of the dispersion medium 1B. Therefore, the charged substance 1C is a substance that does not optically influence. Also, the charged substance 1C is a particle or a liquid. The charged substance 1C is a particle charged in advance. Alternatively, the charged substance 1C is an ionic surfactant. Therefore, the charged substance 1C exists as a transparent charged substance in the microcapsule 11.

The mathematical formula (2) shows a relationship between the radius of particle a, the electric field E and the moving speed V. The moving speed V is a moving speed of the charged substance 1C when a voltage is applied. As shown in FIG. 31, when the charged substance 1C is a particle, the moving speed V becomes large by making the radius of particle a small. As shown in FIG. 32, when the charged substance 1C is an ionic surfactant, a plurality of the charged substances 1C gather, and the charged substances 1C form a micelle 1F. When the dispersion medium 1B is a nonpolar solvent, the micelle 1F makes a hydrophilic part 1D face inside. Then, the micelle 1F makes a lipophilic part 1E face outside. The hydrophilic part 1D of the charged substance 1C is negatively charged. Therefore, the micelle 1F behaves as if it is a negatively charged particle. Then, the micelle moves toward the electrode of the positive side when an electric field is generated.

The charged substance 1C moves when the electric field E is applied. The size of the micelle 1F is about several nanometers. Since the micelle 1F is sufficiently small, the moving speed V is large. That is, in comparison with the light diffusion particle 15, the charged substance 1C moves at a sufficiently large speed. The movement of the charged substance 1C generates convection of the dispersion medium 1B. As a result, by the convection of the dispersion medium 1B, the light diffusion particle 15 moves randomly. The random movement includes not only the movement in the direction perpendicular to the electric field E but also the movement in other directions.

In the screen according to the present twelfth embodiment, the electric field E is applied in the direction perpendicular to the plane of the screen. However, the light diffusion particle 15 moves in the diagonal direction or the horizontal direction with respect to the plane of the screen. That is, the light diffusion particle 15 moves more randomly in comparison with the case of reciprocating in the direction of the electric field E. As a result, the scintillation pattern changes complicatedly, so that the scintillation can be reduced effectively.

Thirteenth embodiment

In each of the aforementioned embodiments, the microcapsule 11 has the light diffusion particle 15 in a capsule. Also, the microcapsule 11 has the dispersion medium 1B in a capsule. The light diffusion particle 15 has a function of refracting the projection light 4. In the present thirteenth embodiment, the microcapsule 11 has at least two kinds of inclusion liquids 1G. The interface between the two kinds of inclusion liquids 1G1, 1G2 has a function of refracting the projection light 4. The constituent that is identical to the constituent of FIG. 6 and FIG. 18 is denoted by the same reference numeral, and the description thereof will be omitted.

F*ig*. 33 shows the microcapsule 11 having two or more kinds of inclusion liquids 1G in the capsule. Part (A) of FIG. 33 shows the case of two kinds of inclusion liquids 1G1, 1G2. Part (B) of FIG. 33 shows the case of four kinds of inclusion liquids 1G1, 1G2, 1G3, 1G4. The plurality of inclusion liquids 1G1, 1G2, 1G3, 1G4 have properties that they do not mix with each other. The plurality of inclusion liquids 1G1, 1G2, 1G3, 1G4 have different refractive indexes. That is, there is always an interface between the plurality of inclusion liquids 1G1, 1G2, 1G3, 1G4. The interface is a boundary face between two substances. Since the inclusion liquids 1G1, 1G2, 1G3, 1G4 are liquid, the shape of interface between the plurality of inclusion liquids 1G1, 1G2, 1G3, 1G4 easily changes. Therefore, the projection light 4 is refracted at such an interface and scattered, and the scattered pattern also changes. In FIG. 33, the inclusion liquids 1G1, 1G2, 1G3, 1G4 have electric charges. However, even when the inclusion liquids 1G1, 1G2, 1G3, 1G4 do not have electric charges, a temporal change in interface occurs when heat is added to the microcapsule. When oscillation is added to the microcapsule, a temporary change in interface occurs.

Further, the inclusion liquids 1G1, 1G3 have different electric charges from those of the inclusion liquids 1G2, 1G4. In the present thirteenth embodiment, the inclusion liquids 1G1, 103 are positively charged, and 1G2, 1G4 are negatively charged. When an electric field is applied to the microcapsule 11, each of the inclusion liquids 1G1, 1G2, 1G3, 1G4 moves in the direction of the electric field. The positively charged inclusion liquids 1G1, 1G3 move toward the negative electrode. The negatively charged inclusion liquids 1G2, 1G4 move toward the positive electrode. As a result, the shape of the interface of the inclusion liquids 1G1, 1G2, 1G3, 1G4 changes. Accordingly, the light scattering characteristic changes, and the scintillation pattern changes. By rapidly switching the direction of the electric filed, it is possible to make the speed of changing the scintillation pattern sufficiently fast. By the temporal change in the electric field, it is possible to reduce the scintillation effectively.

Not every inclusion liquid 1G needs to have an electric charge. The light diffusing effect can be obtained as far as part of the inclusion liquid 1G has an electric charge. As one exemplary case, the inclusion liquid 1G1 has a positive charge, and the inclusion liquid 1G2 does not have a charge in part (A) of FIG. 33. The inclusion liquid 1G1 moves in the microcapsule 11 by an electric field. The inclusion liquid 1G2 does not mix with the inclusion liquid 1G1. Therefore, the inclusion liquid 1G2 moves in the direction opposite to the inclusion liquid 1G1.

Figure 34:
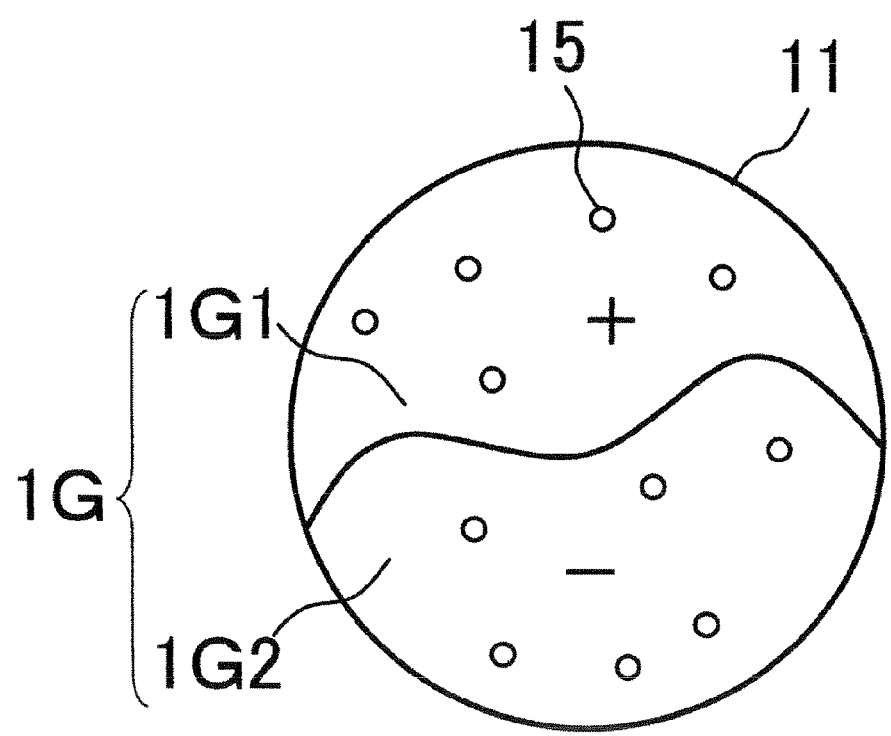
FIG. 34 is a configuration diagram showing a configuration of a microcapsule of the screen according to the thirteenth embodiment of the present invention.

The aforementioned inclusion liquid 1G does not contain the light diffusion particle 15. However, as shown in FIG. 34, when the inclusion liquid 1G contains the light diffusion particle 15, the microcapsule 11 is able to further scatter the light. By the temporal movement of the inclusion liquid 1G, the light diffusion particle 15 temporally moves. The light diffusion particle 15 scatters the projection light 4. As a result, it is possible to make the temporal change in the scintillation pattern large. Accordingly, the screen is able to reduce the scintillation more effectively.

Figure 35:
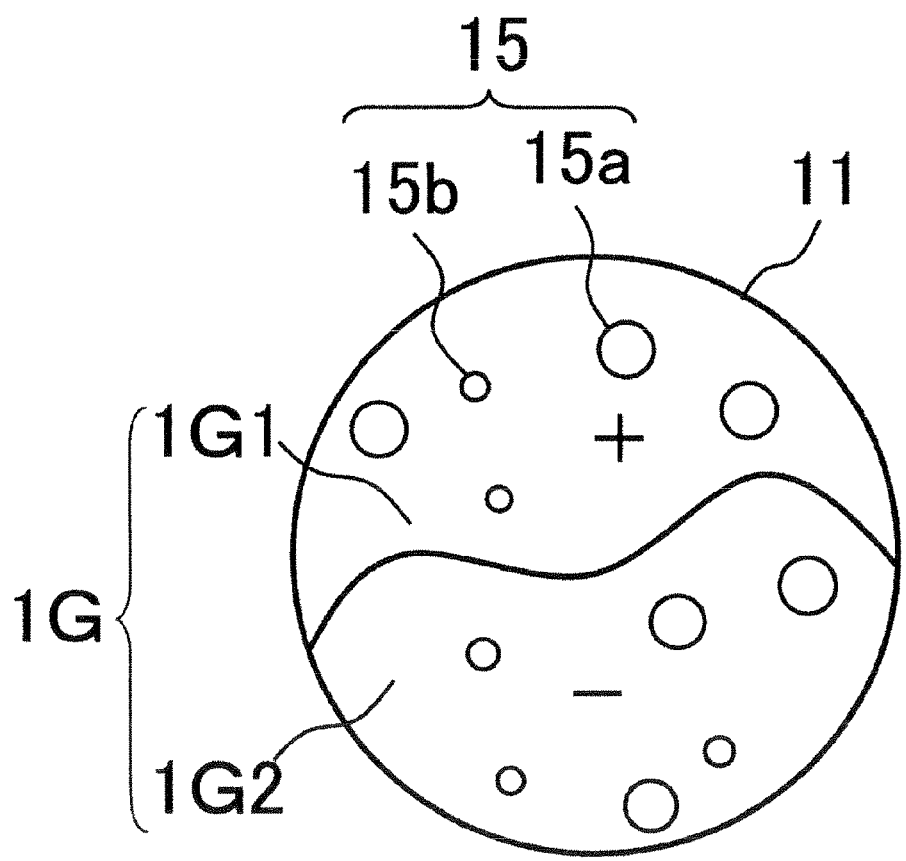
FIG. 35 is a configuration diagram showing a configuration of a microcapsule of the screen according to the thirteenth embodiment of the present invention.

As shown in FIG. 35, the light diffusion particle 15 is made up of two kinds of particles having different sizes. The light diffusion particle 15a is a large particle. The light diffusion particle 15b is a small particle. The movement of the light diffusion particle 15a is slow, and the movement of the light diffusion particle 15b is fast. By the difference in speed of the light diffusion particle 15, it is possible to make the temporal change in the scintillation pattern large. Accordingly, the screen is able to reduce the scintillation more effectively.

FIG. 36 is a configuration diagram showing a configuration of the microcapsule 11 in the thirteenth embodiment. As shown in FIG. 36, the light diffusion particle 15 is formed from a flat non-spherical particle like a convex lens. The light diffusion particle 15 is able to change its posture by motion of the molecule of the inclusion liquid 1G without changing its position in the microcapsule 11. As a result, the angle of the light diffusion particle 15 with respect to the projection light 4 changes. The light diffusion particle 15 is able to generate a temporal change in the scattered wave without changing its position in the microcapsule 11. Even when the motion of the inclusion liquid 1G is slow, the non-spherical light diffusion particle 15 is able to reduce the scintillation. Also, in an environment at low temperature, the non-spherical light diffusion particle 15 is able to reduce the scintillation. Alternatively, even in an environment at low temperature, the non-spherical light diffusion particle 15 is able to remove the scintillation. By varying the size of the light diffusion particle 15 as described above, it is possible to further reduce the scintillation.

Fourteenth Embodiment

Figure 37:
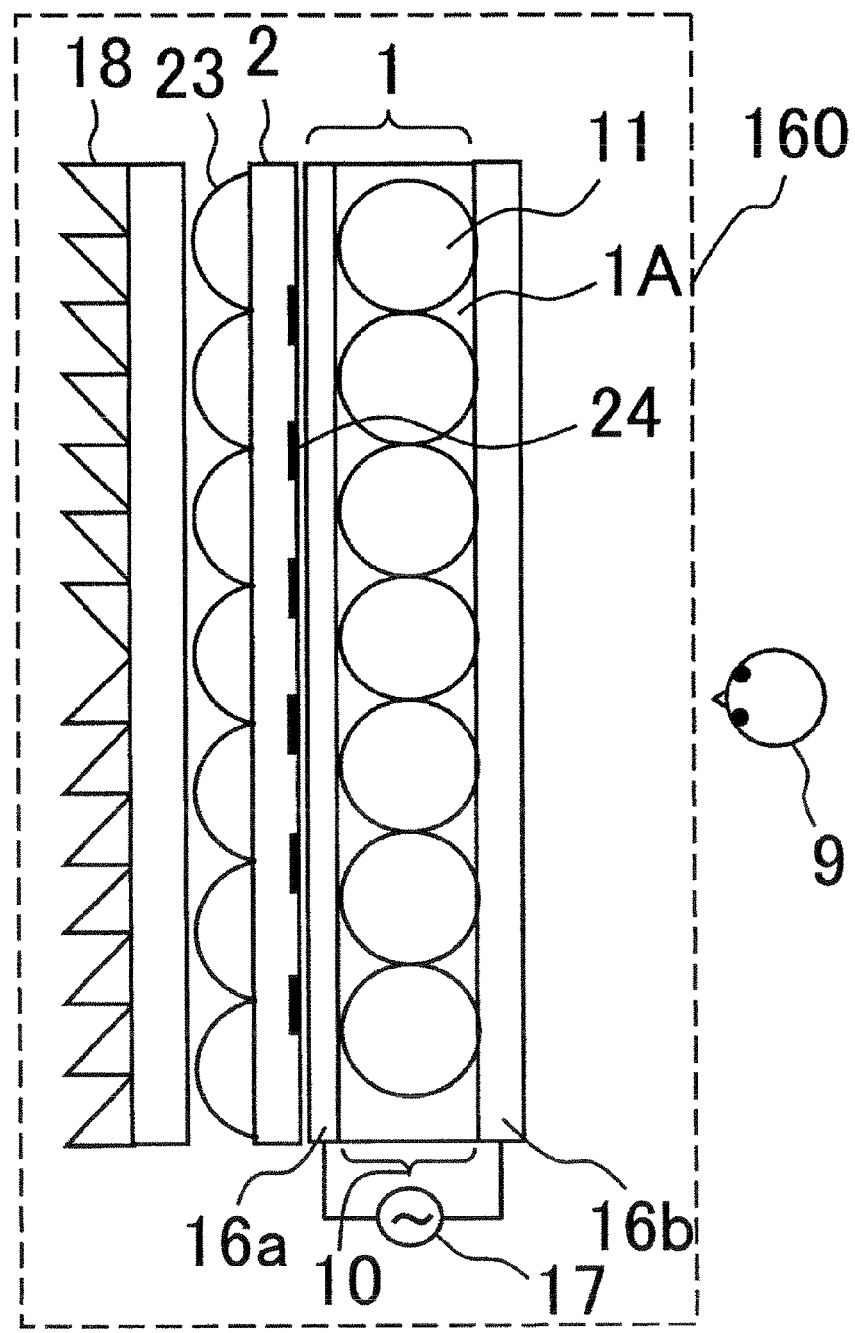
FIG. 37 is a configuration diagram showing a configuration of a screen according to a fourteenth embodiment of the present invention.

In each of the aforementioned embodiments, the microcapsule 11 is disposed between the Fresnel lens 18 and the lenticular lens 23. In the present fourteenth embodiment, the microcapsule 11 is disposed on the side of the viewer 9 of the lenticular lens 23. FIG. 37 is a configuration diagram showing a configuration of the section of the screen viewed from above. The constituent that is identical to the constituent of FIG. 3, FIG. 7 and FIG. 8 is denoted by the same reference numeral, and the description thereof will be omitted.

As shown in FIG. 37, the microcapsule 11 is disposed on the side of the viewer 9 of the lenticular lens 23. In this case, the black stripe 24 neighbors the electrode 16a. The light diffusion plate 1 may be fixed to the light diffusion plate 2 to form a single component. In other words, the light diffusion plate 2 has a function of causing a temporal change in the scattered light.

As shown in part (B) of FIG. 7, the black stripe 24 is disposed on the side of the viewer 9 of the supporting sheet part 21. The black stripe 24 absorbs the light reflected on a lens surface of the lenticular lens 23. Alternatively, the black stripe 24 reflects the light reflected on a lens surface of the lenticular lens 23. The black stripe 24 does not emit external unnecessary light ray 5 on the side of the viewer 9. As a result, it is possible to prevent the contrast from decreasing. Here, the lenticular lens 23 is formed in the vertical direction so as to widen the viewing angle in the horizontal direction. Therefore, the black stripe 24 is provided similarly in the vertical direction. That is, the black stripe 24 is provided on a display surface of the screen. The black stripe 24 shields part of the projection light 4.

In each of the aforementioned embodiments, the second light diffusion particle 22 is contained in the second light diffusion plate 2. However, in a screen 160 shown in FIG. 37, the second light diffusion particle 22 is contained in the Fresnel lens 18. Preferably, the second light diffusion particle 22 is not contained in a lens part of the Fresnel lens 18. The second light diffusion particle 22 is not contained in the second light diffusion plate 2.

On the other hand, regarding the electrode 16, there is a case that the electrode 16 itself is transparent. Also, there is a case that the electrode 16 is so fine that the screen looks transparent. Regardless of selection of either case, the transmittance is decreased by the electrode 16.

As shown in FIG. 37, the light diffusion plate 1 is disposed on the side of the viewer 9 of the black stripe 24. The external light 5 enters the screen 160 from the side of the viewer 9. Thereafter, the external light 5 is absorbed in the black stripe 24. However, part of the external light 5 is scattered on the light diffusion plate 1 and returns to the side of the viewer 9. Therefore, the configuration shown in FIG. 37 slightly reduces the contrast.

On the other hand, the projection light 4 is refracted by the lenticular lens 23. Then, the light flux of the projection light 4 is thinned and the projection light 4 passes through the black stripe 24. Therefore, the projection light 4 is difficult to be absorbed by the black stripe 24. Therefore, this configuration can ensure the brightness of the video image. Therefore, the aforementioned configuration is desired for obtaining brightness of the video image although the contrast slightly decreases.

Figure 38:
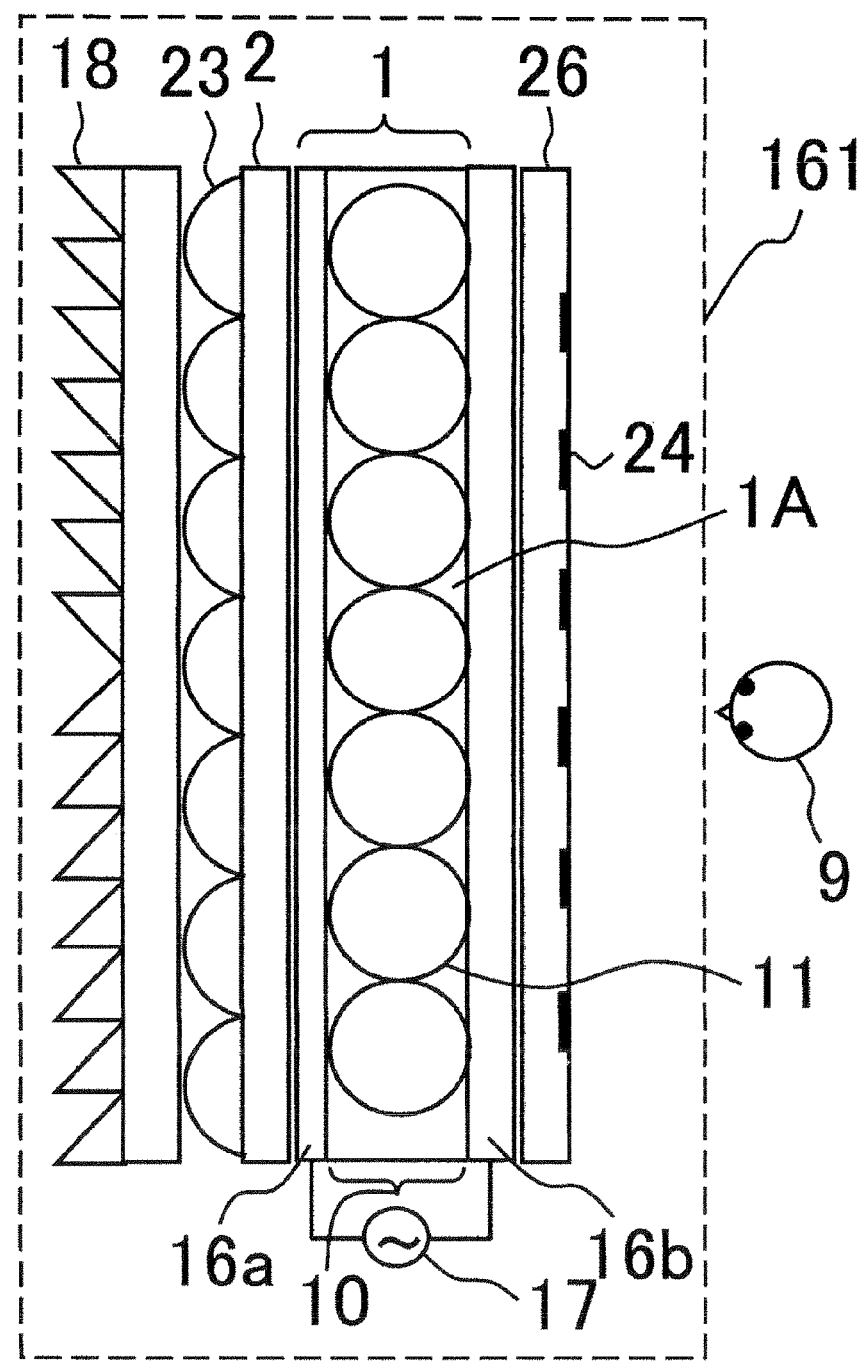
FIG. 38 is a configuration diagram showing a configuration of the screen according to the fourteenth embodiment of the present invention.

FIG. 38 shows a configuration different from the aforementioned configuration. It is the case that the light diffusion plate 1 is disposed on the side of the projector of the black stripe 24. The side of the projector means the side where the projection light 4 enters the screen. In this configuration, the factor of decreasing the contrast as described above is excluded. However, part of the projection light 4 scattered by the light diffusion plate 1 cannot pass through the black stripe 24. Then, part of the projection light 4 is absorbed by the black stripe 24. Therefore, the brightness of the video image decreases. Accordingly, this configuration can be employed for obtaining high contrast although the brightness of the video image decreases.

In a screen 161 shown in FIG. 38, the second light diffusion particle 22 is contained in the Fresnel lens 18. Preferably, the second light diffusion particle 22 is not contained in a lens part of the Fresnel lens 18. The second light diffusion particle 22 is not contained in the second light diffusion plate 2. The black stripe 24 is formed in a supporting sheet 26. The supporting sheet 26 does not contain the second light diffusion particle 22. As shown in FIG. 38, the black stripe 24 is formed in the supporting sheet 26. However, the black stripe 24 may be formed in the electrode 16a. In such a case, the supporting sheet 26 is not used.

Figure 39:
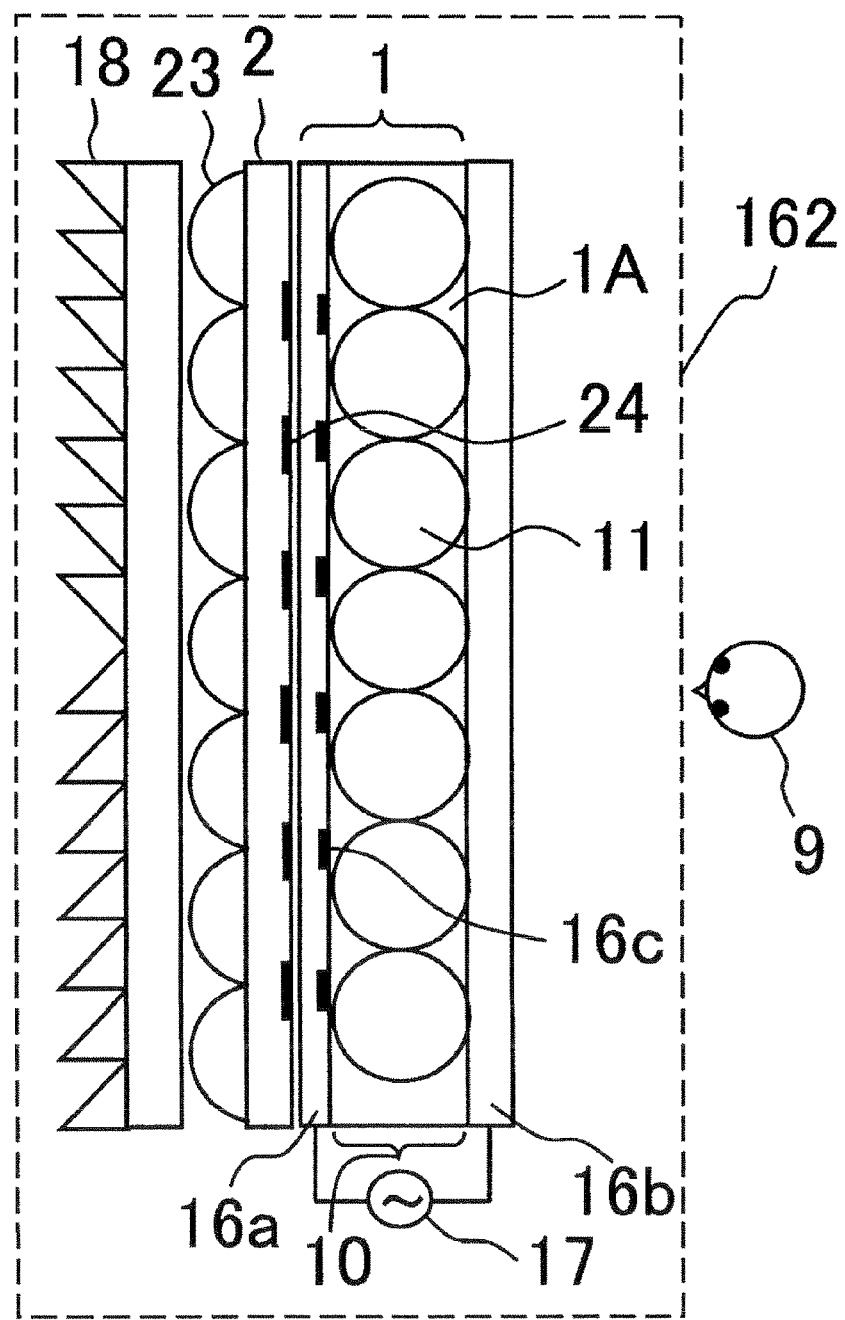
FIG. 39 is a configuration diagram showing a configuration of the screen according to the fourteenth embodiment of the present invention.

As shown in FIG. 39, the electrode 16a on the side of the black stripe 24 is disposed in the position where it overlaps the black stripe 24. In this manner, it is possible to prevent the transmittance from decreasing by the electrode 16a. As described above, the projection light 4 is refracted by the lenticular lens 23. Then, the light flux of the projection light 4 is thinned and the projection light 4 passes through the black stripe 24. Accordingly, the projection light 4 passes through the electrode 16a. Accordingly, decrease in the transmittance by the electrode 16a is reduced. As a result, it becomes possible to minimize the light shielding area. The light shielding area is an area of the black stripe 24. However, the projection light 4 passes through the black stripe 24. Therefore, the light shielding area is smaller than the area of the black stripe 24. And the brightness of the screen can be ensured. Further, by activating the motion of the light diffusion particle 15, the scintillation can be reduced effectively. In a screen 162 shown in FIG. 39, the second light diffusion particle 22 is contained in the Fresnel lens 18. Preferably, the second light diffusion particle 22 is not contained in a lens part of the Fresnel lens 18. The second light diffusion particle 22 is not contained in the second light diffusion plate 2.

Fifteenth Embodiment

Figure 40:
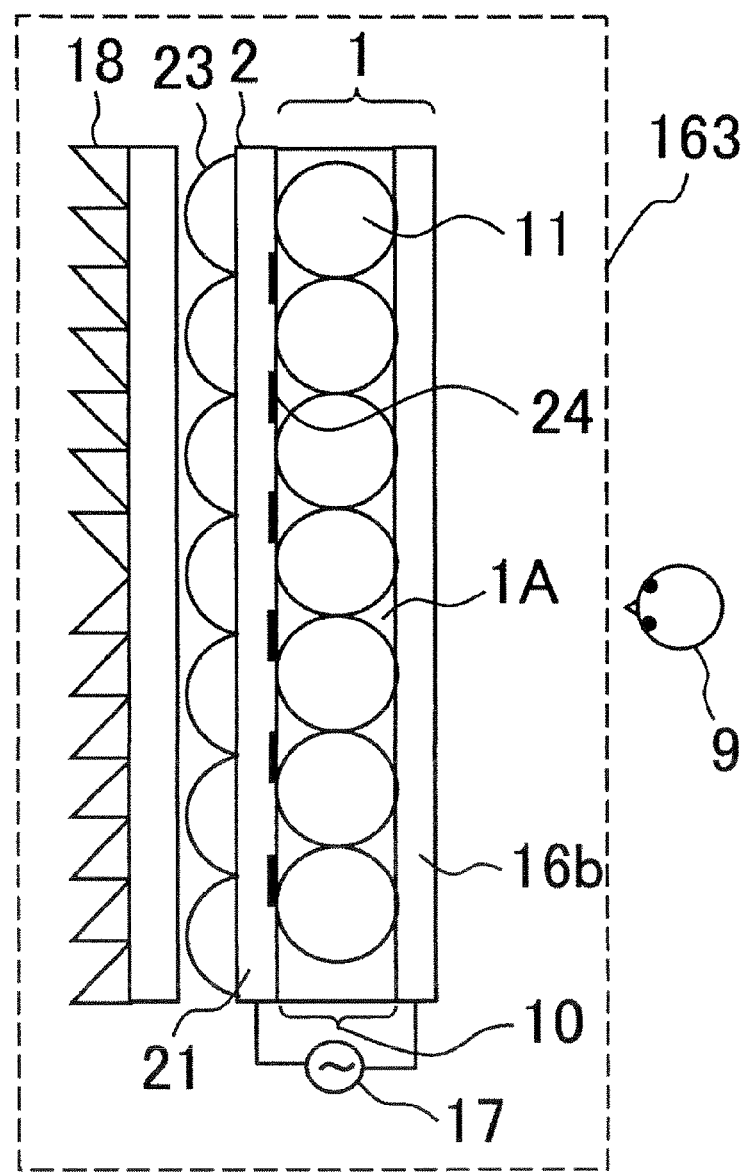
FIG. 40 is a configuration diagram showing a configuration of a screen according to a fifteenth embodiment of the present invention.
Figure 41:
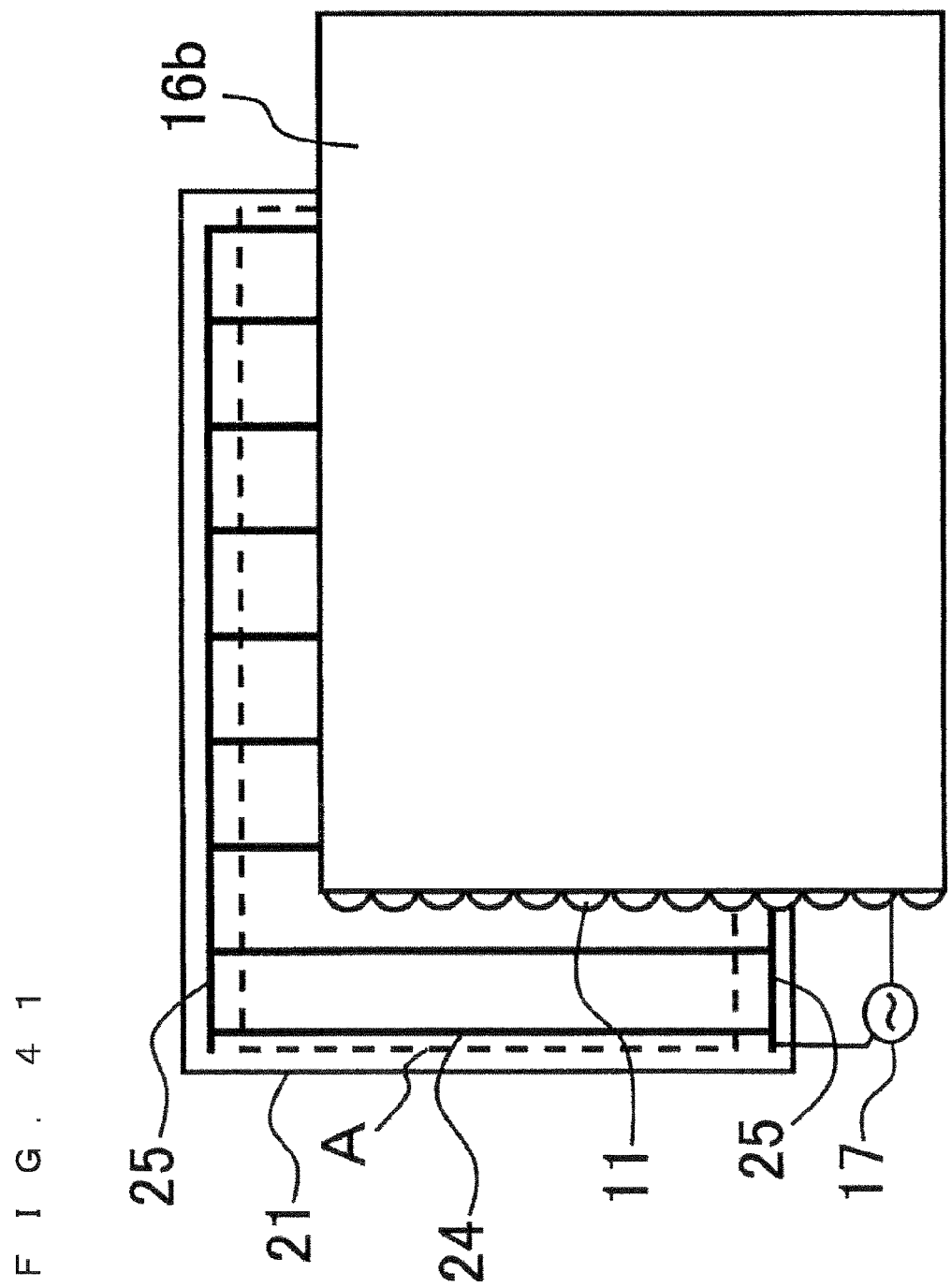
FIG. 41 is a configuration diagram showing a configuration of the screen according to the fifteenth embodiment of the present invention.

In the fourteenth embodiment, the black stripe 24 is a component separate from the electrode 16a. In the present fifteenth embodiment, the black stripe 24 has a function of the electrode 16a. FIG. 40 is a configuration diagram showing a configuration of a screen 163. FIG. 41 is a configuration diagram of the structure of the electrode viewed from the front direction. The constituent that is identical to the constituent shown in FIG. 36, FIG. 37, FIG. 38 and FIG. 39 is denoted by the same reference numeral, and the description thereof will be omitted.

In the screen 163 shown in FIG. 40, the second light diffusion particle 22 is contained in the Fresnel lens 18. Preferably, the second light diffusion particle 22 is not contained in a lens part of the Fresnel lens 18. The second light diffusion particle 22 is not contained in the second light diffusion plate 2.

Since the black stripe 24 has a function of the electrode 16a, the black stripe 24 is made of a conductive material. Therefore, the electrode 16a is not used. A voltage is applied to the black stripe 24 and the electrode 16b.

The black stripe 24 is disposed in the longitudinal direction of the screen. In an effective area of the screen, each black stripe 24 is not connected. Therefore, each black stripe 24 is electrically connected outside the effective area of the screen. The black stripe 24 is connected to the neighboring black stripe. The material of a connecting part 25 may be the same with the material of the black stripe 24. The material of the connecting part may be different from the material of the black stripe 24. In other words, for the connecting part 25, a transparent material may be used.

In the screen 163 according to the present fifteenth embodiment, since the electrode 16b is the only transparent electrode, transmittance of the screen 163 improves. Further, since the electrode 16b is the only transparent electrode, the configuration of the screen 163 is simplified, and reduction in the cost can be achieved. The screen 163 according to the present fifteenth embodiment is low in cost.

In the screen 162 according to the fourteenth embodiment, it is necessary to align the position of the electrode 16a with the position of the black stripe 24. However, in the screen 163 according to the present fifteenth embodiment, the black stripe 24 has a function of an electrode. Therefore, an operation of aligning the position of the electrode 16a with the position of the black stripe 24 is not necessary. Therefore, assemblability of the screen 163 improves. In addition, the screen 163 according to the present fifteenth embodiment is able to reduce the scintillation effectively by suppressing decrease in transmittance.

Sixteenth Embodiment

The screen according to each of the aforementioned embodiments retains the dispersion liquid 14 on the screen using the microcapsule 11. The dispersion liquid 14 is made up of the light diffusion particle 15 and the dispersion medium 1B. In the present sixteenth embodiment, a plurality of cells 11a are arranged on the screen. That is, the cells 11a are arranged in a grid pattern. The cell 11a has therein the dispersion liquid 14.

Figure 42:
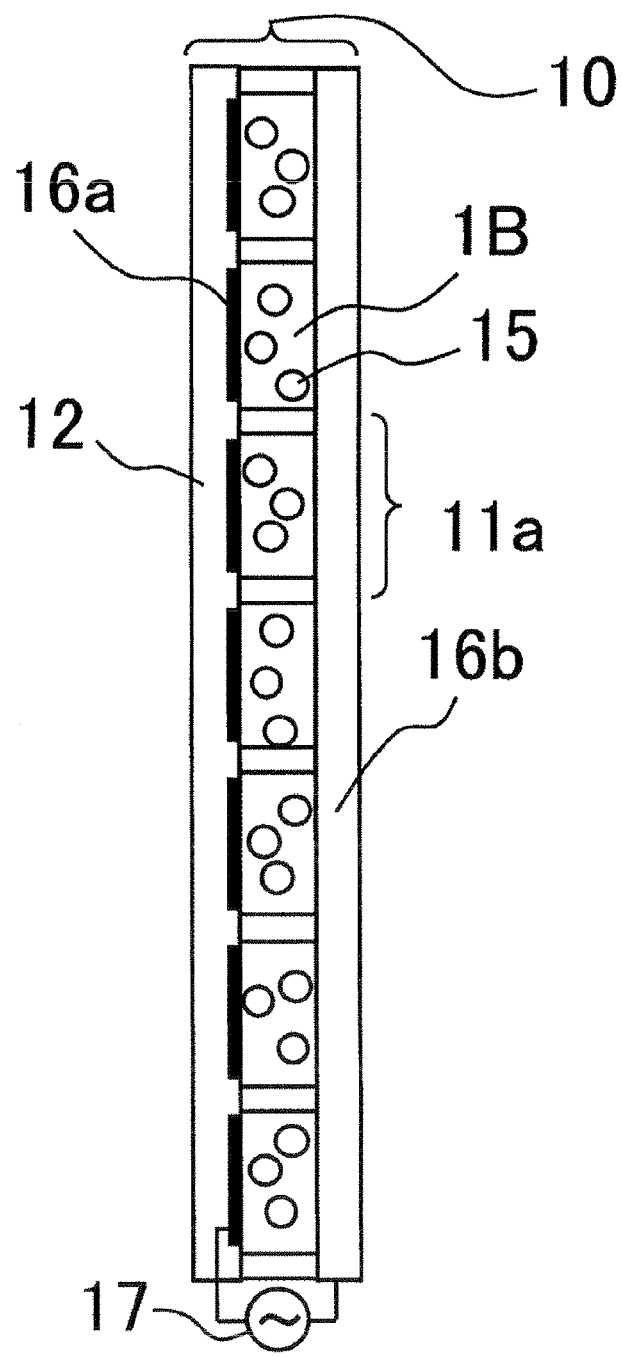
FIG. 42 is a configuration diagram showing a configuration of a screen according to a sixteenth embodiment of the present invention.
Figure 43:
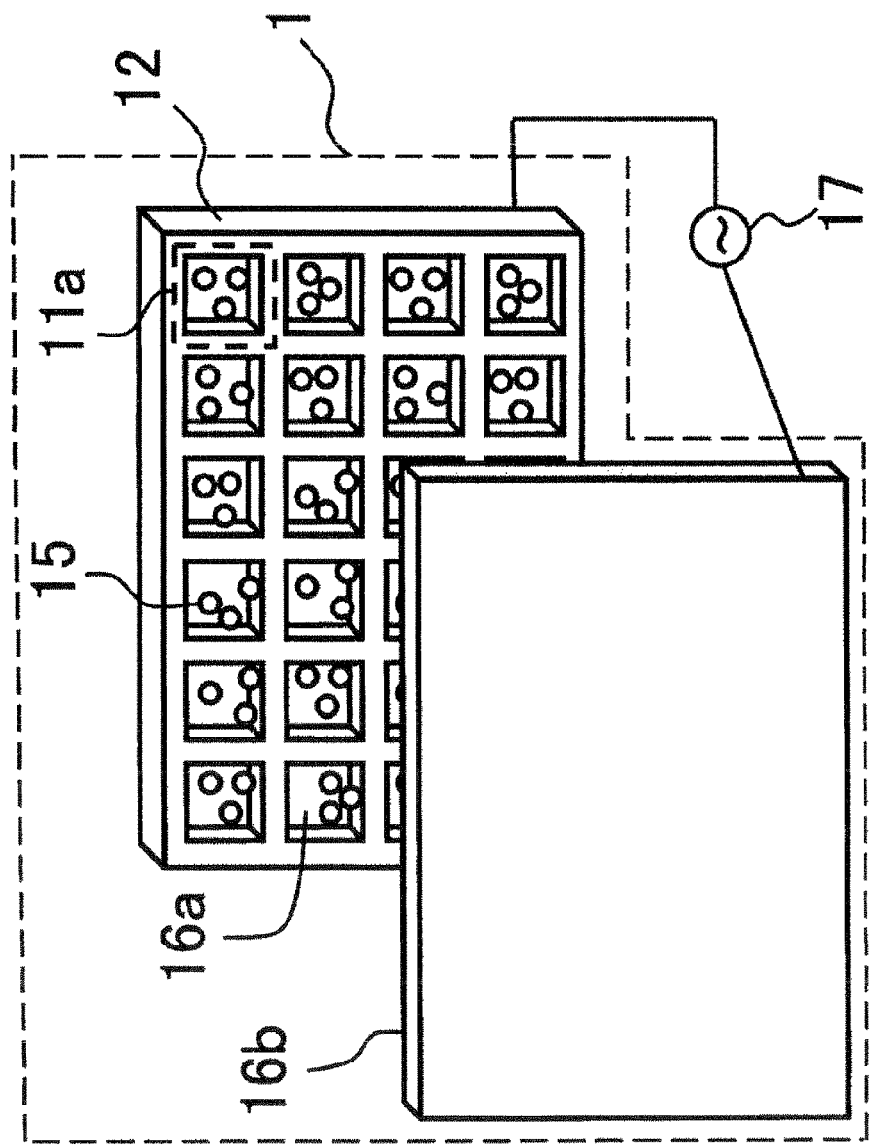
FIG. 43 is a configuration diagram showing a configuration of the screen according to the sixteenth embodiment of the present invention.

FIG. 42 is a configuration diagram showing a configuration of a section of the cells 11a. FIG. 43 is a configuration diagram showing a configuration of the cells 11a viewed from a diagonal direction. In a cell separated by a wall material, the dispersion liquid 14 is enclosed. The dispersion liquid 14 is made up of the light diffusion particle 15 and the dispersion medium 1B. Between the electrode 16a and the electrode 16b, the cell 11a is disposed. The size of the cell 11a is such that one side of the grid is about 100 μm. The depth of the cells 11a ranges from about 10 μm to about 200 μm.

For example, a transparent conductive base material may be obtained by forming a transparent conductive film on a plastic base material. The cells 11a are formed by embossing a plastic base material. Embossing is a process of transferring a shape by pressing a roller or the like. The roller has a concavo-convex shape on its surface. This concavo-convex shape is transferred to the conductive base material.

The light diffusion layer 10 is a layer retaining a light diffusion liquid. Therefore, in the case where a cell is formed in the supporting sheet 12, the light diffusion layer 10 is made up of the supporting sheet 12, a component having a function of a lid, and a light diffusion liquid. On the other hand, in the case where a cell is formed in the electrode 16, the light diffusion layer 10 is made up of the electrode 16, a component having a function of a lid, and a light diffusion liquid. The light diffusion liquid is the dispersion liquid 14, and is the dispersion liquid 14 having the charged substance 1C, such as the inclusion liquid 1G.

In FIG. 42, the electrode 16a is formed on the bottom face on the side of the supporting sheet of the cell 11a. The electrodes 16a of the cells 11a are connected with each other by their parts. The cells 11a are electrically connected with each other.

As shown in FIG. 43, the electrode 16a is formed on the supporting sheet 12. The shape of the cell 11a is transferred onto the supporting sheet 12 by embossing. The cell 11a is charged with a dispersion liquid 14. Then, the electrode 16b is placed on the cell 11a. The electrode 16b is adhered to the supporting sheet 12. As a result, the cells 11a are hermetically sealed.

As shown in FIG. 6, the light diffusion particle 15 charged into the cell 11a may be spherical. Also, as shown in FIG. 10, the light diffusion particle 15 may be a flat non-spherical particle such as a convex lens. Also, as shown in FIG. 17 and FIG. 18, the light diffusion particles 15 may be particles having different sizes and charged in the same sign. Also, as shown in FIG. 19, the light diffusion particles 15 may be particles having the same size, and having different charge amounts in the same sign. Also, as shown in FIG. 20, the light diffusion particles 15 may be particles having different sizes, and having different charge amounts in the same sign. Also, as shown in FIG. 21, the light diffusion particles 15 may be particles having the same size and charged in different signs. Also, as shown in FIG. 22, the light diffusion particles 15 may be particles having different sizes and charged in different signs. Also, as shown in FIG. 23, the light diffusion particles 15 may be particles having different sizes and having different charge amounts in different signs. Also, as shown in FIG. 24, the light diffusion particle 15 may be a flat non-spherical charged particle such as a convex lens. Also, as shown in FIG. 30, the particles may be charged in different signs for each cell 11a as a unit. That is, the light diffusion particles 15 in the cell 11a are charged in the same sign. However, they are charged in a sign different from that in other cell 11a.

As shown in FIG. 31 and FIG. 32, the light diffusion particle 15 and the charged substance 1C may be enclosed in the cell 11a. Also, as shown in FIG. 33, the inclusion liquid 1G may be enclosed in the cell 11a. Also, as shown in FIG. 34, the inclusion liquid 1G and the light diffusion particle 15 may be enclosed in the cell 11a. Also, as shown in FIG. 35, the inclusion liquid 1G and the light diffusion particles 15a, 15b having different sizes may be enclosed in the cell 11a. Also, as shown in FIG. 36, the inclusion liquid 1G and the light diffusion particle 15 in the shape of a convex lens may be enclosed in the cell 11a. The convex lens shape is a flat non-spherical shape like a convex lens. Also, the microcapsule 11 shown in the fourteenth embodiment may be such that the sizes of the light diffusion particles 15 in the shape of a convex lens are different as shown in FIG. 44. In this case, when the inclusion liquid 1G moves, motion of a small light diffusion particle 15s and motion of a large light diffusion particle 15t differ from each other. Therefore, a temporal change in the scattered wave of the projection light 4 occurs randomly. As a result, it is possible to further reduce the scintillation. In the present sixteenth embodiment, the light diffusion particles 15s, 15t shown in FIG. 44 may also be employed. In this case as well, motion of the small light diffusion particle 15s and motion of the large light diffusion particle 15t differ from each other. Accordingly, a temporal change in the scattered wave of the projection light 4 occurs randomly. As a result, it is possible to further reduce the scintillation.

As shown in the second embodiment, a voltage applied to the electrode 16 may be an AC voltage. Also, as shown in the seventh embodiment, a voltage of a rectangular wave may be applied to the electrodes 16a, 16b. As a result, the light diffusion particle 15 is able to move while suppressing decrease in speed at the time of reversion. Also, as shown in the eighth embodiment, a large voltage may be applied so that the absolute value of the voltage temporarily has a maximum value at the time when the applied voltage reverses. As a result, even at the time of reversion of the voltage, the scintillation is difficult to be recognized by the viewer 9. Also, as shown in the ninth embodiment, the applied voltage is reversed in the timing where an image of red R or blue B is displayed. As a result, the situation that the viewer 9 easily recognizes the scintillation due to the decrease in the moving speed of the light diffusion particle 15 can be avoided.

As shown in the nineteenth embodiment, the light diffusion plate 2 may be used in place of the electrode 16b. In this case, as shown in FIG. 40 and FIG. 41, the black stripe 24 of the light diffusion plate 2 may be used as an electrode.

Figure 45:
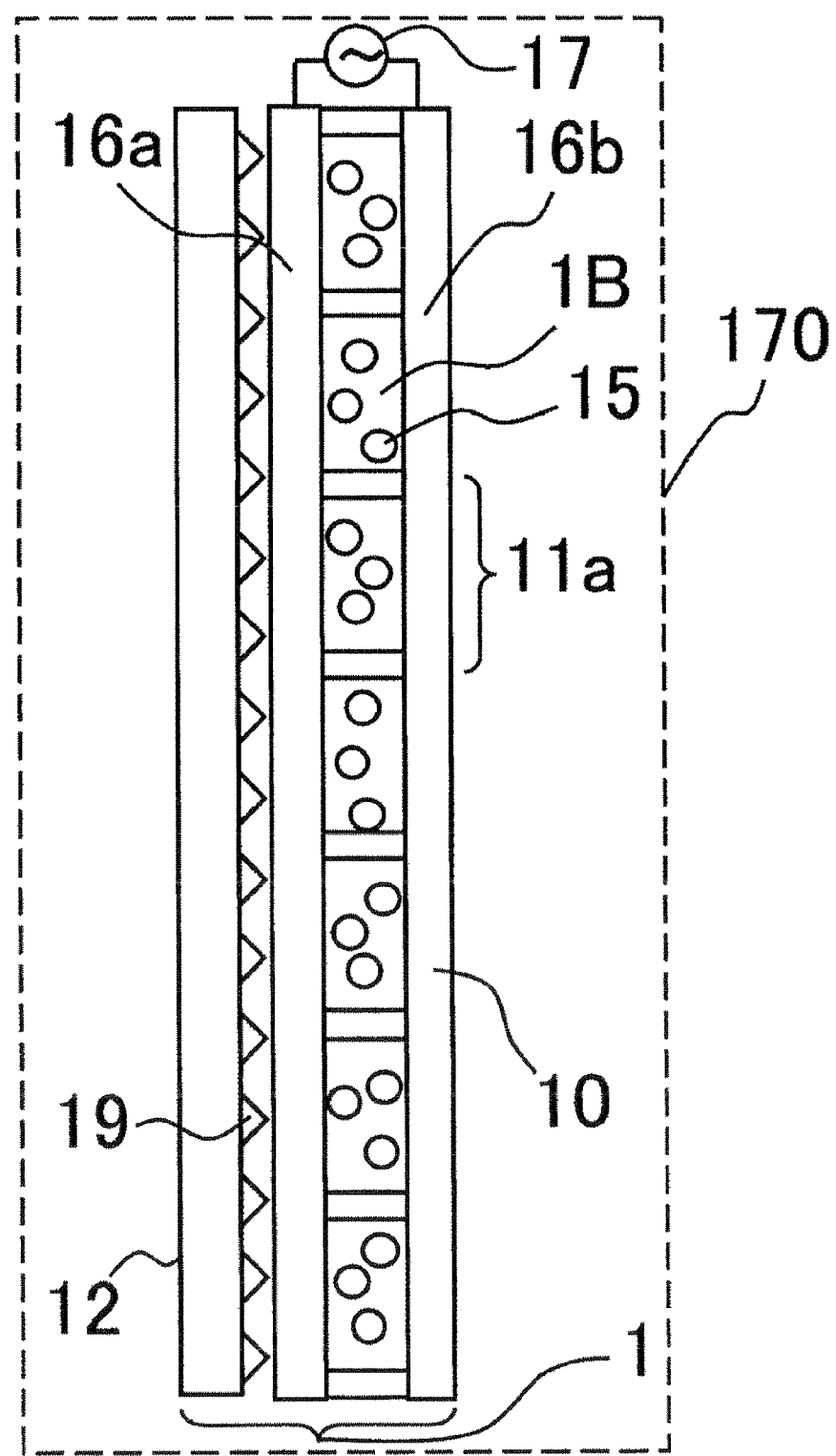
FIG. 45 is a configuration diagram showing a configuration of the screen according to the sixteenth embodiment of the present invention.

As shown in the fourth embodiment, it is possible to prepare a reflection type screen using the light diffusion plate 1 using the configuration of the cell 11a. FIG. 45 is a configuration diagram showing a configuration of a reflection type screen 170. The light diffusion layer 10 is made up of the electrodes 16a, 16b and the dispersion liquid 14. The light diffusion plate 1 is made up of the light diffusion layer 10 and the supporting sheet 12. On the surface of the supporting sheet 12, the light diffusion part 19 is formed. The light diffusion part 19 is formed on the side of the electrode 16a. The power source 17 is attached on the side of the ceiling so as to facilitate storage of the screen 170.

By forming a cell structure on the screen 170, it is possible to realize a screen with no concentration unevenness of the light diffusion particle 15. As a result, the screen 170 is able to reduce the scintillation to remove any unevenness.

Seventeenth Embodiment

Figure 46:
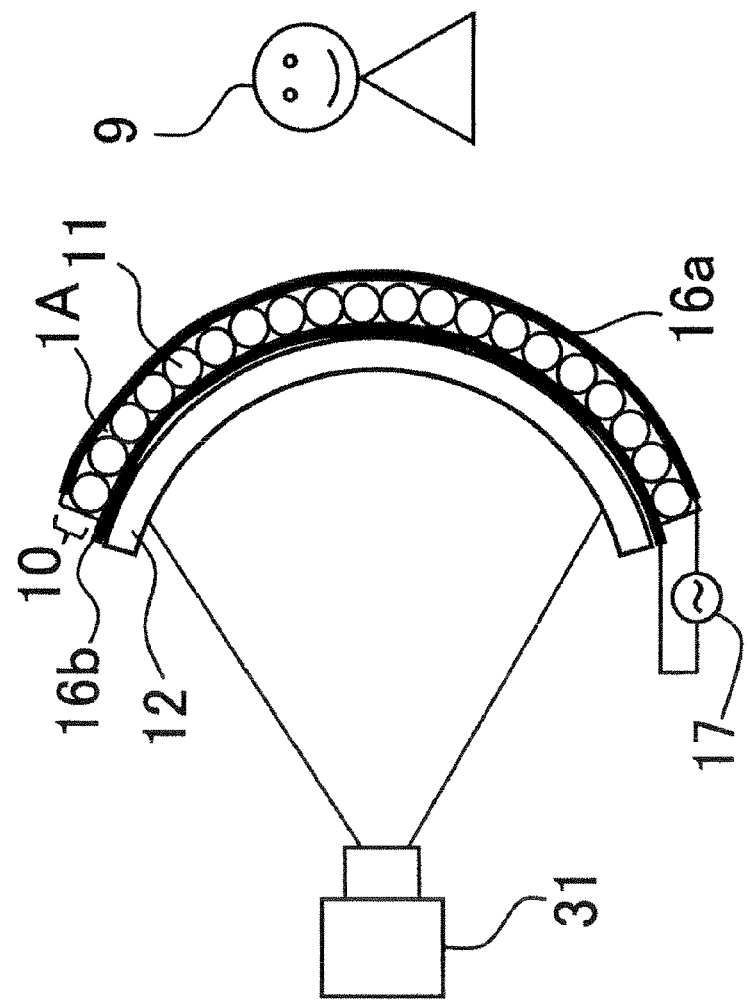
FIG. 46 is a configuration diagram showing a configuration of a screen according to a seventeenth embodiment of the present invention.
Figure 47:
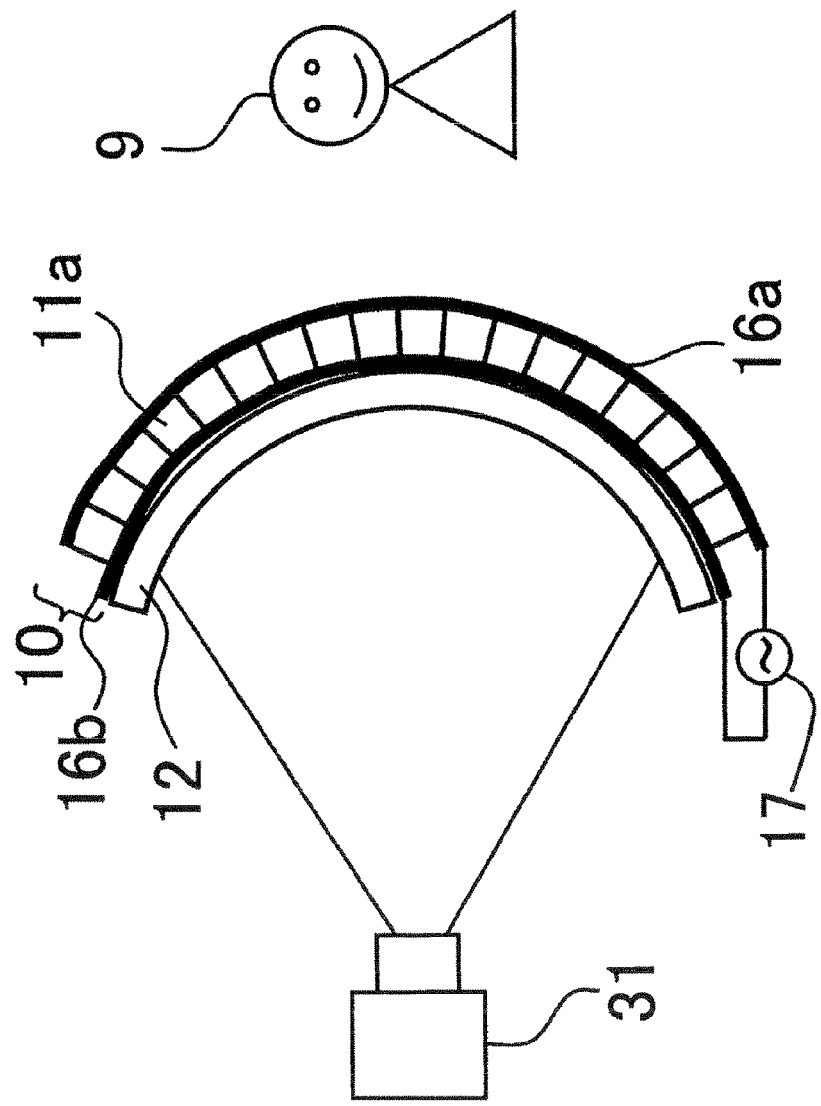
FIG. 47 is a configuration diagram showing a configuration of the screen according to the seventeenth embodiment of the present invention.

The screen according to each of the aforementioned embodiments has a planar shape. The screen according to the present seventeenth embodiment is in the shape of a curved surface. FIG. 46 is a configuration diagram of a screen in the shape of a curved surface using the microcapsule 11. FIG. 47 is a configuration diagram of a screen in the shape of a curved surface using the cell 11a. The constituent that is identical to the constituent shown in FIG. 2, FIG. 9 and FIG. 45 is denoted by the same reference numeral, and the description thereof will be omitted.

As shown in FIG. 46, the supporting sheet 12 has a shape of a curved surface. The supporting sheet 12 is formed with the transparent electrode 16b on the side of the viewer 9. The microcapsule 11 is attached to the electrode 16b on the side of the viewer 9. For fixing of the microcapsule 11, the binder material 1A is used. On the side of the view 9 of the microcapsule 11, the electrode 16a is attached.

The projector 31 is disposed on the side of the supporting sheet 12. The projection light 4 enters from the supporting sheet 12. Thereafter, the projection light 4 passes through the electrode 16b. Then, the projection light 4 passes through the microcapsule 11. Then, the projection light 4 is emitted from the electrode 16a.

The dispersion liquid 14 may be encapsulated in the microcapsule 11. Also, as shown in the twelfth embodiment, the charged substance 1C may be encapsulated in the microcapsule 11. Also, the light diffusion particle 15 and the charged substance 1C may be encapsulated in the microcapsule 11. Also, as shown in the thirteenth embodiment, the inclusion liquid 1G may be encapsulated in the microcapsule 11. The light diffusion particle 15 and the inclusion liquid 1G may be encapsulated in the microcapsule 11.

The microcapsule 11 can be easily attached even when the surface of the supporting sheet 12 is a curved surface. The dispersion liquid 14 can move only in the microcapsule 11. Therefore, occurrence of concentration unevenness of the light diffusion particle 15 on the screen is suppressed. Further, occurrence of concentration unevenness of the charged substance 1C on the screen is suppressed. Further, occurrence of concentration unevenness of the inclusion liquid 1G on the screen is suppressed.

The energy required for movement of the light diffusion particle 15 is suppressed and distribution unevenness of the light diffusion particle 15 over the entire screen is suppressed, so that a screen with reduced scintillation recognizable by the viewer 9 can be obtained. Also, the energy required for movement of the charged substance 1C is suppressed, and distribution unevenness of the charged substance 1C over the entire screen is suppressed, so that a screen with reduced scintillation recognizable by the viewer 9 can be obtained. Also, the energy required for movement of the inclusion liquid 1G is suppressed, and distribution unevenness of the inclusion liquid 1G over the entire screen is suppressed, so that a screen with reduced scintillation recognizable by the viewer 9 can be obtained.

As shown in FIG. 47, the supporting sheet 12 has a shape of a curved surface. The supporting sheet 12 is formed with the transparent electrode 16b on the surface of the side of the viewer 9. The cell 11a is formed on the side of the viewer 9 of the electrode 16b. The cell 11a can be formed by embossing the electrode 16b. Thereafter, the electrode 16b can be attached to the supporting sheet 12. Also, after attaching the electrode 16b to the supporting sheet 12, the supporting sheet 12 may be embossed. On the side of the viewer 9 of the cell 11a, the electrode 16a is attached.

The projector 31 is disposed on the side of the supporting sheet 12. The projection light 4 enters from the supporting sheet 12. Thereafter, the projection light 4 passes through the electrode 16b. Then, the projection light 4 passes through the cell 11a. Then, the projection light 4 is emitted from the electrode 16a.

The dispersion liquid 14 may be enclosed in the cell 11a. Also, as shown in the twelfth embodiment, the charged substance 1C may be enclosed in the cell 11a. Also, the light diffusion particle 15 and the charged substance 1C may be encapsulated in the microcapsule 11. Also, as shown in the thirteenth embodiment, the inclusion liquid 1G may be enclosed in the cell 11a. The light diffusion particle 15 and the inclusion liquid 1G may be encapsulated in the microcapsule 11.

The cell 11a can be readily formed even when the surface of the supporting sheet 12 is a curved surface. Also, the dispersion liquid 14 can move only in the cell 11a. Therefore, occurrence of concentration unevenness of the light diffusion particle 15 on the screen is suppressed. Also, occurrence of concentration unevenness of the charged substance 1C on the screen is suppressed. Also, occurrence of concentration unevenness of the inclusion liquid 1G on the screen is suppressed.

The energy required for movement of the light diffusion particle 15 is suppressed and distribution unevenness of the light diffusion particle 15 over the entire screen is suppressed, so that a screen with reduced scintillation recognizable by the viewer 9 can be obtained. Also, the energy required for movement of the charged substance 1C is suppressed, and distribution unevenness of the charged substance 1C over the entire screen is suppressed, so that a screen with reduced scintillation recognizable by the viewer 9 can be obtained. Also, the energy required for movement of the inclusion liquid 1G is suppressed, and distribution unevenness of the inclusion liquid 1G over the entire screen is suppressed, so that a screen with reduced scintillation recognizable by the viewer 9 can be obtained.

Eighteenth Embodiment

Figure 48:
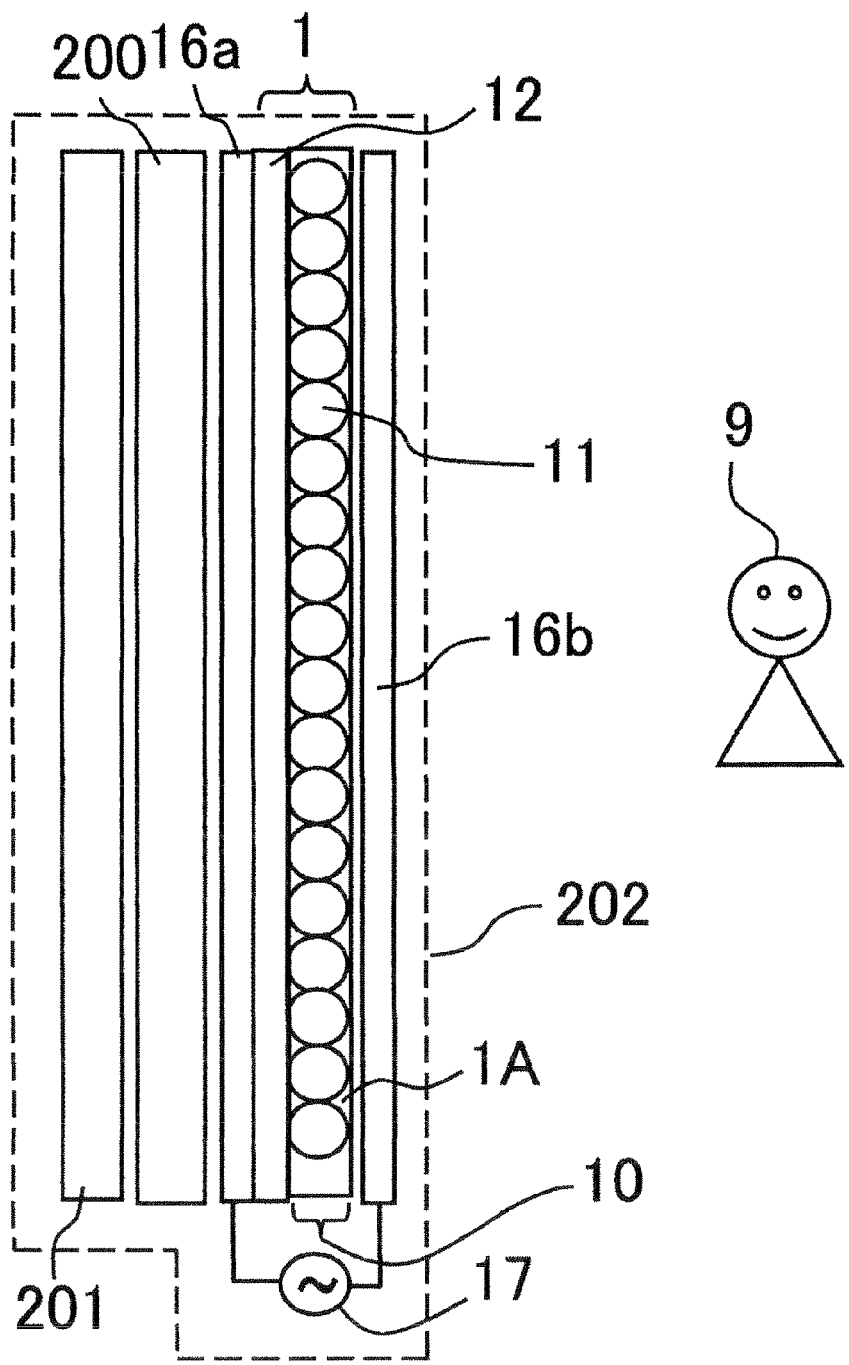
FIG. 48 is a configuration diagram showing a configuration of a liquid crystal display device according to an eighteenth embodiment of the present invention.

Each of the aforementioned embodiments relates to a screen of a projection type display device. The present eighteenth embodiment relates to reduction in scintillation of a liquid crystal display device. FIG. 48 is a configuration diagram showing a configuration in which the light diffusion plate 1 is attached to a liquid crystal panel 200. The light diffusion plate 1 is attached on the side of the viewer 9 of the liquid crystal panel 200. Between the electrode 16a and the electrode 16b, the supporting sheet 12 and the microcapsule 11 are disposed. The constituent that is identical to the constituent shown in FIG. 8 is denoted by the same reference numeral, and the description thereof will be omitted.

The liquid crystal panel 200 itself does not have a function of emitting light. Therefore, the liquid crystal panel 200 requires a backlight unit 201. Recently, laser comes into use as a light source for improving image quality. A laser light source is employed in the backlight unit 201. A liquid display device 202 using the laser light source faces a problem of deterioration in image quality due to the scintillation.

A laser beam is emitted from the backside of the liquid crystal panel 200. The liquid crystal panel 200 is able to display a video image by controlling transmission characteristics of the laser beam for each pixel. However, the laser beam having passed through the liquid crystal panel 200 interferes on the side of the viewer 9. As a result, scintillation occurs. By providing the light diffusion plate 1 in front of the liquid crystal panel 200, a temporal change in a scattered wave of laser beam occurs. As a result, the scintillation is reduced.

Figure 49:
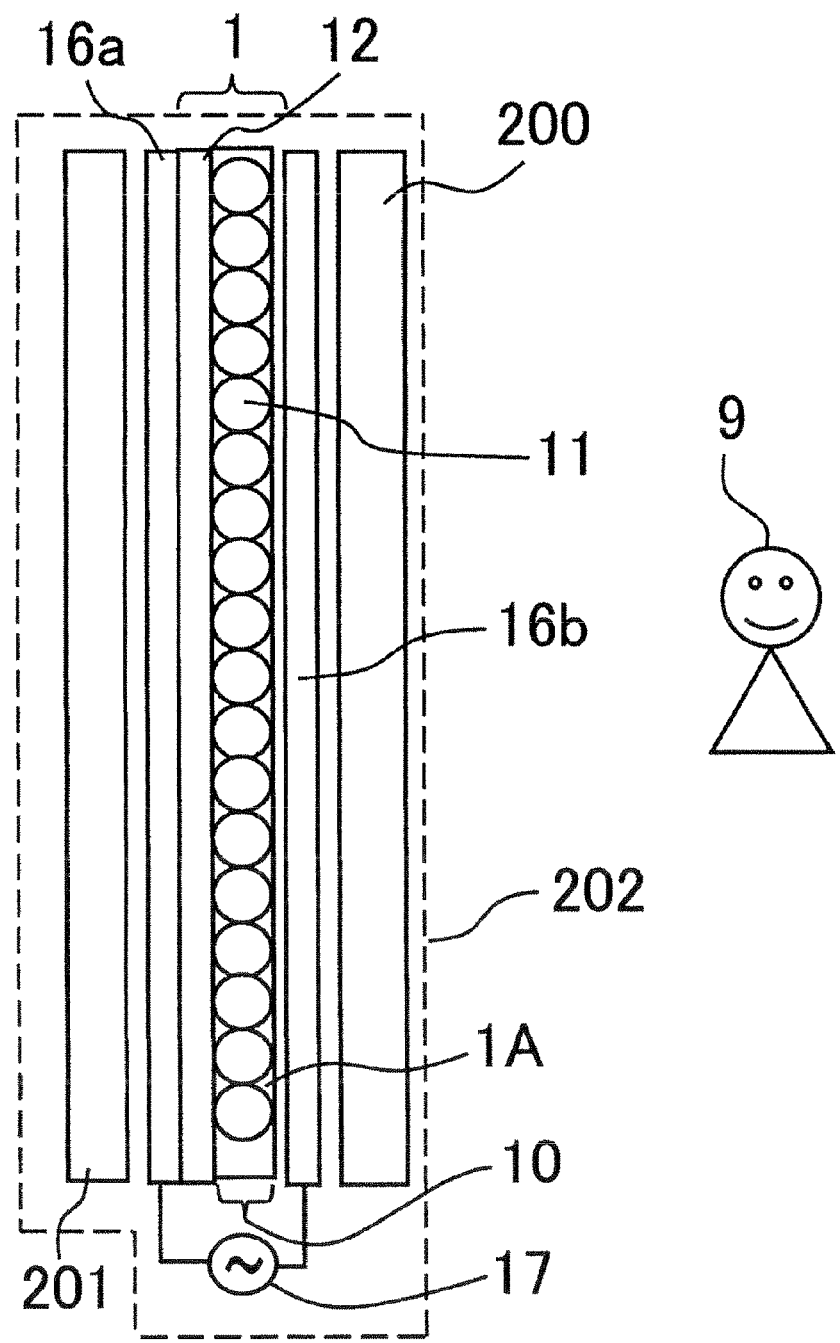
FIG. 49 is a configuration diagram showing a configuration of the liquid crystal display device according to the eighteenth embodiment of the present invention.

As shown in FIG. 49, the liquid crystal panel 200 may be disposed on the side of the viewer 9 of the light diffusion plate 1. In this case, a temporal change in a scattered wave of the laser beam has occurred before the laser beam enters the liquid crystal panel 200. Therefore, by the configuration shown in FIG. 49, a similar effect to that of the configuration shown in FIG. 48 is obtained.

The dispersion liquid 14 may be encapsulated in the microcapsule 11. Also, as shown in the twelfth embodiment, the charged substance 1C may be encapsulated in the microcapsule 11. Also, the light diffusion particle 15 and the charged substance 1C may be encapsulated in the microcapsule 11. Also, as shown in the thirteenth embodiment, the inclusion liquid 1G may be encapsulated in the microcapsule 11. The light diffusion particle 15 and the inclusion liquid 1G may be encapsulated in the microcapsule 11.

Figure 50:
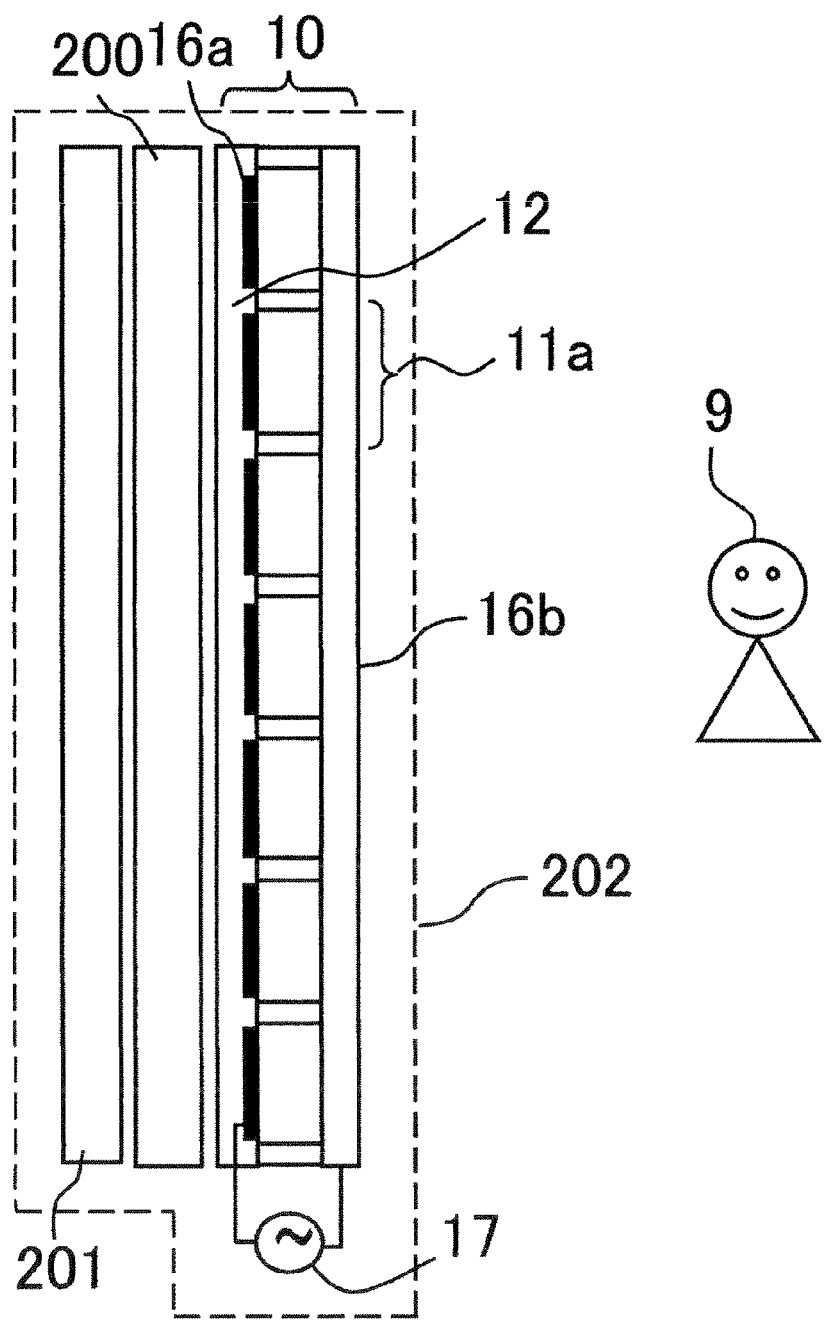
FIG. 50 is a configuration diagram showing a configuration of the liquid crystal display device according to the eighteenth embodiment of the present invention.

As shown in FIG. 50, in place of the light diffusion plate 1 having the light diffusion layer 10 made up of the microcapsule 11, the light diffusion layer 10 made up of the cell 11a may be employed. As described in FIG. 49, the liquid crystal panel 200 may be disposed on the side of the viewer 9 of the light diffusion plate 1.

The dispersion liquid 14 may be enclosed in the cell 11a. Also, as described in the twelfth embodiment, the charged substance 1C may be enclosed in the cell 11a. Also, the light diffusion particle 15 and the charged substance 1C may be enclosed in the cell 11a. Also, as shown in the thirteenth embodiment, the inclusion liquid 1G may be enclosed in the cell 11a. Also, the light diffusion particle 15 and the inclusion liquid 1G may be enclosed in the cell 11a.

In FIG. 50, the electrode 16a is formed on the bottom face on the side of the supporting sheet of the cell 11a. The electrodes 16a of the cells 11a are connected with each other by their parts. The cells 11a are electrically connected with each other.

The energy required for movement of the light diffusion particle 15 is suppressed and distribution unevenness of the light diffusion particle 15 over the entire display surface of the liquid crystal panel 200 is suppressed, so that the liquid display device 202 with reduced scintillation recognizable by the viewer 9 can be obtained. Also, the energy required for movement of the charged substance 1C is suppressed and distribution unevenness of the charged substance 1C over the entire display surface of the liquid crystal panel 200 is suppressed, so that the liquid display device 202 with reduced scintillation recognizable by the viewer 9 can be obtained. Also, the energy required for movement of the inclusion liquid 1G is suppressed and distribution unevenness of the inclusion liquid 1G over the entire display surface of the liquid crystal panel 200 is suppressed, so that the liquid display device 202 with reduced scintillation recognizable by the viewer 9 can be obtained.

Nineteenth Embodiment

Figure 51:
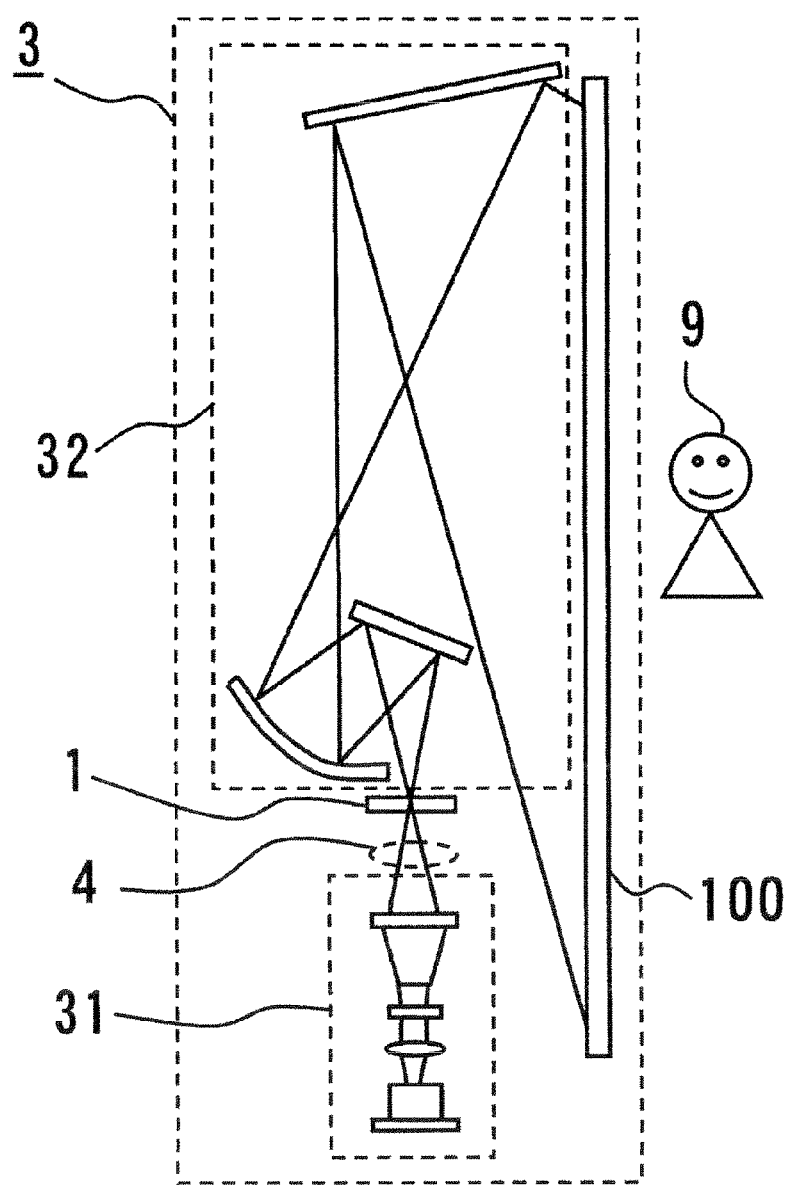
FIG. 51 is a configuration diagram showing a configuration of a projection type display device according to a nineteenth embodiment of the present invention.

Each of the aforementioned embodiments has a configuration wherein the light diffusion plate 1 is disposed near the display surface. The present nineteenth embodiment is a configuration wherein the light diffusion plate 1 is disposed in an optical system. FIG. 51 is a configuration diagram showing a configuration of the display device 3 in which the light diffusion plate 1 is disposed in an optical system. The constituent that is identical to the constituent shown in FIG. 1 is denoted by the same reference numeral, and the description thereof will be omitted.

When a laser light source is used in the display device 3, a patchy pattern with high contrast is formed on the screen. The scintillation of this type is also called speckle noise. This scintillation deteriorates the image quality of the display image.

For removing the scintillation of this type, a method of rotating ground glass in an optical system is used. In the present nineteenth embodiment, the light diffusion plate 1 is used in place of ground glass. The viewer 9 watches images for a long time. Therefore, it is necessary to rotate the ground glass for a long time. The light diffusion plate 1 does not use a motor. Therefore, reliability can be improved by using the light diffusion plate 1.

The scintillation of this type is reduced by a temporal change in a scattered wave of the laser beam. By rotation of the ground glass, a temporal change in a scattered wave occurs. The light diffusion plate 1 can generate a temporal change in a scattered wave. The light diffusion plate 1 is disposed between the projector 31 and the mirror part 32. In this position, the light flux is thinned. Therefore, it is possible to use the light diffusion plate 1 of a small size. The reliability of the display device 3 is improved by using the light diffusion plate 1 in place of rotating the ground glass. Moreover, by using the light diffusion plate 1, the scintillation of this type can be reduced.

In each of the aforementioned embodiments, "parallel", "perpendicular" and the like terms that indicate the positional relationship between components or a shape of a component are used occasionally. Also, phrasing with a term such as "approximately" or "substantially", for example, approximately half, approximately spherical, approximately 90 degrees and approximately parallel, is used occasionally. These indicate that a range taking tolerance in production and dispersion in assembly and the like into account are included. Therefore, even when "approximately" is not described in the claims, the range taking tolerance in production and dispersion in assembly and the like into account is included. Also, when "approximately" is described in claim, it indicates that the range taking tolerance in production and dispersion in assembly and the like into account is included.

The invention claimed is:

1. An optical element comprising a light diffusion layer including cells planarly arranged, said cells each having therein a light diffusion liquid that scatters laser light for displaying a video image, wherein
    said light diffusion liquid includes charged light diffusion particles that scatter said laser light and a dispersion medium that disperses said light diffusion particles
    said light diffusion layer has electrodes that generate an electric field,
    said light diffusion particles include at least two kinds of particles having different particle diameters, and
    among said light diffusion particles, a charge amount of the light diffusion particle having a smaller particle diameter is larger than a charge amount of the light diffusion particle having a larger particle diameter.

2. The optical element according to claim 1, wherein said cells are microcapsules.

3. The optical element according to claim 1, wherein said light diffusion liquids of each of said cells includes either positively charged light diffusion particles or negatively charged diffusion particles.

4. The optical element according to claim 1, wherein said light diffusion liquid of each of said cells includes both positively charged light diffusion particles and negatively charged light diffusion particles.

5. The optical element according to claim 1, wherein said light diffusion liquid further includes charged particles having a refractive index approximately equal to a refractive index of said dispersion medium.

6. The optical element according to claim 1, wherein said light diffusion liquid further includes a charged substance including a hydrophilic part and a lipophilic part.

7. The optical element according to claim 1, wherein one of said electrodes is a black stripe.

8. A screen comprising a sheet or plate arranged perpendicular to an optical axis of said laser light, and said optical element according to claim 1 which is fixed to said sheet or plate.

9. A display device comprising:
a light source transmitting said laser light for displaying a video image; and
a screen comprising a sheet or plate arranged perpendicular to an optical axis of said laser light and said optical element according to claim 1 which is fixed to said sheet or plate.

10. The display device according to claim 9, displaying a video image by raster scanning, wherein said electrodes change the direction of an electric field during a flyback period.

11. An optical element comprising a light diffusion layer including cells planarly arranged, said cells each having therein a light diffusion liquid that scatters laser light for displaying a video image, wherein said light diffusion liquid includes at least two kinds of liquids that do not mix with each other and have different refractive indices, said light diffusion liquid includes at least two kinds of charged liquid diffusion particles having different particle diameters, and among said light diffusion particles, a charge amount of the light diffusion particle having a smaller particle diameter is larger than a charge amount of the light diffusion particle having a larger particle diameter.

12. The optical element according to claim 11, wherein said cells are microcapsules.

13. The optical element according to claim 11, wherein said light diffusion layer includes electrodes for generating an electric field.

* * * * *